United States Patent
Lee et al.

(10) Patent No.: US 10,808,994 B2
(45) Date of Patent: *Oct. 20, 2020

(54) REFRIGERATOR HAVING A CABINET DOOR WITH A TRANSPARENT DISPLAY

(71) Applicant: LG ELECTRONICS INC., Seoul (KR)

(72) Inventors: Sangmyung Lee, Seoul (KR); Chanuk Kang, Seoul (KR); Hyuk Kwon, Seoul (KR); Sanghyun Cheon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/420,486

(22) Filed: May 23, 2019

(65) Prior Publication Data
US 2019/0360745 A1    Nov. 28, 2019

(30) Foreign Application Priority Data

May 28, 2018  (KR) .................. 10-2018-0060244
Dec. 21, 2018  (KR) .................. 10-2018-0167554

(51) Int. Cl.
*F25D 29/00*    (2006.01)
*F21V 33/00*    (2006.01)
(Continued)

(52) U.S. Cl.
CPC ........ *F25D 29/005* (2013.01); *F21V 33/0044* (2013.01); *F25D 23/028* (2013.01);
(Continued)

(58) Field of Classification Search
CPC .......... F21W 2131/305; F21V 33/0044; F25D 23/02; F25D 23/021; F25D 23/023; F25D 23/025; F25D 23/026; F25D 23/028
See application file for complete search history.

(56) References Cited

U.S. PATENT DOCUMENTS 6,059,420 A    5/2000 Rogers
8,322,873 B2 *  12/2012 Glovatsky ............... F25D 27/00
                                                362/23.16
(Continued)

FOREIGN PATENT DOCUMENTS

EP    3 190 364    7/2017
EP    3 333 513    6/2018
(Continued)

OTHER PUBLICATIONS

European Search Report dated Oct. 7, 2019 issued in Application No. 19167224.5.

*Primary Examiner* — Robert J May
(74) *Attorney, Agent, or Firm* — Ked & Associates, LLP

(57) ABSTRACT

Provided is a refrigerator. The refrigerator includes a cabinet, a door configured to open and close the cabinet and having an opening, a panel assembly configured to shield the opening and including a see-through part, and a light provided further inward from the refrigerator than the panel assembly to illustrate a rear side of a door so that the inside of the refrigerator is visible through the see-through part. The wherein the panel assembly includes a transparent front panel defining a front surface thereof, a display disposed on a rear surface of the front panel, a light guide plate disposed to be spaced apart from the display, a backlight configured to emit light toward an end of the light guide plate, and a rear panel made of a transparent material, spaced apart from the front panel to define a heat insulation space in which the display, the light guide plate, and the backlight are accommodated. The light may emit light to a rear region of the light guide plate from the outside of the light guide plate and be disposed at an angle between a direction parallel to the light guide plate and a rear side crossing the light guide plate.

20 Claims, 46 Drawing Sheets

(51) Int. Cl.
  *F25D 23/02* (2006.01)
  *F25D 27/00* (2006.01)
  *F21V 8/00* (2006.01)
  *F21W 131/305* (2006.01)

(52) U.S. Cl.
  CPC ........... *F25D 27/00* (2013.01); *G02B 6/0051* (2013.01); *G02B 6/0065* (2013.01); *G02B 6/0093* (2013.01); *F21W 2131/305* (2013.01); *F25D 2201/10* (2013.01); *F25D 2201/14* (2013.01); *F25D 2323/023* (2013.01); *F25D 2400/36* (2013.01)

(56) References Cited

U.S. PATENT DOCUMENTS

| | | |
|---|---|---|
| 2010/0061079 A1 | 3/2010 | Li et al. |
| 2012/0286638 A1 | 11/2012 | Lee et al. |
| 2017/0027339 A1* | 2/2017 | Chang ............... A47F 3/043 |
| 2017/0188721 A1 | 7/2017 | Park et al. |
| 2018/0164026 A1 | 6/2018 | Lee et al. |
| 2018/0164030 A1 | 6/2018 | Lee |
| 2018/0164031 A1 | 6/2018 | Lee et al. |
| 2018/0164033 A1 | 6/2018 | Lee |
| 2018/0189027 A1 | 7/2018 | Jeon et al. |
| 2018/0274846 A1 | 9/2018 | Kim et al. |
| 2019/0196086 A1* | 6/2019 | Schenkl ............ G02B 6/0021 |
| 2019/0257571 A1 | 8/2019 | Park et al. |

FOREIGN PATENT DOCUMENTS

| | | |
|---|---|---|
| EP | 3 333 515 | 6/2018 |
| EP | 3 333 516 | 6/2018 |
| EP | 3 333 517 | 6/2018 |
| EP | 3 343 157 | 7/2018 |
| EP | 3 378 360 | 9/2018 |
| WO | WO 2011/093614 | 8/2011 |
| WO | WO 2018/043933 | 3/2018 |

* cited by examiner

REFRIGERATOR HAVING A CABINET DOOR WITH A TRANSPARENT DISPLAY

CROSS-REFERENCE TO RELATED APPLICATIONS

The present application claims priority under 35 U.S.C. 119 and 35 U.S.C. 365 to Korean Patent Application No's. 10-2018-0060244 filed May 28, 2018 and 10-2018-0167554 filed Dec. 21, 2018, which is hereby incorporated by reference in its entirety.

BACKGROUND

The present disclosure relates to a refrigerator.

In general, a refrigerator refers to a home appliance in which food may be stored in an internal storage space, which is shielded by a door, at a low temperature. To achieve this, the refrigerator is configured to accommodate the stored food in an optimum state by cooling the internal storage space using cold air generated through heat exchange with a refrigerant circulating in a refrigeration cycle.

In recent years, refrigerators have become increasingly multi-functional with changes of dietary lives and gentrification of products, and refrigerators having various structures and convenience devices for convenience of users and for efficient use of internal spaces have been released.

The storage space of the refrigerator may be opened/closed by the door. Further, the refrigerator may be classified into various types according to arrangement of the storage space and a structure of the door configured to open/close the storage space.

In general, the refrigerator has a problem in that when the door is not opened, internal food cannot be identified. That is, the door should be opened to identify whether desired food is received in a space in the refrigerator or in a separate storage space provided in the door. Further, when a user does not exactly know where the food is stored, an opening time of the door may increase or the number of times the door is opened may increase. At this time, unnecessary outflow of cold air may occur.

In recent years, to solve the above-described problem, a refrigerator in which a portion of a door is transparent or an interior of the refrigerator may be viewed, has been developed.

In recent years, to solve the above-described limitation, a refrigerator in which a portion of a door is transparent or an interior of the refrigerator may be viewed, has been developed as disclosed in U.S. Pat. No. 6,059,420.

However, such a refrigerator has a limitation in that it just allows the user to see the inside of the refrigerator, but it is possible to displays information only in the area in which the inside is visible, it is not output a screen while display the inside of the refrigerator.

SUMMARY

Embodiments provide a refrigerator in which information is capable of being outputted to a door, and a see-through part through which the inside of the refrigerator is visible is formed.

Embodiments also provide a refrigerator in which a display is clearly outputted through a see-through part, and the inside of the refrigerator is clearly visible through the see-through part.

Embodiments also provide a refrigerator which prevents viewing performance from being deteriorated because a diffusion plate provided on a see-through part is opaque.

Embodiments also provide a refrigerator in which a bezel is adjusted in width in a visible state of the inside of the refrigerator and in an invisible state of the inside of the refrigerator through a see-through part to shield constituents around a transparent assembly through the bezel having a minimum width.

Embodiments also provide a refrigerator in which an area of a see-through part is adjustable according to a state of the see-through part through a combination of a bezel displayed in a fixed state and a bezel that is variably outputted.

Embodiments also provide a refrigerator in which a width of a bezel for shielding constituents around a transparent assembly is variable according to a state of a see-through part.

As light guide plate and a light are provided in a refrigerator according to an embodiment so that the inside of the refrigerator is easily seen through a door.

A light diffuser may be provided on the light guide plate to easily induce scattering of light, thereby uniformly diffusing the light toward a display. Thus, an entire area of the display may be uniformly illuminated.

When a user sees the inside of the refrigerator through a display assembly, the display and a backlight may be turned off, and internal lights of the refrigerator may be turned on. Here, the internal lights of the refrigerator may not directly irradiate the light toward the light guide plate to prevent the light diffuser within the light guide plate from interacting with the light.

If the light diffuser and the light of the lights directly interact with each other, the display may be blurred. However, according to the present disclosure, the light guide plate and the internal lights of the refrigerator may be appropriately arranged to prevent a transparent state of the panel assembly from being deteriorated.

Meanwhile, when the user sees the inside of the refrigerator through the display assembly, the display may be turned off, the backlight may be turned off, and the internal lights of the refrigerator may be turned on. The lights may include a storage chamber light and a door light. The storage chamber light and the door light may be disposed so as not to face the light guide plate so that light does not react with the light diffuser provided on the light guide plate.

Since the light diffuser is diffused in an acrylic monomer of the light guide plate, the light diffuser may be properly mixed with the light guide plate.

Also, the backlight may be turned off, and the lights may be turned on so that the panel assembly enters into a transparent mode. In addition, the light emitted from the lights and the light guide plate may be aligned in parallel to each other to prevent the light from having an influence on the light guide plate.

The panel assembly of the refrigerator according to an embodiment may include: a transparent front panel defining a front surface; a display disposed on a rear surface of the front panel; a light guide plate disposed to be spaced apart from the display; backlights configured to emit light toward an end of the light guide plate; and a rear panel made of a transparent material and spaced apart from the front panel to define a space in which the display, the light guide plate, and the backlights are accommodated. The light may be relatively disposed with respect to the light guide plate.

The light may be disposed at a set angle in a direction parallel to the light guide plate or in a direction perpendicular to the light guide plate.

The light guide plate may include a light diffuser configured to scatter light induced into the inside of the light guide plate.

The light guide plate may include: a resin layer made of a transparent resin material; and a diffusion layer disposed on a surface of the resin layer and containing the light diffuser.

The diffusion layer may have a thickness of about 40 μm to about 60 μm.

The light diffuser may include particles of several nanometers to a nano-size and may be made of at least one of silica, titanium dioxide, alumina, acrylic resin, a polycarbonate resin, or a silicone resin.

The lights may be disposed in a vertical direction, in which the length of the door is long, at left and right sides of the light guide plate, and the backlights may be disposed in a horizontal direction at upper and lower sides of the light guide plate.

Each of the lights may be a door light provided on the rear surface of the door.

Each of the lights may be a door light provided on a rear surface of the door.

The light may include: a door light provided on a rear surface of the door; and a storage chamber light provided inside the cabinet. The storage chamber light may be turned on and off together with the door light to illuminate the inside of the refrigerator.

A light emitting surface of the door light may be disposed at a predetermined angle between an angle parallel to the light guide plate and an angle that is directed backward and perpendicular to the light guide plate.

A light emitting surface of the storage chamber light may be angled between a first set angle that is directed backward and a second set angle that is directed forward with respect to a position parallel to the light guide plate, and the first set angle may be greater than the second set angle.

The light may include: a light emitting member configured to emit light; a light case in which the light emitting member is accommodated; and a light cover which shields an opening of the light case and through which the light emitted from the light emitting member is transmitted.

The light emitting member may be disposed to emit light between the direction parallel to the light guide plate and the rear side perpendicular to the light guide plate.

A shield part extending to a rear side of the light guide plate to block the light emitted from the light emitting member toward the light guide plate may be disposed on one side of the light case.

A reflection part that is inclined or rounded so that the light emitted from the light emitting member is reflected to pass through the light cover may be disposed on an inner surface of the light case, which faces the light emitting member.

The light may further include a shield part extending in a direction crossing the light guide plate to block the light emitted from the light emitting member toward the light guide plate.

The door may include: a main door configured to open and close the cabinet and provide a door-side storage space in a main door opening; and a sub-door configured to open and close the door-side storage space at a front side of the main door and provided with the display assembly to allow the door-side storage space to be visible.

The light may be mounted on an inner surface of the main door opening.

The light may be mounted on a protrusion protruding from a rear surface of the sub-door and inserted into an inner surface of the main door.

An opaque first bezel may be disposed around the panel assembly, and an opaque second bezel configured to output the same color as the first bezel on the display and having a predetermined width on an end of the first bezel may be provided.

The second bezel may be outputted in a state in which the inside of the refrigerator is seen through the see-through part and may not outputted in a state in which the inside of the refrigerator is not seen through the see-through part.

The see-through part may be defined as an inner region of the second bezel in a state in which the second bezel is outputted and may be defined as an inner region of the first bezel in a state in which the second bezel is not outputted.

The panel assembly may be provided with a plurality of spacers configured to support portions between the front panel, the rear panel, and the light guide plates, and the first bezel may have a width ranging from an outer end of the front panel to a position corresponding to an end of each of the plurality of spacers.

The second bezel may have a variable width.

The panel assembly may be provided with a plurality of spacers configured to support portions between the front panel, the rear panel, and the light guide plate and include a third bezel configured to output an opaque color along a circumference of the display and shield coupled portions of at least the spacers, and the third bezel may have a width that increases when the light is turned on and decreases when the light is turned off.

A method of manufacturing a refrigerator according to an embodiment includes: diffusing a light diffuser into an acrylic monomer to mix a light guide plate material; injecting the mixed light guide plate material into a plate assembly; curing the plate assembly; and thermally treating the cured plate assembly.

The plate assembly may include a glass plate.

The light diffuser may include spherical particles.

The light diffuser may have a particle size of about 70 μm to about 100 μm.

The light diffuser may include at least one of calcium carbonate ($CaCO_3$) or titanium dioxide ($TiO_2$).

The curing of the plate assembly may include putting the plate assembly into a water tank in which water is stored.

The curing of the plate assembly may include putting the plate assembly into a curing tank in which an UV lamp is provided.

The details of one or more embodiments are set forth in the accompanying drawings and the description below. Other features will be apparent from the description and drawings, and from the claims.

DETAILED DESCRIPTION OF THE EMBODIMENTS

Hereinafter, detailed embodiments of the present disclosure will be described in detail with reference to the accompanying drawings. However, the scope of the present disclosure is not limited to proposed embodiments, and other regressive inventions or other embodiments included in the scope of the spirits of the present disclosure may be easily proposed through addition, change, deletion, and the like of other elements.

Figure 1:
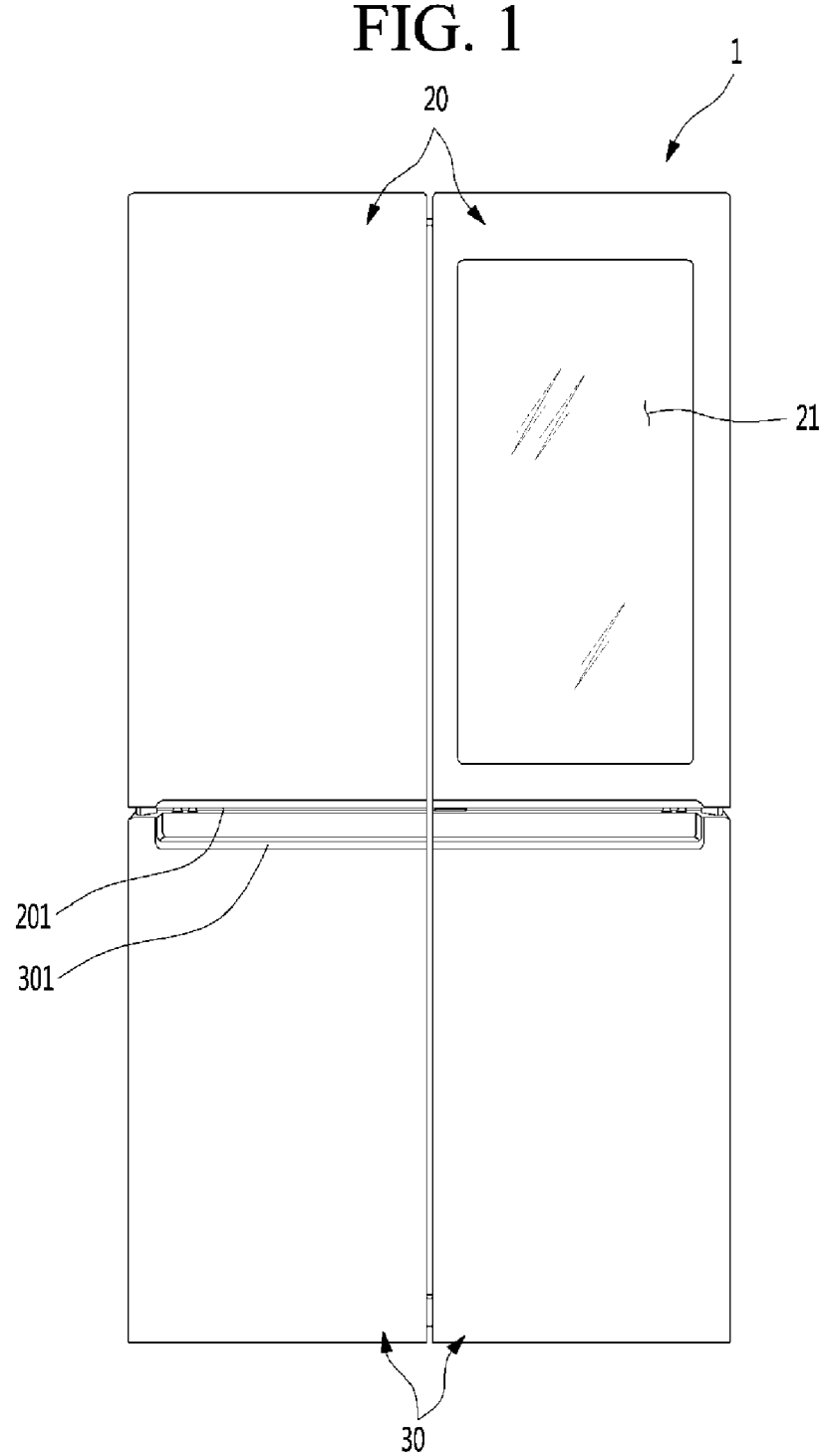
FIG. 1 is a front view of a refrigerator according to an embodiment.
Figure 2:
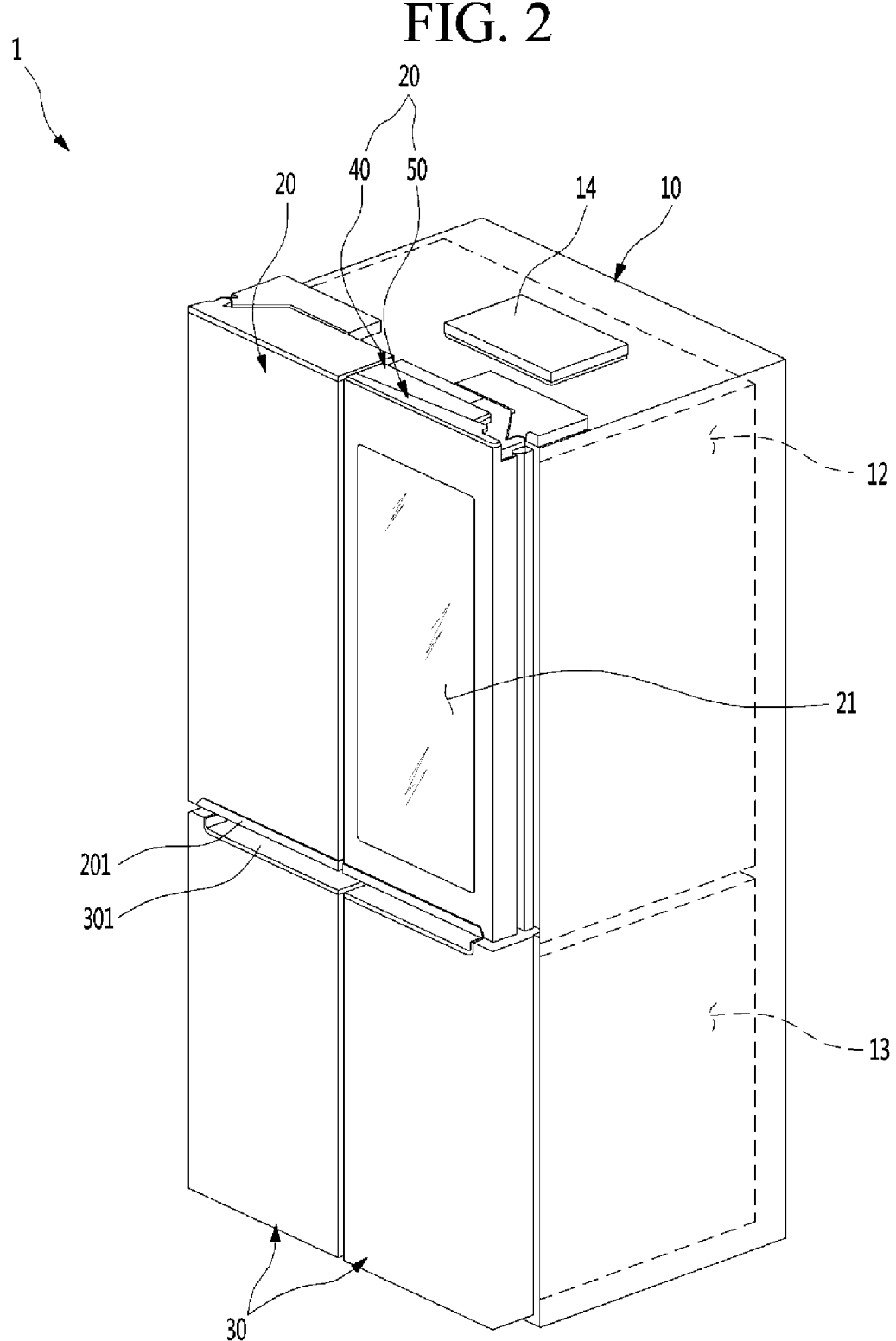
FIG. 2 is a perspective view of the refrigerator.

FIG. 1 is a front view illustrating a refrigerator according to a first embodiment of the present disclosure. Further, FIG. 2 is a perspective view illustrating the refrigerator.

As illustrated in the drawings, an outer appearance of a refrigerator 1 according to the first embodiment of the present disclosure may be formed by a cabinet 10 defining a storage space and doors configured to open/close the storage space.

An interior of the cabinet 10 may be vertically partitioned by a barrier 11 (in FIG. 6), a refrigerating chamber 12 may be formed above the cabinet 10, and a freezing chamber 13 may be formed below the cabinet 10.

Further, a control unit 14 configured to control an overall operation of the refrigerator 1 is formed on an upper surface of the cabinet 10. The control unit 14 may be configured to control electrical components for selectively seeing through a see-through part 21 and outputting a screen as well as a cooling operation of the refrigerator 1.

The doors may include refrigerating chamber doors 20 and freezing chamber doors 30. The refrigerating chamber doors 20 may be configured to open/close an opened front surface of the refrigerating chamber 12 through pivoting, and the freezing chamber doors 30 may be configured to open/close an opened front surface of the freezing chamber 13 through pivoting.

Further, the pair of refrigerating chamber doors 20 are provided on left and right sides, and the refrigerating chamber 12 may be shielded by the pair of doors. Further, the pair of freezing chamber doors 30 are provided on left and right sides, and the freezing chamber 13 may be opened/closed by the pair of doors. Of course, the freezing chamber doors 30 may be configured to be drawable in a drawer form if necessary, and one or more freezing chamber doors 30 may be configured.

Meanwhile, although an example where a French-type door that includes a pair of doors and opens/closes one space by rotating the doors is applied to a bottom freeze-type refrigerator in which a freezing chamber 13 is provided below is illustratively described in the embodiment of the present disclosure, the present disclosure may be applied to all types of refrigerators having doors regardless of types of the refrigerators.

Further, depressed handle grooves 201 and 301 may be formed at a lower end of the refrigerating chamber doors 20 and an upper end of the freezing chamber doors 30. A user inserts a hand into the handle grooves 201 and 301 to open/close the refrigerating chamber doors 20 or the freezing chamber doors 30.

Meanwhile, at least one door may be formed to see through an interior of the refrigerator 1. The see-through part 21, through which a storage space on a rear surface of the door and/r an internal space of the refrigerator 1 may be seen, may be formed in the refrigerating chamber door 20. The see-through part 21 may form at least a part of the front surface of the refrigerating chamber door 20. The see-through part 21 may be selectively transparent or opaque depending on manipulation by the user, and the user may accurately identify food accommodated in the refrigerator 1 through the see-through part 21.

Further, in the embodiment of the present disclosure, a case where the see-through part 21 is formed in the refrigerating chamber door 20 is described as an example. However, the see-through part 21 may be provided in various other types of refrigerator doors including the freezing chamber doors 30 according to the structure and shape of the refrigerator 1.

Also, the inside of the refrigerator, which is seen by the see-through part 21, may be defined as at least one of a storage space of the door 20, which is defined by the door 20, or the storage space defined by the cabinet 10.

Also, the transparency and opacity of the see-through part 21 may not mean a completely transparent state and a complete opaque state but a state in which the inside of the refrigerator is well seen or is more illuminated and a state in which the inside of the refrigerator is not well seen or is relatively more darkened.

Figure 3:
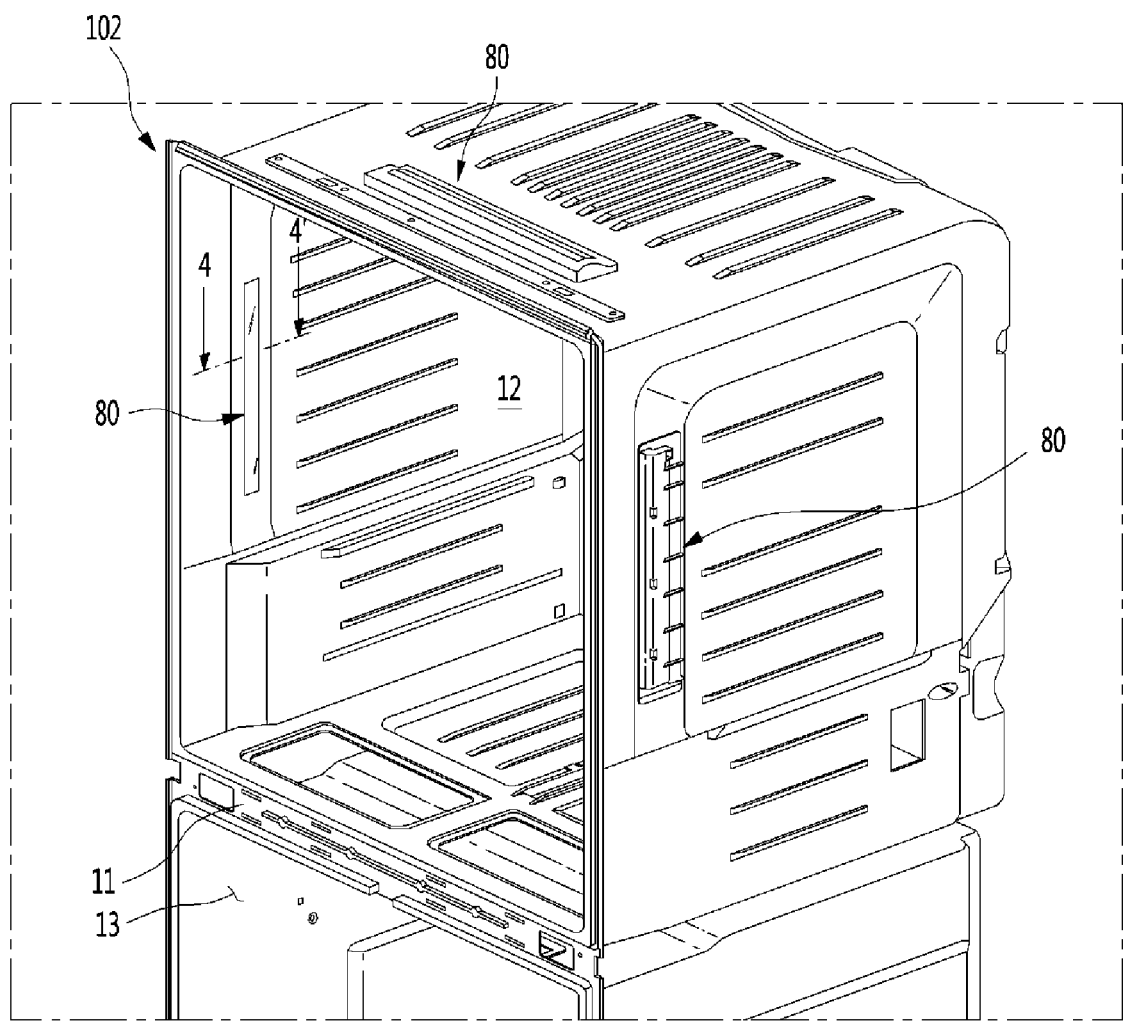
FIG. 3 is a perspective view of a storage chamber light mounted on an inner case of the refrigerator.
Figure 4:
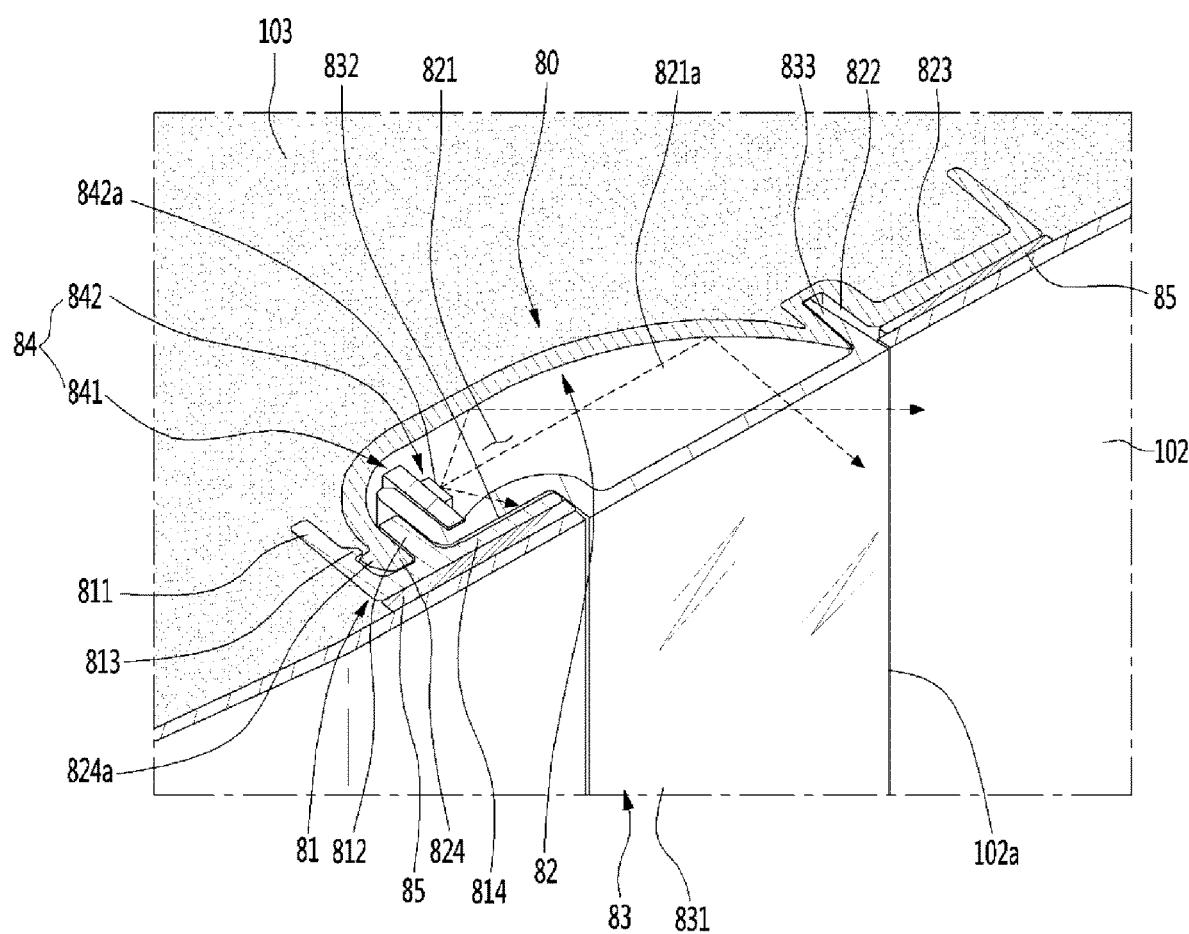
FIG. 4 is a cross-sectional view taken along line 4-4' of FIG. 3.

FIG. 3 is a perspective view of a storage chamber light mounted on an inner case of the refrigerator. FIG. 4 is a sectional view taken along line 4-4' of FIG. 3.

As illustrated in the drawings, the inner case 102 may define an inner surface of the storage space. Also, the barrier 11 may be disposed in the inner case 102 to divide the storage space into the refrigerating chamber 12 and the freezing chamber 13.

A groove or protrusion shape required for mounting an accommodation member 131 may be provided in an inner side-wall of the inner case 102. Also, a storage chamber light 80 for illuminating the inside of the storage space may be mounted on the inner case 102. The storage chamber light 80 may be called a "first light" as a light within the refrigerator.

A case opening 102a for mounting the storage light 80 may be defined in the inner side-wall of the inner case 102. The case opening 102a may be opened to a position on which the storage chamber light 80 is mounted, be defined in each of both left/right surfaces or top and bottom surfaces of the inner case 102, and be disposed to face the inside of the refrigerator. Thus, the inside of the refrigerator may be illuminated by light emitted from the storage chamber light 80.

Although not shown, the storage chamber light 80 may be provided inside the freezing chamber 13 as well as the refrigerating chamber 12 to illuminate the freezing chamber 13.

The case opening 102a may be disposed on a front portion of the inner side-wall of the inner case 102. When an opening signal of the doors 20 and 30 is inputted, an opened region of the refrigerating chamber 12 or the freezing chamber 13 may be illuminated.

In addition, when the inside of the refrigerator is viewed through the see-through part 21, the storage chamber light 80 may be turned on or off together with the door light 57 to brighten the storage space of the refrigerator so that foods stored in the storage space of the refrigerator are more clearly visible through the see-through part 21.

Also, the storage chamber light 80 and the case opening 102a may vertically or horizontally extend to provide an amount of light, which is enough to illuminate the storage space of the refrigerator. The case opening 102a may have a size less than the storage chamber light 80. For example, the case opening 102a may have a size that is equal to or less than that of a light cover 83 constituting the storage chamber light 80 so that only the light cover 83 is exposed in the refrigerator, and a remaining portion of the storage chamber light 80 is covered by the inner case 102.

Also, an outer surface (a light emitting surface) of the light cover 83 exposed through the case opening 102a may have substantially the same plane as the inner case 102. That is, the outer surface of the light cover 83 exposed to the inside of the refrigerator and the inner surface of the inner case 102 may be disposed without a stepped portion therebetween to provide a smart outer appearance, and other portion except for coupling lines around the light cover 83 and the case opening 192a may not be exposed.

The storage chamber light 80 may include light cases 81 and 82 defining an overall outer appearance and a light cover 83 coupled to the light cases 81 and 82. Also, the storage chamber light 80 may be mounted on the inner case 102 in a state of being assembled. The light cover 83 may be inserted through the case opening 102a so as to be assembled in the state in which at least the light cases 81 and 82 are mounted on the inner case 102.

That is, the light cases 81 and 82 of the storage chamber light 80 may be mounted first on the inner case 102, and a forming solution may be injected into the cabinet 10 to form a heat insulation material 103. Then, the light cover 83 may be assembled to complete the assembly of the storage chamber light 80.

Thus, when the storage chamber light 80 is required to be serviced after being mounted, only the light cover 83 may be easily separated from the inside of the refrigerator without detaching the entire storage chamber light 80 so that the service is easily performed.

The light cases 81 and 82 may include a main case defining a recessed space for accommodating the light emitting member 84 and a sub case 81 coupled to the main case 82 to fix and shield one side of the light cover 83. The main case 82 and the sub case 81 may be closely attached to an outer surface of the inner case 192 in a state in which the main case 82 and the sub case 81 are coupled to each other.

Since the light cases 81 and 82 are configured by coupling the main case 82 to the sub case 81, the recessed spaces of the light cases 81 and 82 and the structure for the coupling of the light cover 83 may be easily molded.

In more detail, the main case 82 may be injection-molded by using a plastic material and be coupled to the sub case 81 to form the light cases 81 and 82. Also, the main case 82 may be constituted by a main circumferential part 823 and a recess part 821 on a whole.

The recess part 821 may be recessed to define a space in which the light emitting member 84 is accommodated and be defined inside the main circumferential part 823 to define the recessed space. Also, a reflection surface 821a that is inclined or rounded may be disposed on an inner surface of the recess part 821. The reflection surface 821a may reflect light emitted from the light emitting member 84 so that the light passes through the light cover 83. Also, painting, coating, or deposition may be performed on the reflection surface 821*a* to improve an reflection effect.

The reflection surface 821*a* may be rounded or inclined to be limited to a position facing an end on which the light emitting member 84 is mounted, thereby inducing the light toward a light emitting part 831 of the light cover 83. Alternatively, the reflection surface 821*a* may be disposed on the entire inside of the recess part 821.

A cover accommodation part 822 extending in a vertical direction may be provided in one end of the recess part 821. The cover accommodation part 822 may be recessed to accommodate an end 833 of the light cover 83, thereby fixing and supporting the end 833 of the light cover 83. Also, a coupling part 824 may be disposed on the other end of the recess part 821 facing the cover accommodation part 822. A protrusion 814*a* restricted and hooked with a protrusion 813 of the sub case 81 may be disposed on the coupling part 824 so that the main case 82 and the sub case 81 are coupled to each other.

The sub case 81 may be disposed on one end of the main case 82 and coupled to the main case 82 to constitute the light cases 81 and 82. The sub case 81 may include a shield part 814 contacting the inner case 102 and an external extension part and an internal extension part 812, which extend from a rear surface of the shield part 814. Also, the coupling part 824 of the main case 82 may be inserted between the external extension part 811 and the internal extension part 812 to couple the main case 82 to the sub case 81.

The shield part 814 may provide a surface contacting the inner surface of the inner case 102 to extend toward the case opening 102*a*. The shield part 814 may adhere to the inside of the inner case 102 by an adhesion member 85. The shield part 814 may further extend toward a case opening 102*a* rather than the light emitting member 84 to prevent the light emitted from the light emitting member 84 from being directly emitted to the inside of the refrigerator.

Particularly, the shield part 814 may minimize a phenomenon in which the light emitted from the light emitting member 84 is directly emitted in a direction in which the panel assembly 60 of the sub-door 50 is disposed. That is, a portion of the light emitted from the light emitting member 84 may be emitted to the light guide plate 64, and thus, the shield part 814 may be disposed in a region through which the light emitted to the light guide plate 64 passes to prevent the light emitted from the light emitting member 84 from being directly emitted toward the light guide plate 64.

Thus, the light guide plate inside the panel assembly 60 may illuminate the storage space of the refrigerator by the light emitted from the light emitting member 84 but be prevented from being opaque.

The shield part 814 may contact a stepped portion 832 formed on a top surface of the light cover 83 to maintain the fixed state of the light cover 83 and also shield the light emitting member 84 so as not to be exposed to the outside.

The shield part 814 may not be provided as one component of the light cases 81 and 82, and the inner case 102 disposed at a corresponding position may be defined as the shield part. That is, one side of the inner case 102 corresponding to the case opening 102*a* in the light emitting member 84 may serve as the shield part to prevent the light emitted from the light emitting member 84 from being directly emitted toward the light guide plate 64, thereby minimizing an amount of light emitted toward the light guide plate 64.

The light cover 83 may be mounted on the light cases 81 and 82 and configured so that the light emitted from the light emitting member 84 is transmitted to the inside of the refrigerator. Also, the light emitting member 84 emitting light may be coupled to the light cover 83.

The light cover 83 and the light emitting member 84 may be coupled to each other and be mounted on or separated from the light cases 81 and 82 in the state in which the light cover 83 and the light emitting member 84 are coupled to each other.

The light emitting member 84 may be disposed at a position facing the reflection surface 821*a* of the recess part 821 to emit light toward the reflection surface 821*a*. Thus, the light passing through the light cover 83 may be reflected by the reflection surface 821*a*, and thus, the storage chamber light 80 may emit light in the form of surface emission.

Also, the light emitting member 84 may be disposed in a direction crossing the light guide plate 64. That is, the light emitting member 84 may be disposed at a rear side with respect to the light guide plate 64 and also be disposed to face the rear side. Thus, most of the light emitted from the light emitting member 84 may be emitted to the rear side with respect to the light guide plate 64 to minimize an amount of light emitted to the light guide plate 64. Furthermore, the light directly emitted toward the light guide plate 64 may be shield by the shield part 814.

The light emitting member 84 may have a structure in which a plurality of LEDs 842 are mounted on a PCB 841. The plurality of LEDs 842 are continuously disposed in a longitudinal direction of the light cover 83. The light emitting member 84 may not be fixed to the light cover 83 but may be fixed to be mounted on the light cases 81 and 82.

Each of the LEDs 842 may have a light emitting surface 842*a* emitting light. The light emitting surface 842*a* may be disposed in parallel to the light guide plate 64 to face a rear side with respect to the light guide plate 64. Thus, most of the light emitted from the LEDs 842 may be emitted to the rear side with respect to the light guide plate 64.

Figure 5:
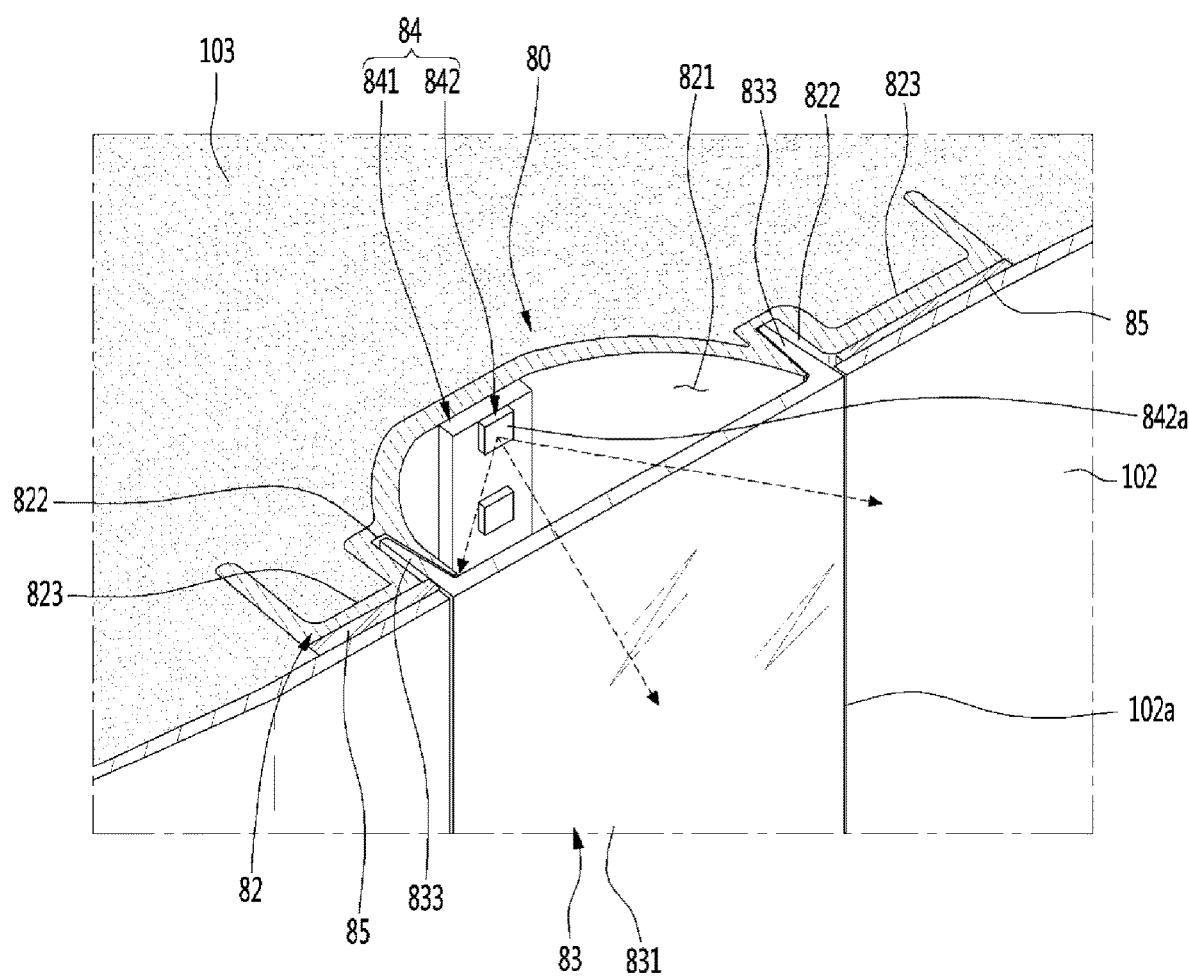
FIG. 5 is a cross-sectional view illustrating another example of the storage chamber light.

FIG. 5 is a cross-sectional view illustrating another example of the storage chamber light.

As illustrated in the drawing, the storage chamber light 80 may include a light case, a light emitting member 84, and a light cover 83. A circumferential part 823 adhering to a rear surface of the inside of the refrigerator by the adhesion member 85 may be provided on each of both sides of the light case 81, and a recess part 821 may be defined in a center of the circumferential part 823 to define a space in which the light emitting member 84 is accommodated.

Also, a cover accommodation part 822 into which both ends 833 of the light cover 83 are inserted may be provided in the circumferential part of the light case 81. Thus, in the state in which the light case 83 is fixed to the side-wall of the inside of the refrigerator, the light emitting member 84 may be accommodated in the recess part 821, and then, the light cover 83 may be mounted to shield the recess part 821 and the light emitting member 84.

Here, the light emitting member 84 may be disposed in a direction facing the light cover 83 to emit light toward the light emitting part 831 of the light cover 83 exposed to the outside of the inner case 102. Thus, the light cover 83 may emit light to illuminate the inside of the refrigerator.

Although the light emitting member 84 is disposed in the direction facing the light cover 83, the light emitting member 84 may be mounted in the recess part 821 and thus disposed at the outer side of the internal space of the refrigerator. Thus, the light emitted from the light emitting surface 842*a* that is a surface onto which the light emitted from the light emitting member 84 is emitted may be spread at a predetermined angle, and a portion of the light, i.e., the light emitted toward the rear surface of the door 50 may be blocked. Thus, the light emitted from the light emitting member 84 may not be directly emitted toward the light guide plate 64.

The recess part 821 may have a recessed depth that is set so that the light of the light emitting member 84 is directly emitted toward the light guide plate 64 in consideration of the above-described structure. For example, the recess part 821 may be recessed to a depth of about 10 mm to about 30 mm with respect to the inner case 102.

The light emitting member 84 may be disposed as illustrated in FIGS. 4 and 5 and also be disposed at various angles within a range in which the light emitted from the light emitting member 84 is directly emitted to the light guide plate 64 to illuminate the inside of the refrigerator.

Figure 6:
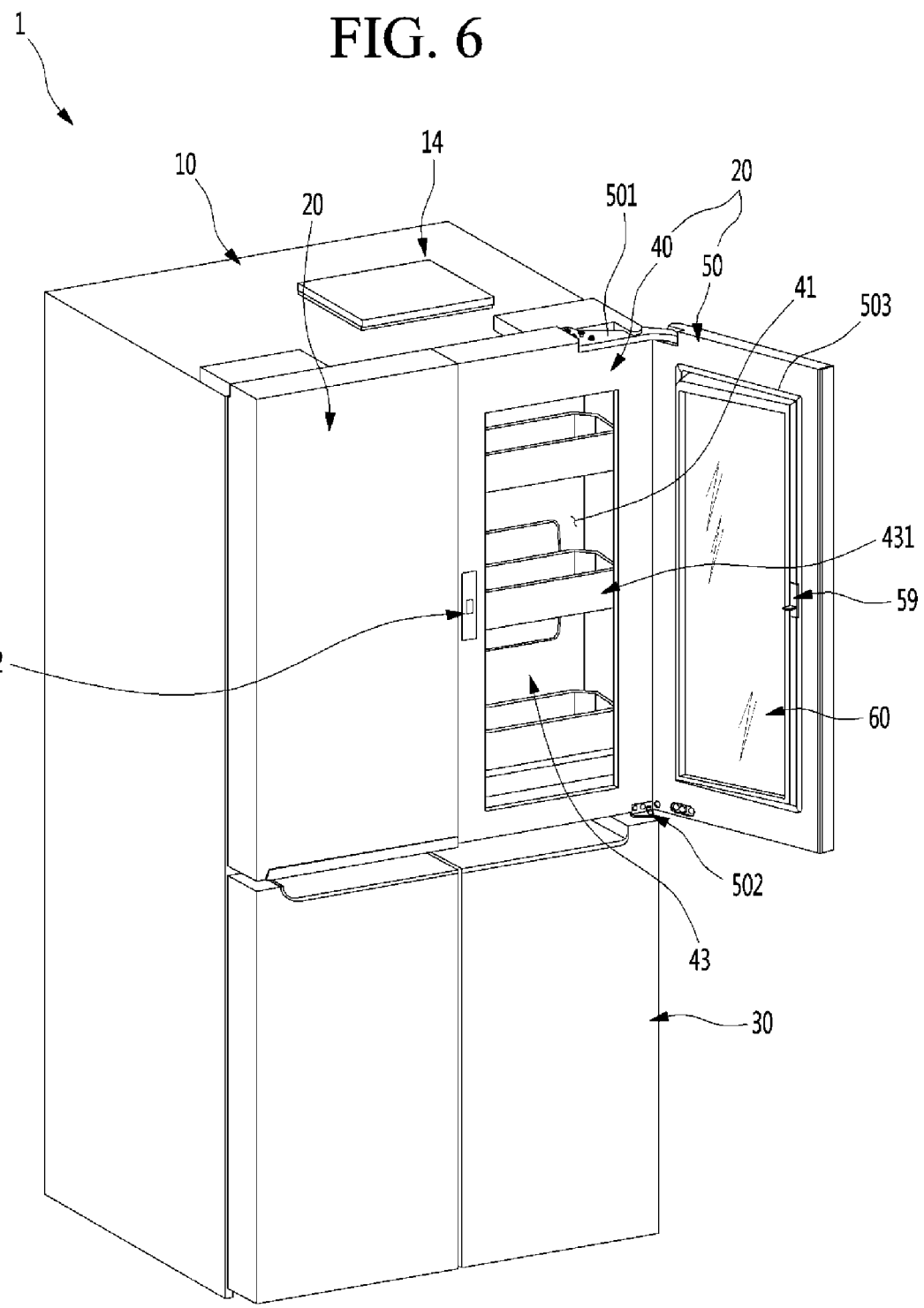
FIG. 6 is a perspective view of the refrigerator with a sub-door opened.
Figure 7:
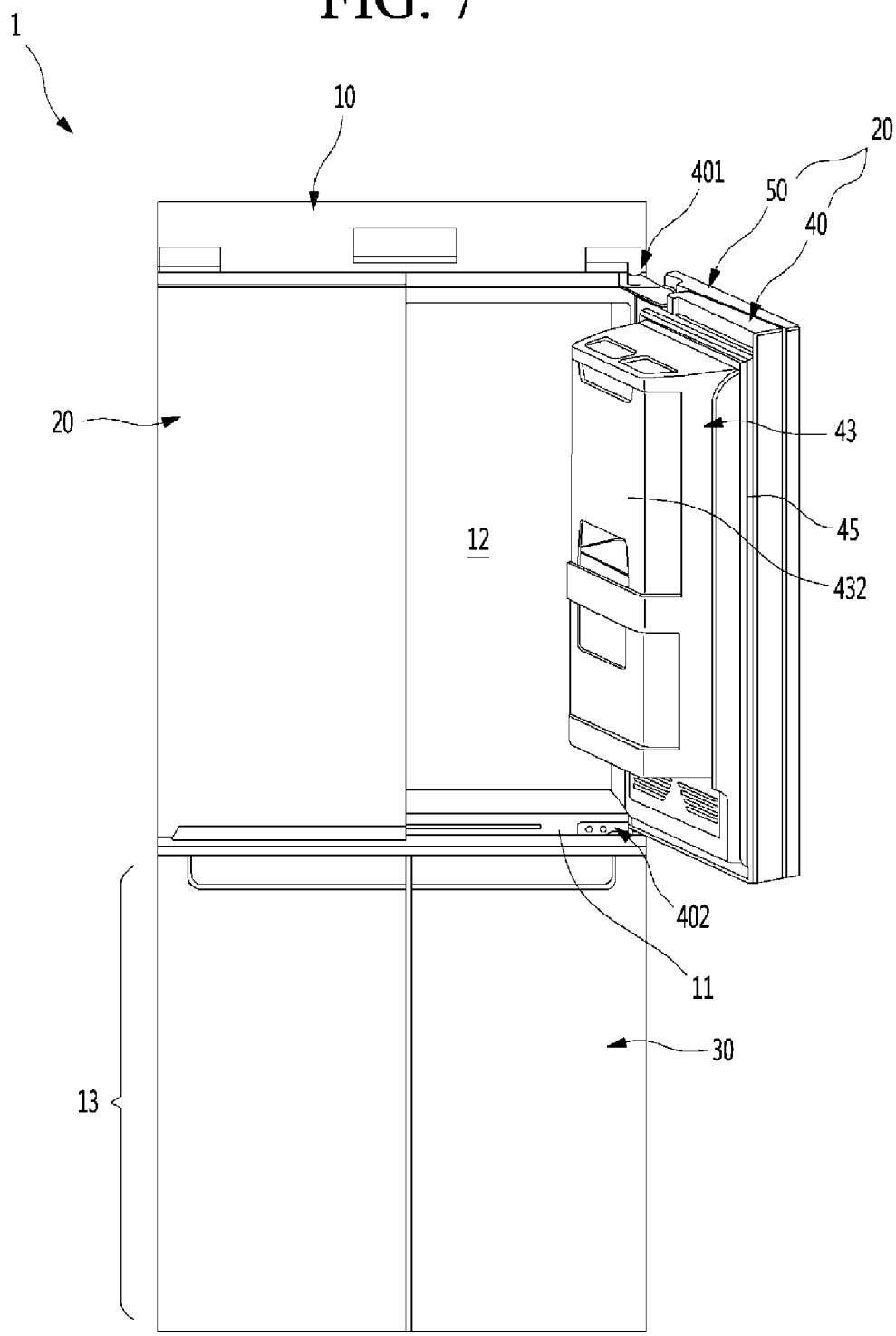
FIG. 7 is a perspective view of the refrigerator with a main door opened.

FIG. 6 is a perspective view illustrating a state in which a sub-door of the refrigerator is opened. Further, FIG. 7 is a perspective view illustrating a state in which a main door of the refrigerator is opened.

As illustrated in the drawings, the right refrigerating chamber door 20 (when viewed in FIG. 6) of the pair of the refrigerating chamber doors 20 may be dually opened/closed. In detail, the right refrigerating chamber door 20 may include a main door 40 configured to open/close the refrigerating chamber 12 and a sub-door 50 rotatably arranged in the main door 40 to open/close an opening 41 of the main door 40.

The main door 40 may have the same size as that of the left refrigerating chamber door 20 (when viewed in FIG. 1) of the pair of refrigerating chamber doors 20 and may be rotatably mounted on the cabinet 10 by an upper hinge 401 and a lower hinge 402 to open/close at least a portion of the refrigerating chamber 12.

Further, an opening 41 opened to have a predetermined size is formed in the main door 40. Door baskets 431 may be mounted on a rear surface of the main door 40 as well as inside the opening 41. At this time, the opening 41 may be formed to occupy most of the front surface of the main door 40 except for a portion of the periphery of the main door 40.

Further, a main gasket 45 is provided at a periphery of the rear surface of the main door 40 to prevent cold air inside the cabinet 10 from being leaked when the main door 40 is opened/closed.

The sub-door 50 may be pivotably mounted on the front surface of the main door 40 to open/close the opening 41. Thus, the opening 41 may be exposed through opening the sub-door 50.

The size of the sub-door 50 is equal to the size of the main door 40 so that the sub-door 50 may shield the entire front surface of the main door 40. Further, in a state in which the sub-door 50 is closed, the main door 40 and the sub-door 50 are coupled to each other, so that the size and the shape of the coupled main door 40 and the sub-door is equal to the size and the shape of the left refrigerating chamber door 20. Further, a sub-gasket 503 is provided on the rear surface of the sub-door 50 to seal a space between the main door 40 and the sub-door 50.

A transparent panel assembly 60, through which an interior of the refrigerator may be selectively seen and which may output a screen, is provided at a center of the sub-door 50. Thus, even in a state in which the sub-door 50 is closed, the inner side of the opening 41 may be seen and may be output. The see-through part 21 may be defined as a portion on the sub-door 50, through which the interior of the refrigerator 1 is seen, and may not necessarily coincide with the entire transparent panel assembly 60.

The transparent panel assembly 60 may be changed to a transparent state or an opaque state depending on manipulation by the user. Thus, only when the user wants to make the transparent panel assembly 60 be transparent, the transparent panel assembly 60 becomes transparent so that the interior of the refrigerator 1 is visualized, and when the user does not want to make the transparent panel assembly 60 be transparent, the transparent panel assembly 60 may be maintained in an opaque state. Further, the screen may be output in a state in which the transparent panel assembly 60 is in a transparent state or an opaque state.

In the embodiment of the present disclosure, the transparent panel assembly 60 is configured to shield an opened portion of the sub-door 50. However, according to types of the door, even when one door is configured as in the right door 20 of the refrigerating chamber 12, an opening may be formed in the door 20, and the transparent panel assembly may be mounted to shield the opening of the door 20. That is, it is noted that the transparent panel assembly 60 may be applied to all types of doors, through which an opening is formed, regardless of the shape of the refrigerator and the shape of the door.

As a sub-upper hinge 501 and a sub-lower hinge 502 are provided at an upper end and a lower end of the sub-door 50, respectively, the sub-door 50 may be pivotably mounted on the front surface of the main door 40. Further, an opening device 59 may be provided in the sub-door 50, and a locking unit 42 may be provided in the main door 40 corresponding to the opening device 59. Thus, the sub-door 50 may be maintained in a closed state by coupling between the opening device 59 and the locking unit 42, and when the opening device 59 and the locking unit 42 is uncoupled from each other by manipulation of the opening device 59, the sub-door 50 may be opened with respect to the main door 40.

Further, a damping device 504 (in FIG. 9) may be provided at a lower end of the sub-door 50. The damping device 504 may be located at a lower lateral edge of the sub-door 50, which is adjacent to the sub-lower hinge 502 such that an impact when the heavy sub-door 50 having is closed is absorbed by the transparent panel assembly 60.

Meanwhile, a storage case 43 may be provided on the rear surface of the main door 40. The plurality of door baskets 431 may be arranged in the storage case 43, and case doors 432 may be provided in the storage case 43.

Figure 8:
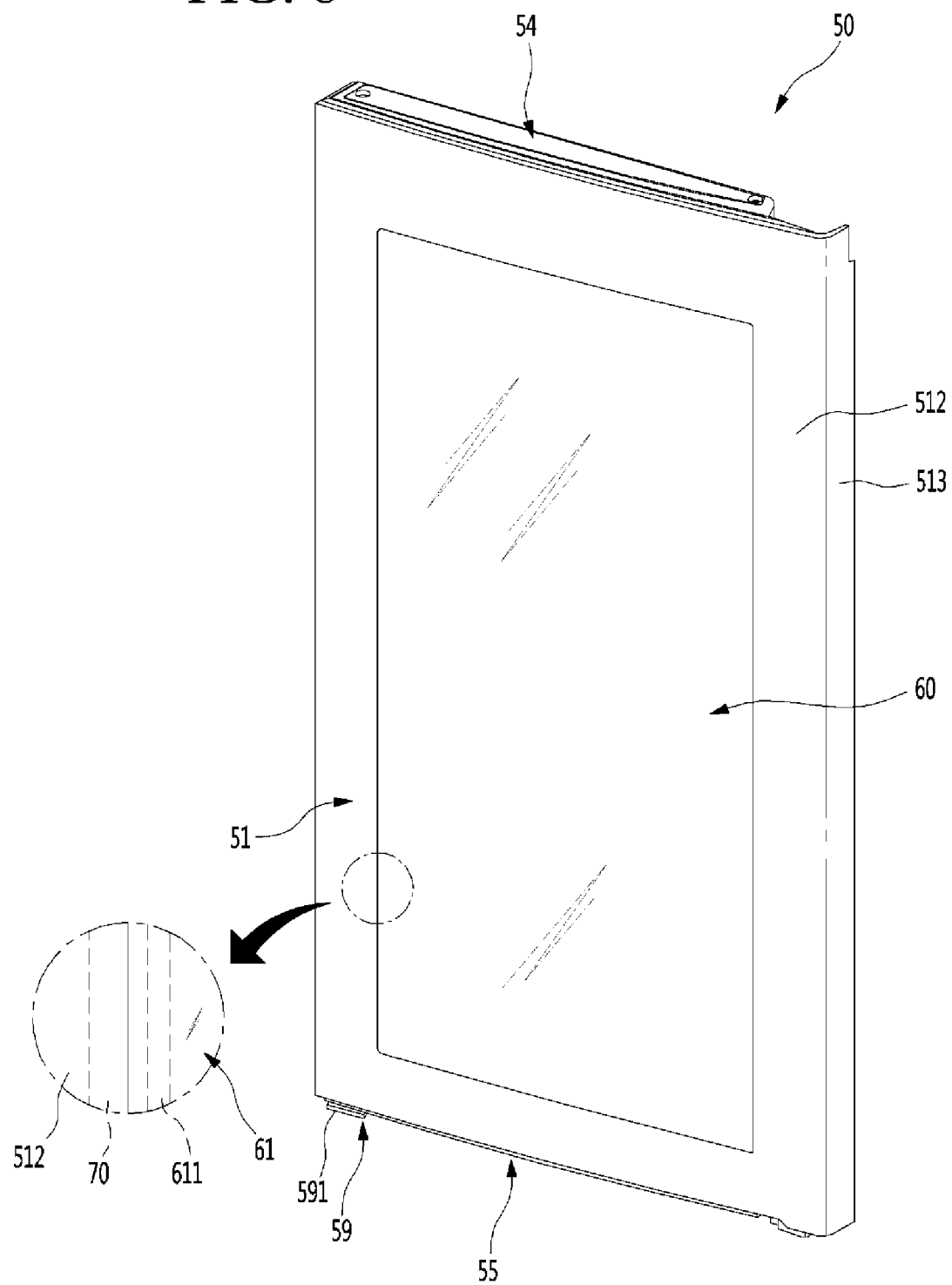
FIG. 8 is a perspective view of the sub-door when viewed from a front side.
Figure 9:
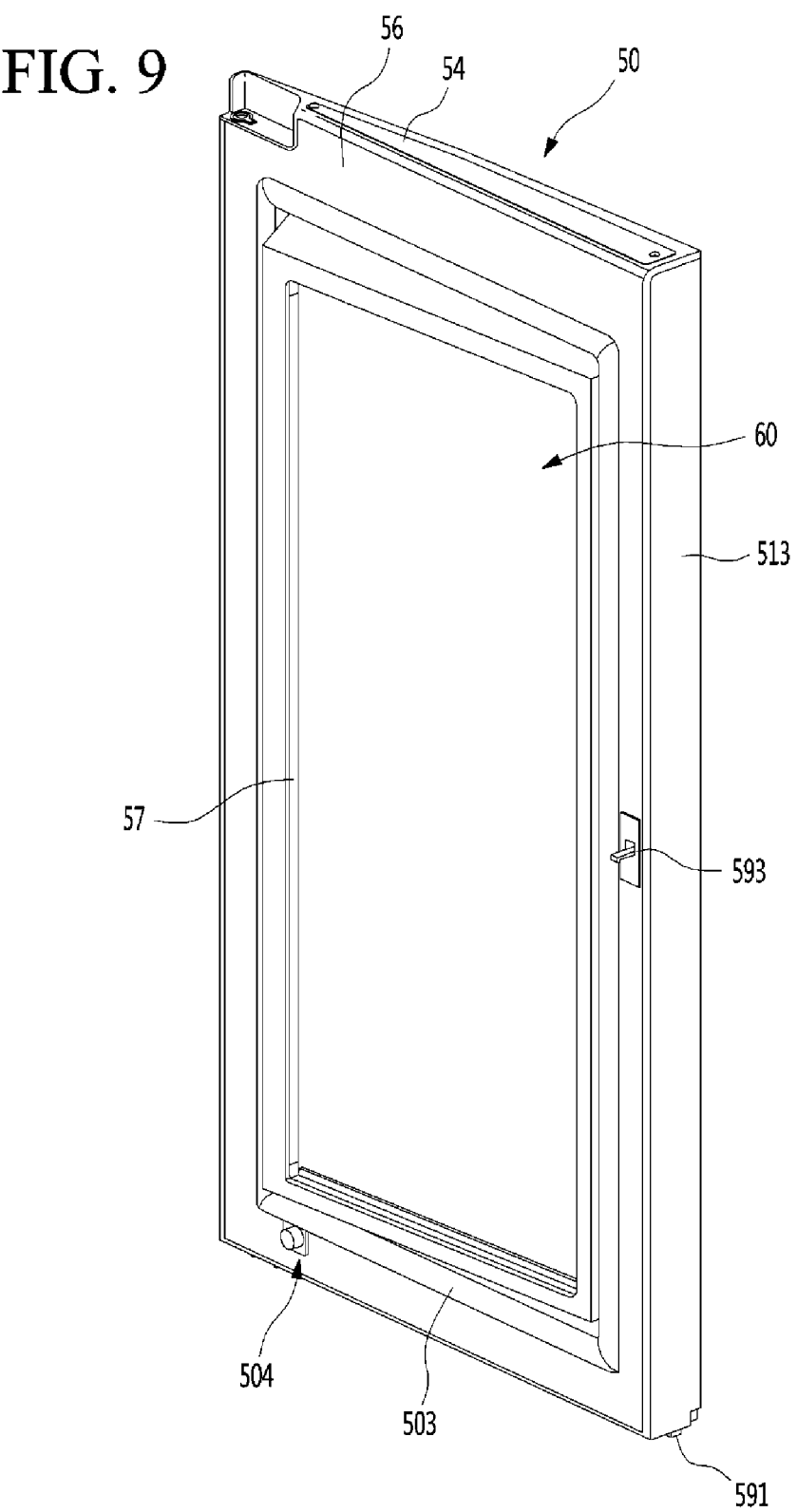
FIG. 9 is a perspective view of the sub-door when viewed from a rear side.
Figure 10:
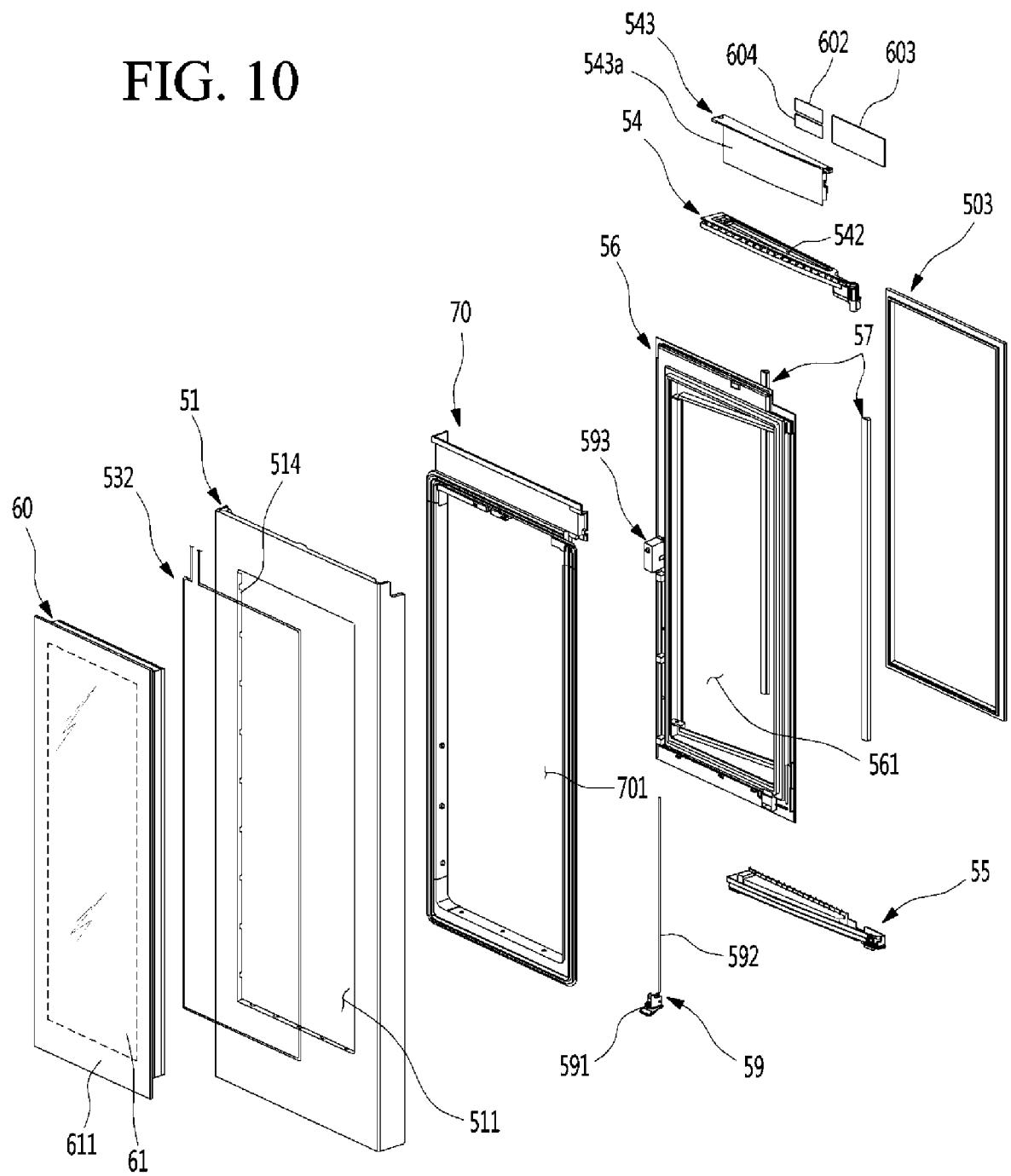
FIG. 10 is an exploded perspective view of the sub-door.

FIG. 8 is a perspective view illustrating the sub-door when viewed from the front side. FIG. 9 is a perspective view illustrating the sub-door when viewed from the rear side. Further, FIG. 10 is an exploded perspective view illustrating the sub-door.

As illustrated in the drawings, the sub-door 50 may include an out plate 51 defining an outer appearance, a door liner 56 spaced apart from the out plate 51, the transparent panel assembly 60 mounted on an opening of the out plate 51 and the door liner 56, and an upper cap decoration 54 and a lower cap decoration 55 defining an upper surface and a lower surface of the sub-door 50, and an outer appearance of the sub-door 50 may be defined by a combination of them.

The out plate 51, which defines the front surface and a portion of a peripheral surface of the sub-door 50, may be formed of a plate-shaped stainless material. The out plate 51 may define a portion of the outer appearance of the sub-door 50 as well as the front surface of the sub-door 50. Further, the out plate 51 may be formed of the same material as that of the front surfaces of the refrigerating chamber door 20 and the freezing chamber door 30. The front surface of the outer plate 51 may be subjected to various surface treatments such as anti-fingerprint coating, a hair line, coating for realizing a color or a pattern, and attachment of a film.

The outer plate 51 may include a front surface part 512 defining an outer appearance of the front surface thereof, and side surface parts 513 defining outer appearances of side surfaces thereof exposed to the outside. Further, a plate opening 511 may be formed at the center of the front surface part 512, and the plate opening 511 may be shielded by the transparent panel assembly 60. Further, because the interior of the refrigerator 1 may be seen through the transparent panel assembly 60 configured to shield the plate opening 511, the inner side of the plate opening 511 may be referred to as the see-through part 21.

The front surface part 512 may be formed to have a curvature such that the front surface part 512 is lowered as it goes from the central side to the outer side of the refrigerator 1. The front surface part 512 may be rounded to correspond to the front surface of the neighboring refrigerating chamber door 20, and an outer appearance of the front surface of the refrigerator may be overall seen to be in three dimensions.

Further, a bent plate part 514 which is bent rearwards may be formed along a peripheral surface of the plate opening 511. The bent plate part 514 may be formed along the periphery of the plate opening 511, and may extend in a predetermined length such that the bent plate part 514 may be inserted into and fixed to a support frame 70, which will be described below in detail. Thus, the plate opening 511 may be also defined by the bent plate part 514.

The side surface parts 513 which are bent rearwards may be formed at opposite ends of the front surface part 512. The side surface parts 513 may define outer appearances of the side surfaces of the sub-door 50. Further, ends of the side surface parts 513 may be bent inwards to be coupled to the door liner 56. Further, an upper end and a lower end of the front surface part 512 may be also bent inwards to be coupled to the upper cap decoration 54 and the lower cap decoration 55.

Meanwhile, an upper end and a lower end of the outer plate 51 may be also bent, and may be coupled to the upper cap decoration 54 and the lower cap decoration 55. Thus, the outer plate 51 may be coupled to the door liner 56, the upper cap decoration 54, and the lower cap decoration 55, to define an outer appearance of the sub-door 50.

The door liner 56 defines the rear surface of the sub-door 50, and a liner opening 561 is formed in an area in which the transparent panel assembly 60 is arranged. Further, a sub-gasket 503 configured to seal a gap between the sub-door 50 and the main door 40 may be mounted on the rear surface of the door liner 56.

Further, door lights 57 may be provided on opposite sides of the liner opening 561. The door lights 57 may be configured to illuminate the rear surface of the sub-door 50 and the rear side of the transparent panel assembly 60. The door lights 57 may be referred to as lighting members, and the lighting members may include another light, that is storage chamber light 80, provided inside the storage space to illuminate the interior of the refrigerator 1 as well as the door lights 57. The storage chamber light 80 and the door lights 57 may be referred to "a first light" and "a second light", respectively.

When the door light 57 is turned on, the inside of the storage case 43 may be brightened, and thus, the interior of the refrigerator may be more brightened up than the outside of the refrigerator so that a rear space of the sub-door 50 may be visualized through the panel assembly 60.

The door light 57 may be disposed on both sides of the panel assembly 60 in directions facing each other. The mounted position of the door light 57 may variously vary as long as the door light 57 has sufficient brightness at the rear side of the sub-door. When the door light 57 mainly illuminates the inside of the refrigerator so that the inside of the refrigerator is visible through the see-through part 21, the door light 57 may be turned on. Here, the light of the door light 57 may not be emitted to the light guide plate 64 to prevent the see-through part 21 from being blurred by the light emission of the light guide plate 64. The structure and arrangement of the door light 57 will be described below in more detail.

Further, the opening device 59 may be mounted on the door liner 56. The opening device 59 may include a manipulation member 591 exposed to the lower end of the sub-door 50, a rod 592 extending from the manipulation member 591, and a locking member 593 protruding from the rear surface of the door liner 56. The rod 592 moves the locking member 593 by manipulation of the manipulation member 592 by the user, so that the sub-door 50 is selectively restrained to the main door 40, and opening/closing of the sub-door 50 may be manipulated.

The upper cap decoration 54, which defines an upper surface of the sub-door 50, is coupled to upper ends of the outer plate 51 and the door liner 56. The upper surface of the upper cap decoration 54 is opened so that a decoration opening 542 communicating with an upper space of the transparent panel assembly 60 is formed, and is shielded by a decoration cover 543. Further, a printed circuit board (PCB) mounting part 543a is formed in the decoration cover 543, so that PCBs 602, 603, and 604 for operating electrical components inside the transparent panel assembly 60 and the sub-door 50 may be mounted on the PCB mounting part 543a. The PCBs 602, 603, and 604 may be configured in at least one module form, and may be provided in a closed space on an upper side of the sub-door 50.

At this time, the space on the upper side of the sub-door 50 may be partitioned into front and rear spaces by an upper portion of the support frame 70, an insulator 531a may be arranged in the front space, and the PCBs 602, 603, and 604 may be arranged in the rear space. The structure of the space on the upper side of the sub-door 50 will be described with reference to FIG. 34.

The lower cap decoration 55, which defines a lower surface of the sub-door 50, is coupled to lower ends of the outer plate 51 and the door liner 56.

The transparent panel assembly 60 may be arranged between the outer plate 51 and the door liner 56. Further, the transparent panel assembly 60 may be configured to shield the plate opening 511 and tee door liner opening 561. Further, the transparent panel assembly 60 may be selectively manipulated by the user in one of a transparent state, a translucent state, an opaque state, and a screen outputting state.

Thus, the user may selectively see through the internal space of the sub-door 50 through the transparent panel assembly 60, and may view the screen output through the transparent panel assembly 60 as well.

Of course, the transparent panel assembly 60 may not include a display 62 for outputting a screen, and the transparent panel assembly 60 without the display 62 may have the same outer appearance as that of the transparent panel display 60 having the display 62 only with a difference in that the screen is not output.

The support frame 70 configured to support the transparent panel assembly 60 is mounted on a periphery of the plate opening 511 of the outer plate 51. The transparent panel assembly 60 may be fixed and mounted to the outer plate 51 by the support frame 70. In particular, the front surface of the outer plate 51 and the front surface of the transparent panel assembly 60 are arranged on the same extension line, so that the front surface of the sub-door 50 may have a sense of unity.

The support frame 70 has a frame opening 701 formed at a center thereof, and the frame opening 701 is formed to be slightly smaller than the plate opening 511, so as to provide a structure on which the transparent panel assembly 60 may be seated. Further, the frame opening 701 may be formed to be smaller than a front panel 61 and to be larger than a rear panel 65. Thus, when the transparent panel assembly 60 is mounted, the rear panel 65 may sequentially pass through the plate opening 511 and the frame opening 701, and then may be seated on the door liner 56.

Further, the support frame 70 has a coupling structure with the outer plate 51, and the outer plate 51 and an end of the transparent panel assembly 60 may be mounted in close contact with each other. Thus, when the sub-door 50 is viewed from the front side, an end of the outer plate 51 and a periphery of the transparent panel assembly 60 are in close contact with each other, so that a gap between the out plate 51 and the transparent panel assembly 60 is rarely viewed or is viewed in a form of a line, and the outer appearance of the front surface may be viewed as having senses of continuity and unity.

A first bezel 611 shielding the coupling structure around the panel assembly 60 so that predetermined light is not transmitted may be disposed around the panel assembly 60. The first bezel 611 may have a black color to completely shield the inside thereof and may have a predetermined width. Thus, an internal area of the first bezel 611 may be defined as the see-through part 21. Also, a portion of the support fame 70, which supports the circumference of the panel assembly 60, may be disposed on the area of the first bezel 611 and thus shielded so that the inside thereof is not seen from the outside.

Hereinafter, the structures of the transparent panel assembly and the support frame will be described in more detail.

Figure 11:
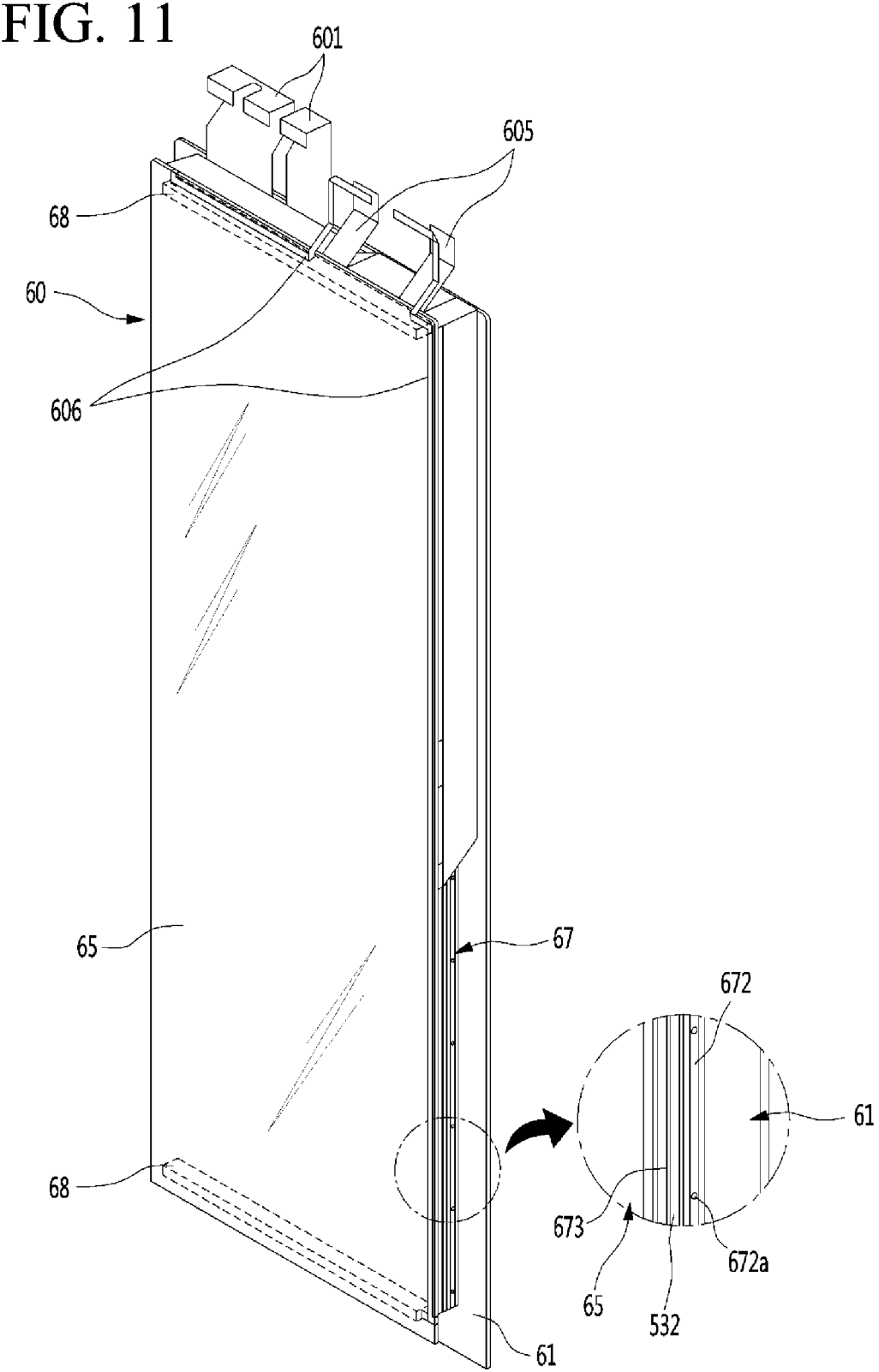
FIG. 11 is a perspective view of a panel assembly according to an embodiment.
Figure 12:
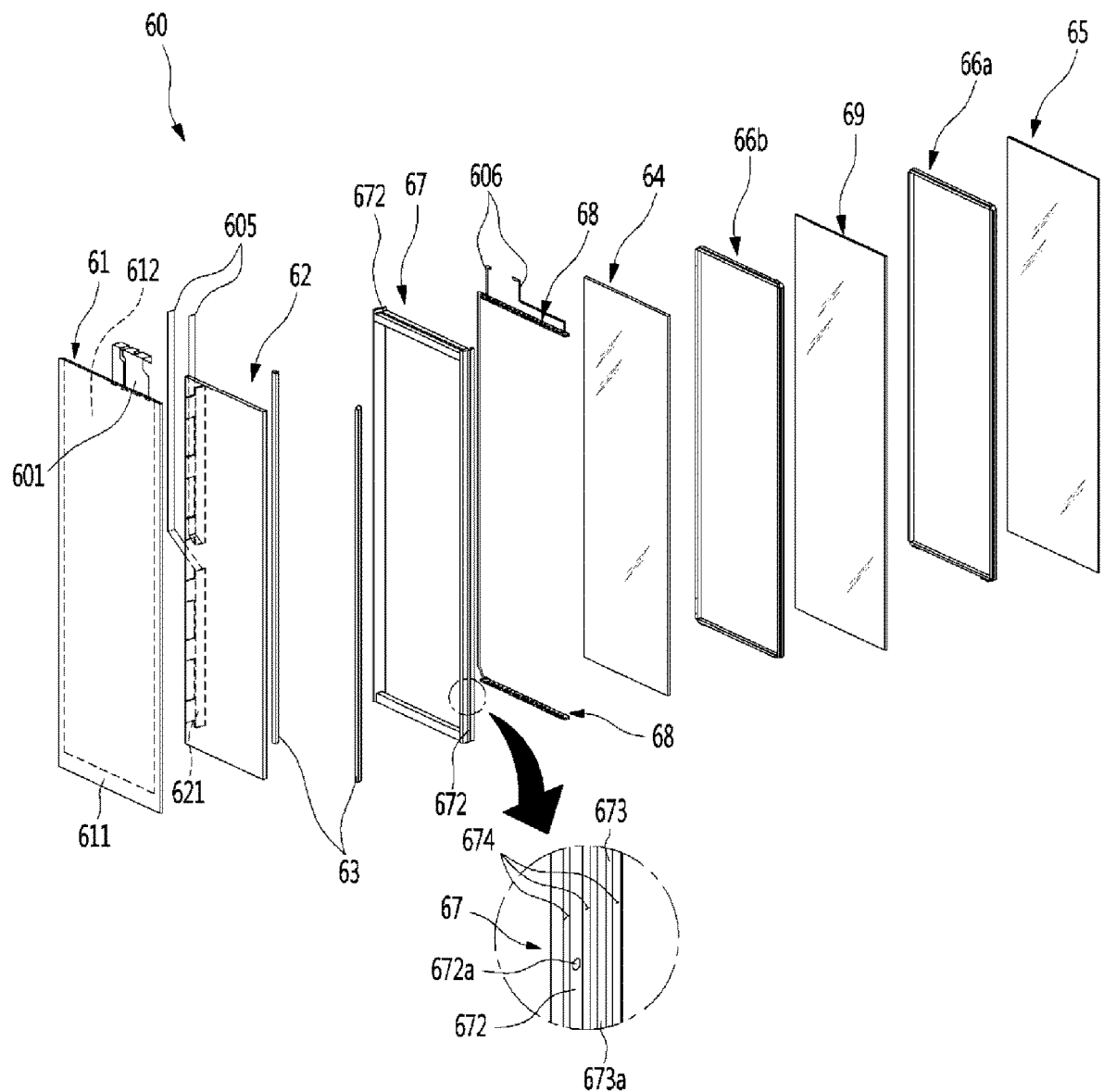
FIG. 12 is an exploded perspective view of the panel assembly.
Figure 13:
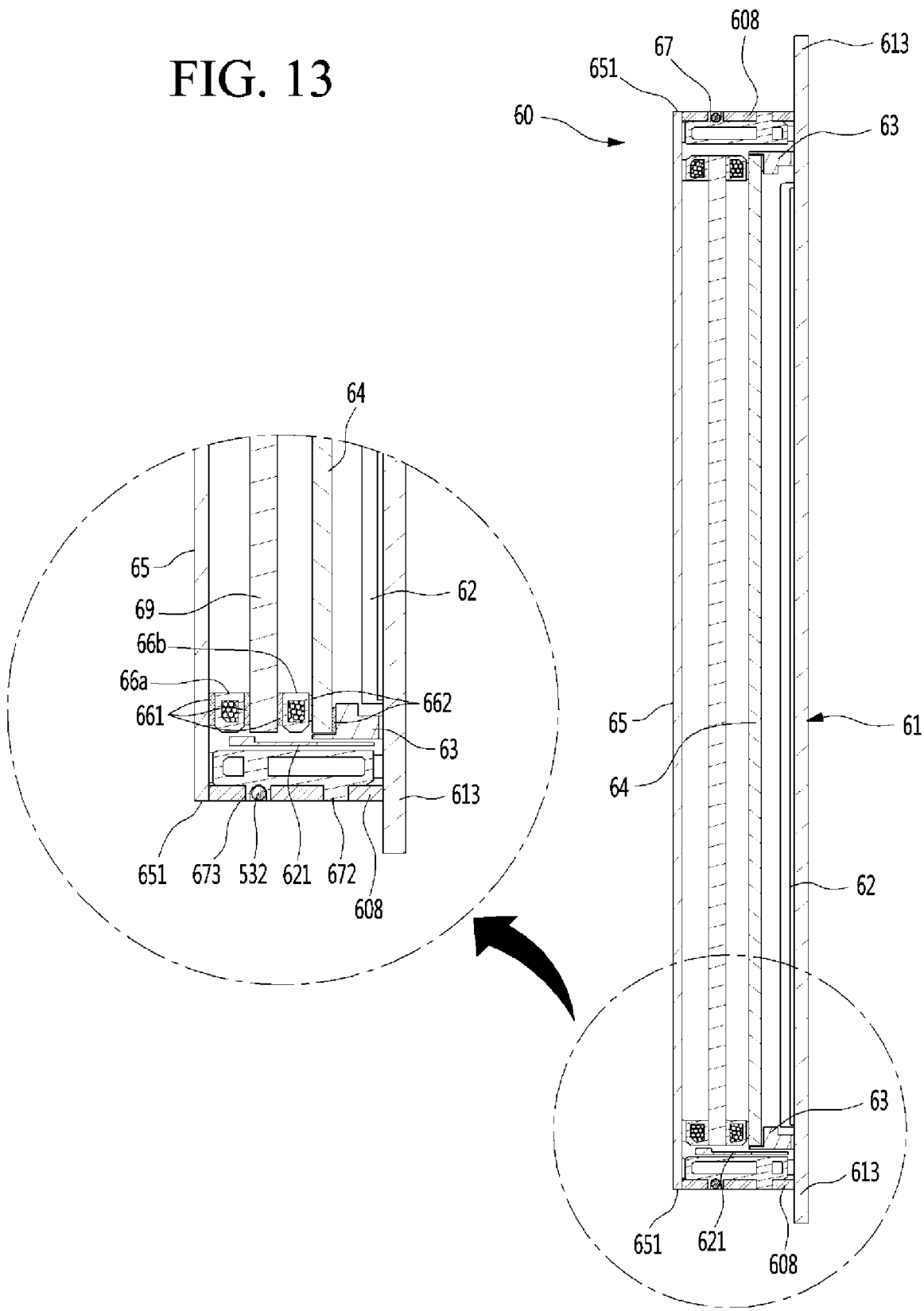
FIG. 13 is a cross-sectional view of the panel assembly.

FIG. 11 is a perspective view illustrating a transparent panel assembly according to the embodiment of the present disclosure. Further, FIG. 12 is an exploded perspective view illustrating the transparent panel assembly. Further, FIG. 13 is a sectional view illustrating the transparent panel assembly.

As illustrated in the drawings, the transparent panel assembly 60 may be formed to have a size in which the transparent panel assembly 60 may shield the plate opening 511 and the liner opening 561 from the inner side of the sub-door 50. Further, the see-through part 21 may be formed such that a space in the refrigerator 1 may be selectively visualized and the screen may be output.

The transparent panel assembly 60 may be configured by a plurality of panels having a shape of a plate, and may be configured such that the panels are spaced apart from each other by at least one spacer at a specific interval. The transparent panel assembly 60 may include the front panel 61 and the rear panel 65 defining at least the front surface and the rear surface thereof, and a spacer connecting the front panel 61 and the rear panel 65 between the front panel 61 and the rear panel 65, and may have a structure in which an additional panel and an additional spacer are further provided in an internal space defined by the spacer.

Also, a portion of the inside of the space defined by the spacers and the panels may provide a heat insulation structure within the panel assembly by forming vacuum or injecting a heat insulation gas.

The transparent panel assembly 60 will be described with reference to the drawings. The outer shape of the transparent panel assembly 60 may be defined by the front panel 61 and the rear panel 65 defining the front surface and the rear surface of the transparent panel assembly 60, and an outer spacer 67 connecting the front panel 61 and the rear panel 65 to each other.

Further, between the front panel 61 and the rear panel 65, the display 62 and a light guide plate 64 may be arranged, a first spacer 63 configured to support the display 62 and the light guide plate 64 may be further provided, and backlights 68 configured to irradiate light to the light guide plate 64 may be provided.

In more detail, the front panel 61, which defines an outer appearance of the front surface of the transparent panel assembly 60, may be formed of transparent glass (for example, blue glass). Of course, the front panel 61 may be formed of another material through which the interior of the refrigerator may be seen and a touch input may be performed.

Further, a film, through which light selectively passes depending on an ON/OFF state of a light inside the refrigerator 1 or a light provided in the sub-door 50 so that the film may be selectively transparent or opaque, may be arranged on the rear surface of the front panel 61.

The front panel may be formed to have a size corresponding to the size of the plate opening 511, and may be formed to be larger than the size of the frame opening 701. Thus, the periphery of the front panel 61 may be supported by the support frame 70. Further, in a state in which the transparent panel assembly 60 is mounted, an end of the front panel 61 may be in contact with an end of the plate opening 511, and a space may not be formed between the plate opening 511 and the front panel 61.

In detail, the front panel 61 may have a front protrusion 613 formed therein to protrude more outward than the rear panel 65. Due to structural characteristics of the front protrusion 613 inserted into and mounted on the front side of the outer plate 51, the front protrusion 613 may protrude more upward/downward/leftward/rightward than the rear panel 65 and the outer spacer 67. Thus, the front panel 61 defining the front surface of the transparent panel assembly 60 may further extend outward the frame opening 701, and thus may be stably supported by the support frame 70. The rear panel 65 and the like as well as the outer spacer 67 may be inserted into the frame opening 701.

Further, the support frame 70 and the outer spacer 67 of the transparent panel assembly 60 may be fastened and coupled to each other through a separate coupling structure or coupling members 78 such as a screw. Thus, when the transparent panel assembly 60 is mounted, the front protrusion 613 may be supported by the support frame 70, and at the same time, the support frame 70 may be coupled to the outer spacer 67, so that the heavy transparent panel assembly 60 may be maintained in a stably fixed and mounted state even when the sub-door 50 is opened/closed.

Meanwhile, the bezel 611 may be formed along a periphery of the rear surface of the front panel 61. The bezel 611 may be formed by printing with an opaque color such as black, and may be formed to have a predetermined width such that the outer spacer 67, the first spacer 63, the heater 532, and the like may be covered without being exposed to the outside. The bezel 611 may be formed to have a width from an outer end of the front panel 61 to the first spacer 63.

A touch sensor 612 may be arranged on the rear surface of the front panel 61. The touch sensor 612 may be formed on the rear surface of the front panel 61 in a printing scheme, and may be configured to detect a touch operation on the front panel by the user. Of course, the touch sensor 612 may employ various other schemes such as a film bonding scheme not the printing scheme, in which input may be performed through a touch on the front panel 61.

A touch cable 601 connected to the touch sensor 612 may be provided at an upper end of the front panel 61. The touch cable 601 may be a flexible film type cable such as a flexible flat cable (FFC) and a flexible print cable or a flexible print circuit board (FPC), and a printed circuit may be printed on the touch cable 601 to form at least a portion of a touch PCB 603. Further, the touch cable 601 may be connected to the touch PCB 603 provided above the sub-door 50.

The touch cable 601 may be connected to the touch sensor 612 and may extend upwards. Further, the touch cable 601 may be configured such that wires are arranged in a base, such as a film, formed of resin, and may upwards extend along the rear surface of the front panel 61. The touch cable 601 may be formed to have a thin thickness and a wide width, which is similar to a sheet, and thus may be flexibly bent.

Further, the touch cable 601 may be configured in a film type, and may have a structure in which an end of the touch cable 601 is easily inserted into a connector of the touch PCB 603 when the touch cable 601 is connected to the touch PCB 603. To achieve this, the touch cable 601 may be bent several times, and the end of the touch cable 601 may be formed toward the connector on the touch PCB 603. Further, the touch cable 601 is bent to be arranged along a wall surface of the internal space of the sub-door 50, so that the space inside the sub-door 50 may be efficiently arranged.

Further, in addition to the touch cable 601, display cables 605 and back-light cables 606 may be formed to have the same structure. In this way, all the cables 601, 605, and 606 formed to have a flat cable shape may extend to an upper end of the transparent panel assembly 60, and may be efficiently arranged on the sub-door 50 having a thin thickness and a wide width. In addition, the cables 601, 605, and 606 may provide a simple connection structure with the PCBs 602, 603, and 604 arranged above the sub-door 50.

Meanwhile, the display 62 may be provided on the rear surface of the front panel 61. The display 62 may be a liquid crystal display (LCD) module configured to output a screen, and may be transparent to be seen through in a state in which the screen is not output.

Source boards 621 may be provided at one end of opposite left and right ends of the display 62. The source boards 621, which are adapted to output the screen of the display 62, may be formed in an assembly state while being connected to the display 62. Further, portions of the source boards 621 may also include a flexible film type cable structure.

Further, the widths of the source boards 621 may be smaller than the thickness of the transparent panel assembly 60, and may be bent while the transparent panel assembly 60 is assembled. At this time, the source boards 621 may be arranged between the outer spacer 67 and the first spacer 63, and may be in contact with an inner surface of the outer spacer 67 while being perpendicular to the front panel 61.

Further, the source boards 621 may be connected to the display cables 605, and the display cables 605 may be connected to the T-CON board 602 above the sub-door 50.

In detail, when the source boards 621 are arranged on the rear surface of the display 62, the source boards 621 may be exposed to the outside through the see-through part 21 due to characteristics of the display 62 which is transparent. Further, when the source boards 621 have a structure protruding sideward, there is a problem in that the size of the sub-door 50 is enlarged.

Thus, the source boards 621 may be formed at a peripheral end of the display 62, and may be provided between the outer spacer 67 and the first spacer 63. Further, the source boards 621 may be formed to have a size corresponding to the outer spacer 67 so as not to depart from the outer spacer 67 in a state in which the source boards 621 are in close contact with the outer spacer 67.

Meanwhile, the two upper and lower source boards 621 may be formed, and may be connected to the pair of display cables 605, respectively. The display cables 605 may have a flexible and flat structure, which is similar to the touch cable 601, and may have a freely-bent structure.

The display cables 605 may extend along a peripheral surface of the transparent panel assembly 60, and may pass through a sealant 608 defining the peripheral surface of the transparent panel assembly 60 to extend to the outside of the transparent panel assembly 60.

Further, the display cables 605 may be bent to extend along the peripheral surface of the transparent panel assembly 60, and may be bent such that ends of the display cables 605 may extend upwards. Thus, the display cables 605 may be coupled to the T-CON board 602 above the sub-door 50.

Meanwhile, opposite ends of the display 62 may be supported by the first spacer 63. The first spacer 63 may be formed to have a rod shape extending from an upper end to a lower end of the display 62, and may be formed of aluminum.

The light guide plate 64 may be located behind the display 62, and may be spaced apart from the display 62 by a predetermined distance by the first spacer 63. Here, a sense of depth of the screen output on the display 62 may differ according to the position of the light guide plate 64.

The light guide plate 64, which is adapted to diffuse or scatter light irradiated by the back lights 68, may be formed of various materials. For example, the light guide plate 64 may be formed of polymer, and may be formed such that a pattern is formed on a surface of the light guide plate 64 or a film is attached to the surface of the light guide plate 64. The light guide plate 64 is configured to illuminate the display 62 on the rear side in a state in which the back lights 68 are switched on. To achieve this, the light guide plate 64 may be formed to have a plate shape having a size that is equal to or slightly larger than the size of the display 62, and the back lights 68 may be provided at locations corresponding to an upper end and a lower end of the light guide plate 64.

The rear panel 65 may be arranged behind the light guide plate 64. The rear panel 65, which defines the rear surface of the transparent panel assembly 60, may be formed to be larger than the light guide plate 64 and to be smaller than the front panel 61. Further, the rear panel 65 may be formed to be larger than the liner opening 561, and may shield the liner opening 561.

Meanwhile, the periphery of the rear panel 65 may protrude more outward than the outer spacer 67, to form a rear panel protrusion 651. The rear panel protrusion 651 may have a protruding portion which may be seated on the door liner 56 when the transparent panel assembly 60 is mounted, and may define a space in which the sealant applied to the periphery of the sub-door 50 may be filled.

For insulation, the rear panel 65 may be formed of low-ε glass. Thus, the rear panel 65 may prevent cold air in the refrigerator 1 from being heat-exchanged with the outside through the transparent panel assembly 60.

A pair of second spacer 66a and 66b may be provided between the rear panel 65 and the light guide plate 64. The second spacers 66a and 66b may be formed to have a shape of a quadrangular frame formed along the periphery of the light guide plate 64, and may adhere to the light guide plate 64 and the rear panel 65 so that the light guide plate 64 and the rear panel 65 may be spaced apart from each other by a predetermined distance.

Further, a heat insulation glass 69 may be provided between the pair of second spacer 66a and 66b. A space between the light guide plate 64 and the rear panel 65 may be partitioned by the heat insulation glass 69.

The pair of second spacers 66a and 66b include a spacer 66a disposed between the rear panel 65 and the heat insulation glass 69 and a spacer 66b disposed between the heat insulation glass 69 and the light guide plate 64. The spacer 66a may be called a "heat insulation spacer", and the spacer 66b may be called a "support spacer".

Also, a heat insulation layer may be disposed between the heat insulation glass 69 and the rear panel 65. That is, a second heat insulation space may be defined by the heat insulation spacer 66a, the heat insulation glass 69, and the rear panel 65. In detail, the first heat insulation space may be defined inside the front panel 61, the rear panel 65, and the outer spacer 67, and the second heat insulation space may be defined in the first heat insulation space.

Alternatively, a structure in which the light guide plate 64 and the rear panel 65 are fixed to each other by one second spacer 66 without the heat insulation glass 69 may be adopted as needed.

The rear panel 65 and the heat insulation panel 69 may be supported by the heat insulation spacer 66a, and the adhesion member 661 may be disposed on each of both sides of the heat insulation spacer 66a to maintain the state in which the rear panel 65 and the heat insulation panel 69 adhere to the second spacer 66. Also, due to the above-described structure, the rear panel 65 and the heat insulation panel 69 may be more firmly coupled to each other, and a sealed space for the heat insulation may be provided between the rear panel 65 and the heat insulation panel 69.

Also, the light guide plate 64 may be supported on the heat insulation panel 69 by the support spacer 66b and be supported on the front panel 61 by the first spacer 63. Here, a support member 662 may be disposed on one surface of the support spacer 66b contacting the light guide plate and one surface of the first spacer 63.

The support member 662 may be configured to allow the light guide plate 64 to maintain a space between the heat insulation panel 69 and the front panel 61. The support member 662 may be made of a compressible silicon or resin material and simply contact the light guide plate 64 without adhering to the light guide plate 64 to support the light guide plate 64. That is, although the support member 662 adheres to the first spacer 63 and the support spacer 66b, the support member 662 may simply contact the light guide plate 64 or be maintained to press and support the light guide plate.

The light guide plate 64 may be expanded or contracted by the light emitted from the backlight 68 and heat generated while the display 62 operates. Thus, the first spacer 63 and the support spacer 66b do not adhere to each other but are supported by the support member 662 in a simple supported state to maintain the support state according to bending or deformation of the light guide plate 64.

In the embodiment of the present disclosure, all the spacers 63, 66a, 66b, and 67 have different structures, but perform support to maintain an interval between the neighboring panels 61 and 65 or the light guide plate 64. Further, various forms such as a rod and a form in which a moisture absorbent is accommodated may be applied to the spacers 63, 66a, 66b and 67.

Also, the insulation panel 69 and the light guide plate 64 may be disposed between the front panel 61 and the rear panel 65. Here, the insulation panel 69 and the light guide plate 64 may be plate-shaped members disposed between the front panel 61 and the rear panel 65 and may be lonely provided or may be provided together and also may be called intermediate panels. At least one or more intermediate panels may be provided. When a see-through part through which the inside is capable of being seen is provided, the intermediate panels may not be provided between the front panel 61 and the rear panel 65.

The interval between the front panel 61 and the light guide plate 64 is maintained at a fixed interval to output the screen of the display 62. Further, the interval between the light guide plate 64 and the rear panel 65 may be determined based on the thickness of the sub-door 50 or the entire thickness of the transparent panel assembly 60. That is, as the thickness of the support spacer 66b is adjusted, the entire thickness of the transparent panel assembly 60 is determined, and thus the transparent panel assembly 60 may be mounted in accordance with the specification of the sub-door 50.

Meanwhile, the rear panel 65 may be located adjacent to the door light 57, and a distance between the display 62 and the door lights 57 may be determined based on the position of the rear panel 65. A space behind the transparent panel assembly 60 may be illuminated by the door lights 57, making it possible to visualize the storage space.

In a state in which the rear panel 65 adheres to the heat insulation spacers 66a, an outer end of the rear panel 65 may extend more outward than the heat insulation spacers 66a. Further, the outer spacer 67 is mounted to the outer end of the rear panel 65, the rear panel 65 and the front panel 61 may be fixed to each other.

The outer spacer 67 may be formed to have a shape of a rectangular frame, and the outer spacer 67 may connect the rear surface of the front panel 61 and the front surface of the rear panel 65 to each other, and at the same time, may define the peripheral surface of the transparent panel assembly 60.

In detail, the outer spacer 67 defines a periphery of an outer portion of the transparent panel assembly 60, and at the same time, has a structure for connecting the front panel 61 at a specific interval.

A space between the front panel 61 and the rear panel 65, that is, an internal space of the outer spacer 67, may be completely sealed by coupling of the outer spacer 67. Further, the inside of the outer spacer 67 may be further sealed by the sealant 608 applied to the periphery of the outer spacer 67.

The display 62 and the light guide plate 64 may be spaced forward/rearward apart from each other in the space sealed by the outer spacer 67, and the first spacer 63, the heat insulation spacer 66a and the support spacer 66b for maintaining the interval of the light guide plate 64 may be also provided in the internal space of the outer spacer 67.

Of course, an additional insulation panel or a multi-layered glass structure may be further provided inside the outer spacer 67, and these configurations may be provided inside the space defined by the outer spacer 67.

That is, the overall appearance of the transparent panel assembly 60 may be defined by the front panel 61, the rear panel 65, and the outer spacer 67, and all the other configurations may be provided inside the outer spacer 67. Thus, only the spaces between the outer spacer 67, the front panel 61, and the rear panel 65 are sealed, so that the multi-layered panel structure may be completely sealed.

In particular, even when a plate-shaped structure as well as the light guide plate 64 is further provided inside the outer spacer 67, if only the outermost outer spacer 67 adheres to the front panel 61 and the rear panel 65, a sealing structure of the transparent panel assembly 60 may be completed. Such a sealing structure may maintain the minimum sealing points even in the multi-layered structure by a plurality of panels including the light guide plate 64.

Thus, a probability that external air is introduced into the transparent panel assembly 60 or dew is condensed inside the transparent panel assembly 60 due to moisture permeation may be minimized. Further, the inside of the outer spacer 67 is made to be in a vacuum state or a gas for insulation is injected into the outer spacer 67, a heat insulation layer may be formed in the entire multi-layered structure inside the transparent panel assembly 60, thereby further improving insulation performance.

As a result, as the transparent panel assembly 60 is arranged inside the sub-door 50, the interior of the refrigerator may be seen, the screen may be output, and an insulation structure may be completed in the multi-layered panel structure, so that insulation performance may be ensured.

Also, a heat insulation panel 69 may be provided in a region between the front panel 61 and the rear panel 65, which are sealed by the outer spacer 67. The heat insulation panel 69 may be spaced apart from the rear panel 65 in the sealed state by the heat insulation spacer 66a to provide a vacuum insulation layer.

Thus, primary heat insulation may be performed by the sealing structure through the outer spacer 67, the front panel 61, and the rear panel 65, and additional insulation may be performed by the sealing structure through the heat insulation spacer 66a, the heat insulation panel 69, and the rear panel 65. As a result, the panel assembly 60 may have a dual heat insulation structure to significantly improve heat insulation performance, thereby effectively thermally insulating the inside of the refrigerator.

Further, a space on which the back lights 68 may be mounted may be provided on an inner surface of the outer spacer 67. The back lights 68 may be mounted at an upper end and a lower end of the outer spacer 67, and the light guide plate 64 may be located between the back lights 68 arranged at the upper end and the lower end of the outer spacer 67.

Thus, light irradiated by the back lights 68 may be directed toward an end of the light guide plate 64, and may be moved along the light guide plate 64 so that the light guide plate 64 may emit light from the entire surface thereof.

Meanwhile, the back lights 68 located at an upper end and a lower end of the inside of the transparent panel assembly 60 may be connected to the back light cables 606. The back light cables 606 may be formed to have a flexible and flat shape, which is like the touch cable 601 and the display cables 605.

The back light cables 606 may be connected to the back lights 68 mounted inside the outer spacer 67 and may extend toward the outside of the transparent panel assembly 60.

Further, the back light cables 606 may extend along a periphery of the transparent display 62 so as not to be exposed through the transparent display 62. Further, the back light cables 606 may extend upwards while being in close contact with the rear panel 65, and may be bent while being in contact with the rear surface of the rear panel 65, to be connected to the docking PCB 604 above the sub-door 50 as needed.

Here, the back-light cables 606 extends while being in close contact with the peripheral surface of the rear panel protrusion 651 of the rear panel 65, and thus is not exposed through the transparent panel assembly 60 when viewed from the outside of the sub-door 50.

The sealant 608 may be applied to a periphery of the outer spacer 67. The sealant 608 may be applied to form the peripheral surface of the transparent panel assembly 60, and forms a peripheral surface between the front panel 61 and the rear panel 65.

The sealant 608, which performs sealing to prevent air from being introduced into the transparent panel assembly 60, may be formed of polysulfide (referred to as "thiokol"). Of course, if necessary, the sealant 608 may be formed of other sealant materials such as silicone and urethane which may be directly in contact with foam liquid injected to form the insulator 531.

By the sealant 608, the coupling between the outer spacer 67, the front panel 61, and the rear panel 65 may be maintained, and at the same time, connection portions between components may be completely sealed, so that moisture may be prevented from being introduced. Further, the sealant 608, which is a portion directly in contact with the foam liquid when the insulator 531 is formed, may protect the periphery of the transparent panel assembly 60.

Further, the cables 601, 605, and 606 connected to the touch sensor 612, the display panel 62, and the back lights 68 inside the transparent panel assembly 60 may be input/output through the sealant 608. That is, the sealant 608 may block outer surfaces of the cables 601, 605, and 606 when the cables 601, 605, and 606 extend to the outside through the peripheral surface of the transparent panel assembly 60, to prevent water or moisture from being introduced into a space through which the cables 601, 605, and 606 are input/output.

Also, a spacer protrusion 672 defining a space into which the sealant 608 is filled and a heater mounting part 673 on which a heater 532 is mounted may protrude from the peripheral surface of the panel assembly 60 coated with the sealant 608, and the sealant 608 may be filled into a space defined between the spacer protrusion 672 and the heater mounting part 673. A more detailed structure of the spacer protrusion 672 and the heater mounting part 673 will be described below again.

Figure 14:
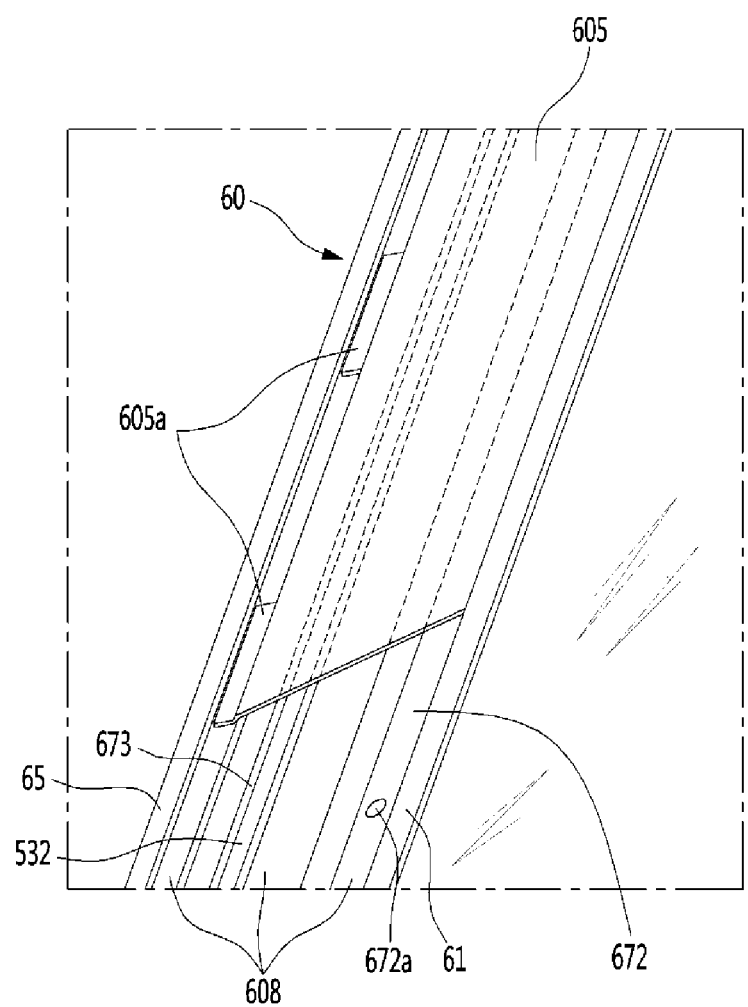
FIG. 14 is a partial perspective view illustrating an arranged state of the display cable of the panel assembly.

FIG. 14 is a partial perspective view illustrating an arrangement state of a display cable of the transparent panel assembly.

As illustrated in the drawing, the display cables 605 may be connected to the source boards 621 to extend upwards, may extend along a periphery of the side surface of the transparent panel assembly 60, and then may be connected to the T-CON board 602.

The display cables 605 may be connected to the source boards 621 inside the transparent panel assembly 60, and may be guided to the outside of the outer spacer 67 through a space between the rear panel 65 and the outer spacer 67.

In detail, cable connectors 605a may be formed in the display cables 605. The cable connectors 605a may be introduced into the transparent panel assembly 60 in a space between the rear panel 65 and an end of the outer spacer 67, and may be connected to the source boards 621 in an internal space of the transparent display 62.

The cable connectors 605a may be guided to an outer surface of the transparent panel assembly 60 through a space between a gap of an adhesive member 671 allowing the rear panel 65 and the outer spacer 67 to adhere to each other and the sealant 608. Thus, the display cables 605 may pass through the sealed periphery of the sealed transparent panel assembly to be guided to the outside.

The adhesive member 671 may also be provided between the front panel 61 and an end of the outer spacer 67. The adhesive member 671 may have a thin thickness so that heat generated from the outer spacer 67 is sufficiently transferred to the front panel 61. Alternatively, the outer spacer 67 may be coupled to the front panel 61 through a different method without adhering by the adhesive member 671. Here, the outer spacer 67 may come into direct contact with the front panel to transfer heat.

In this state, the display cables 605 may extend upwards in a bent state to be in contact with the outer surface of the transparent assembly 60 to which the sealant 608 is applied, and may be bent again to be connected to the T-CON board 602. That is, the display cables 605 may extend to be connected to the T-CON board 602 while being exposed to the outside of the transparent panel assembly 60.

Also, the display cable 605 may be exposed to the outer surface of the panel assembly 60 in the state of coating with the sealant 608, and the spacer protrusion 672 and the heater mounting part 673 may be exposed between the sealants 608. Thus, the panel assembly 60 may be mounted on the door 50 in the state of being assembled. In the state in which the panel assembly 60 is mounted on the door 50, the process of fixing the panel assembly 60 and for mounting the heater 532 or connecting the mounted heater 532 may be performed.

Figure 15:
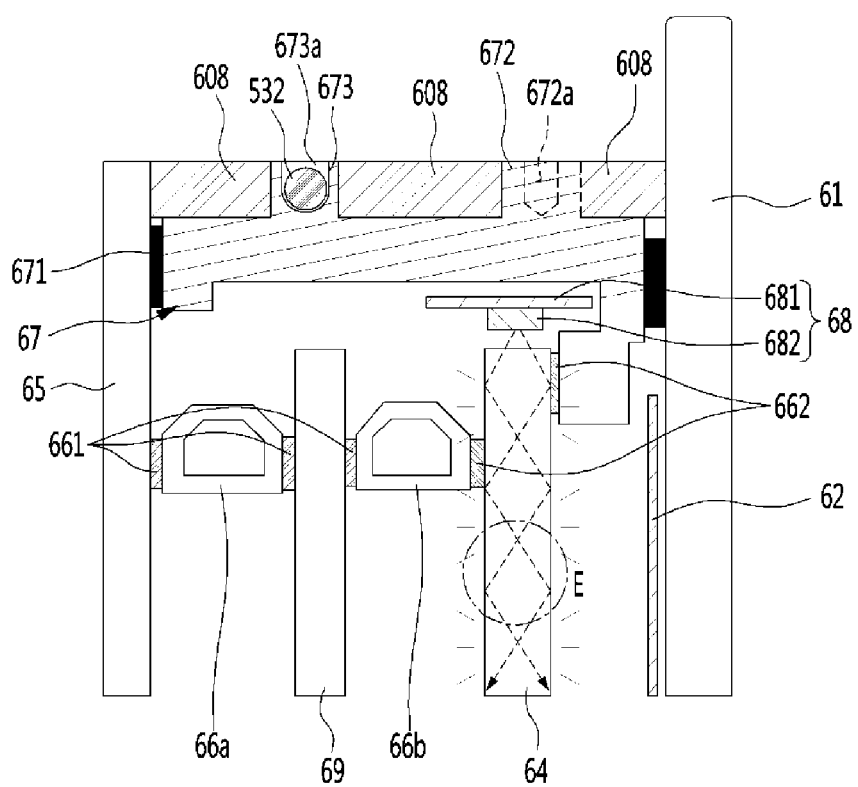
FIG. 15 is a cross-sectional view of the panel assembly.

FIG. 15 is a cross-sectional view of the panel assembly.

As illustrated in the drawing, the sealant 608 may be applied to the outermost peripheral surface of the panel assembly 60. The sealant 608 may be applied to a gap between the front panel 61 and the rear panel 65 and may be configured to cover the outer side of the outer spacer 67.

The panel assembly 60 may be mounted in a state in which the sealant 608 is applied and may be supported by the support frame 70. Thus, there is a limitation in that when the sealant 608 does not have a uniform surface, if the panel assembly 60 is assembled, the transparent panel assembly 60 may be incorrectly assembled by interference with the support frame 70 or other neighboring components, or a failure may occur.

In particular, when an interval between the front panel 61 and the rear panel 65 is large, it is not easy to uniformly apply the sealant 608, and the sealant 608 may be biased to one side or may have an uneven surface in a local section.

To prevent such a limitation, the spacer protrusion 672 and the heater mounting part 673 may be disposed on the outer surface of the outer spacer 67. The spacer protrusion 672 and the heater mounting part 673 may be disposed in parallel to each other at positions spaced apart from each other to protrude at the same height. Also, the sealant 608 may be filled at the uniform height into the spaces between the front panel 61 and the rear panel 65 and between the spacer protrusion 672 and the heater mounting part 673.

After the sealant 608 is applied, an outer surface of the spacer protrusion 672 may be exposed to the peripheral surface of the panel assembly 60. Also, a plurality of coupling holes 672a may be defined in the exposed outer surface of the spacer protrusion 672. A coupling member such as a screw, which is fastened to be coupled to the panel assembly 60, is coupled to the coupling hole 672a.

Also, a heater groove 673a into which the heater 532 is inserted and mounted from the outside may be defined in an outer surface of the heater mounting part 673. Also, the heater groove 673a may be exposed to the outside so that the heater 532 is mounted in the exposed heater groove 673a in the state in which the panel assembly 60 is mounted on the door 50.

The outer spacer 67 may be made of a metal material, particularly, made of an aluminum material having superior heat transfer performance. Thus, when the heater 532 generate heat, the heat may be transferred to the front panel 61 through the outer spacer 67. Thus, formation of dew condensation on a front surface of the front surface of the front panel 61 may be prevented.

The light guide plate 64 may be spaced backward from the display 62 and disposed at a position corresponding to the backlight 68. The backlight 68 is disposed above and below the light guide plate 64 with the light guide plate 64 therebetween to emit light to an end of the light guide plate 64.

The backlight 68 may include a substrate 681 fixed to the outer spacer 67 and a plurality of LEDs 682 disposed on the substrate 681 and arranged at a certain interval along the light guide plate 64. The backlight 68 may be generally called a backlight because the backlight 68 is disposed at a rear side of the display 62 to illuminates the display 62. Also, the backlight 68 may have various structures that are capable of emitting light toward the end of the light guide plate 64.

The light guide plate 64 is configured so that the light incident into the end of the light guide plate 64 is uniformly inducted to an entire surface of the light guide plate 64 and also configured so that the light is emitted to an entire surface of the display 62 that is disposed at a front side thereof. The light guide plate 64 may be manufactured by injection-molding a transparent plastic material such as acryl (PMMA) and be transparent so that the user sees the inside of the refrigerator through the light guide plate 64. The light guide plate 64 may provide sufficient brightness so that the display 62 is clearly outputted. Also, the light guide plate 64 may have a thickness of about 4 mm to about 10 mm to provide uniform brightness on the entire area and maintain property transparency.

In detail, the light guide plate 64 may have a light incident surface and a light emission surface. The backlight 68 may be disposed at an end-side of the light guide plate 64, i.e., disposed toward the light incident surface to emit light to the light guide plate 64. Also, the emitted light may be scattered by the light diffuser that will be described later and then emitted to the display 62 through the light emission surface.

The light guide plate 64 has to be provided so that the rear side of the light guide plate 64 is visible, unlike the structure of the backlight of the general display panel. Thus, constituents that may deteriorate the transparency of the light guide plate such as a separate reflection sheet or pattern may not be disposed on the light guide plate 64.

However, in the structure in which the reflection sheet or pattern is not disposed so that the user sees the inside of the refrigerator through the light guide plate 64, it is difficult to realize the uniform brightness on the entire surface of the light guide plate 64, and also, a shaded portion may occur on a portion of the light guide plate 68 that is away from the backlight 68 rather than a portion of the light guide plate 68 that is close to the backlight 68. Due to the shaded portion of the light guide plate, a shaded portion may also occur on the screen outputted on the display 62.

Thus, according to this embodiment, the light diffuser 643 may be added to the light guide plate to refract light emitted to the light guide plate 64, to uniformly illuminate the entire surface of the light guide plate 64 without providing the reflection layer or pattern on the general light guide plate when the light is emitted to the light guide plate 64.

Figure 16:
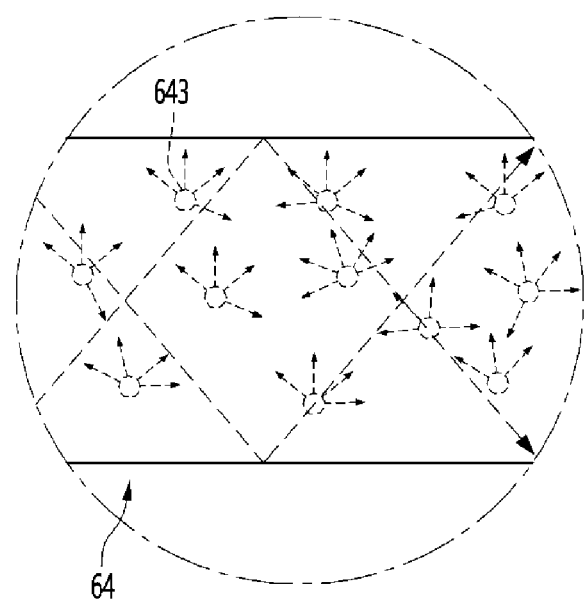
FIG. 16 is a view illustrating an example of a light guide plate constituting the transparent panel.

FIG. 16 is a view illustrating an example of the light guide plate constituting the transparent panel.

Referring to the drawing, the light diffuser may be added to the light guide plate 64 to allow the light introduced into the light guide plate 64 to be refracted, i.e., the light reaching the light diffuser 643 to be scattered. The light guide plate 64 may have the uniform brightness on the entire surface of the light guide plate 64 by the light diffuser 643 that is uniformly distributed in the entire area of the light guide plate 64 to prevent the shaded portion from occurring on the display 62, thereby realizing the uniform brightness.

That is, the limitation in uniform brightness on the entire surface of the light guide plate 64, which occurs due to the clearly visible structure of the light guide plate 64, may be solved through the light diffuser 643.

The light diffuser 643 may be added to a polymer material constituting a base material of the light guide plate 64, for example, acryl when the light guide plate 64 is molded. Thus, the light diffuser 643 may be uniformly distributed in the entire area of the light guide plate 64. Also, the light diffuser 643 may be a particle made of a transparent material such as silica (silicon dioxide), titanium dioxide, alumina (aluminum oxide), an acrylic resin, a polycarbonate resin, a silicon resin, and the like, which are capable of scattering light and transparent. Also, the light diffuser 643 may be provided as a rounded particle.

The light guide plate 64 has to be maintained in the transparent state when the backlight 68 is not turned on. Thus, the light diffuser 643 may have a size of several nanometers or less, particularly, have a nano-size and be uniformly distributed in the entire light guide plate 64.

Due to the above-described structure, when the display 62 operates, and the backlight 68 is turned on, the entire light guide plate 64 may be illuminated with the uniform brightness, and the entire screen of the display 62 may be brightly and clearly viewed.

On the other hand, when the user intends to see the storage space of the inside of the refrigerator, the display 62 and the backlight 68 may be turned off, and the storage chamber light 80 and the door light 57 may be turned on so that the inside of the refrigerator is visible.

Here, when the light emitted from the storage chamber light 80 or the door light 57 is emitted toward the light guide plate 64, the light guide plate 64 may be significantly deteriorated in transparency due to the scattering of the light by the light diffuser 643. Thus, the storage chamber light 80 or the door light 57 do not have to directly emit the light toward the light guide plate 64. This structure will be described below in more detail.

Figure 17:
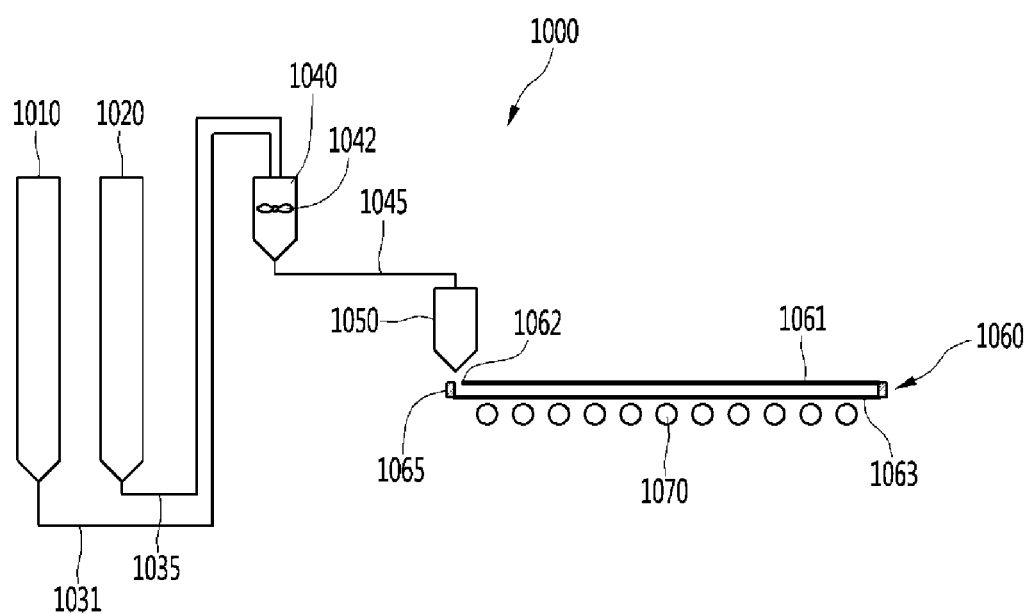
FIGS. 17 and 18 are views illustrating an apparatus for manufacturing the light guide plate.
Figure 18:
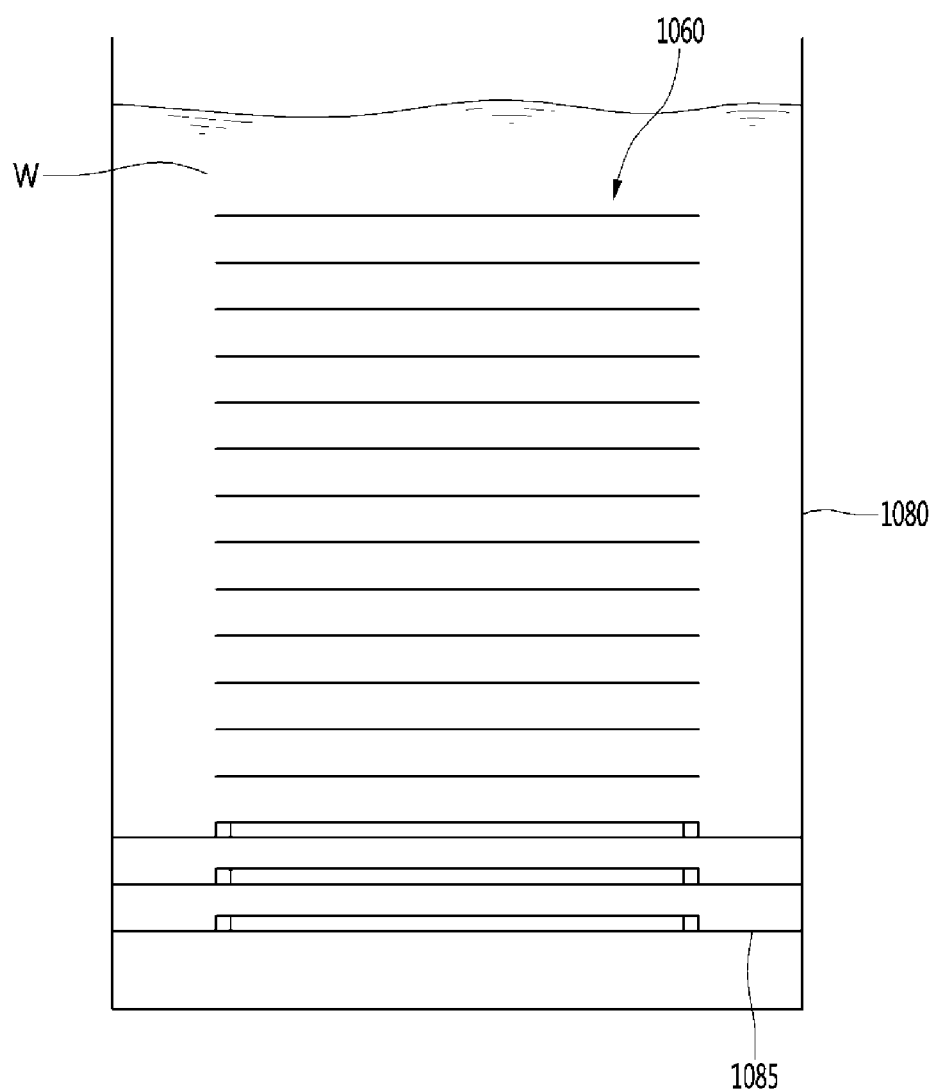

FIGS. 17 and 18 are views illustrating an apparatus for manufacturing the light guide plate.

Referring to FIGS. 17 and 18, an apparatus 1000 for manufacturing the light guide plate 64 includes a first storage tank 1010 in which acrylic monomers that are main components of the light guide plate 64 are stored and a second storage tank in which the light diffuser 643 is stored. The acrylic monomers may be stored in the first storage tank 1010 in a liquid state, and the light diffuser 643 may be stored in the second storage tank 1020 in a powder state.

The light diffuser 643 may include at least one of calcium carbonate ($CaCO_3$) or titanium dioxide ($TiO_2$). Also, the light diffuser 643 may have a particle size of about 70 μm to about 100 μm. If the light diffuser 643 has a particle size of about 100 μm or more, sparkling may occur, and thus, the acrylic monomers and the light diffuser 643 may not be well mixed with each other.

The manufacturing apparatus 1000 includes a first supply line 1031 extending from the first storage tank 1010 to a stirrer 1040 and a second supply line 1035 extending from the second storage tank 1020 to the stirrer 1040.

The acrylic monomers may be supplied to the stirrer 1040 through the first supply line 1031, and the light diffuser 643 may be supplied to the stirrer 1040 through the second supply line 1035. The light diffuser 643 may be diffused into the acrylic monomers.

A weight ratio of the light diffuser 643 to the total weight of the acrylic monomers and the light diffuser 643 may be about 0.1% to about 0.5%.

An impeller 1042 may be provided in the stirrer 1040. The impeller 1042 may operate to mix the acrylic monomers in which the light diffuser 643 is diffused. Thus, the light diffuser 643 may be uniformly distributed in the acrylic monomers. Here, a temperature condition for the stirring in the stirrer 1040 is room temperature (about 25° C.), and the number of revolutions of the impeller 1042 may be about 60 RPM to about 120 RPM.

The material mixed in the stirrer 1040, i.e., the acrylic monomers and the light diffuser 643 may move to an injection device 1050 through a third supply line 1045, and the injection device 1050 may inject the material into the plate assembly 1060.

The plate assembly 1060 includes an upper plate 1061, a lower plate 1063, and a spacer 1065 for spacing the upper plate 1061 and the lower plate 1063 from each other.

Each of the upper plate 1061 and the lower plate 1063 includes a glass plate. The upper and lower plates 1061 and 1063 constituting a mold of the material may be made of glass. Thus, the manufactured light guide plate may have a smooth surface. In addition, since the glass is lightweight, manufacturing convenience may increase to reduce the manufacturing price.

An injection hole 1062 for injecting the material may be defined in the upper plate 1061.

The spacer 1065 may be disposed on an edge of the lower plate 1063 to extend upward, and the upper plate 1061 may be seated on the spacer 1065. An internal space in which the material is disposed may be defined in the plate assembly 1060 by the spacer 1065, the lower plate 1063, and the upper plate 1061.

The light guide plate 64 to be manufactured may be determined in thickness according to an amount of material to be injected from the injection device 1050.

The plate assembly 1060 may be placed on a roller 1070 to move in a direction in which the roller 1070 rotates. In detail, when the material is completely injected into one plate assembly 1060 disposed adjacent to the injection device 1050, the one plate assembly 1060 may move, and then, the other plate assembly 1060 may move to a position adjacent to the injection device 1050 to receive the material.

The plate assembly 1060 in which the material is completely injected may be put into a curing tank 1080 through the injection device 1050. For example, the curing tank 1080 may include a water tank in which water W is stored.

A plurality of plate assembles 1060 may be disposed to be laminated in the curing tank 1080. A plurality of support plates 1085 may be provided in the curing tank 1080, and thus, the plate assemblies may be respectively placed on the support plates 1085.

The water W stored in the curing tank 1080 may have a temperature of about 50° C. to about 60° C. The material injected into the plate assembly may react with the water so as to be cured. Here, a curing time may be about five hours. Also, the cured material may be thermally treated and then separated from the upper plate 1061 and the lower plate 1063 so as to be manufactured as the light guide plate.

Another embodiment will be proposed.

In the above-described manufacturing apparatus 1000, although each of the upper plate and the lower plate constituting the plate assembly is provided as the glass plate, each of the upper plate and the lower plate may be provided as a metal plate. For example, the metal plate may be made of a steel, copper, or aluminum material.

Figure 19:
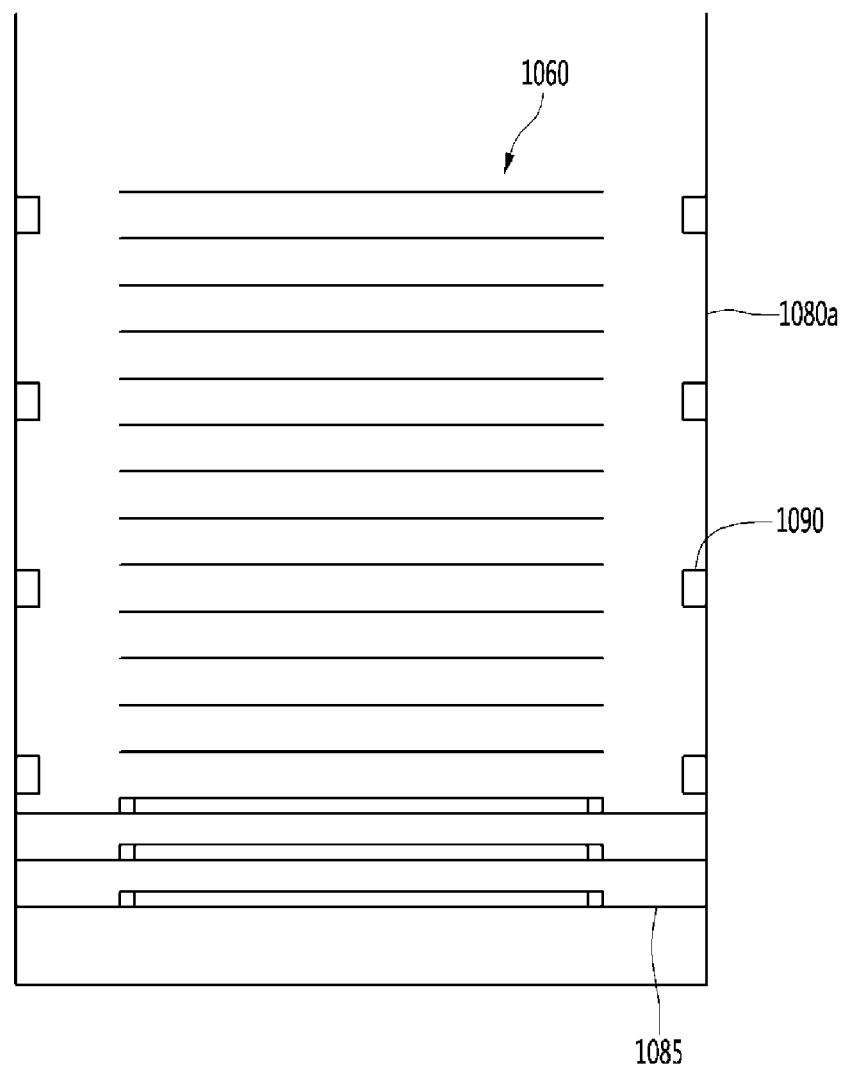
FIG. 19 is a view illustrating another example of the apparatus for manufacturing the light guide plate.

FIG. 19 is a view illustrating another example of the apparatus for manufacturing the light guide plate.

Referring to FIG. 19, an apparatus for manufacturing the light guide plate 100*a* includes a curing tank 1080*a* provided with an UV lamp 1090. The plurality of plate assemblies 1060 containing the material injected from the injection device 1050 described with reference to FIG. 17 may be disposed to be laminated in the curing tank 1080*a*. The plate assemblies 1060 may be supported by the support plates 1085, respectively.

The UV lamp 1090 may be disposed on an inner surface of the curing tank 1080*a* to irradiate UV toward the plate assemblies 1060. In this process, the material injected into each of the plate assembles 1060 may be cured.

For example, the UV lamp 1090 may be provided in plurality. The plurality of UV lamps 1090 may be vertically aligned on both side surfaces of the curing tank 1080*a* to irradiate the UV toward the plate assemblies disposed at a center of the curing tank 1080*a*.

Since each of the upper plate 1061 and the lower plate 1063 constituting the plate assembly 1060 is provided as the glass plate, the ultraviolet rays irradiated from the UV lamps 1090 may pass through the glass plate to easily cure the material.

Figure 20:
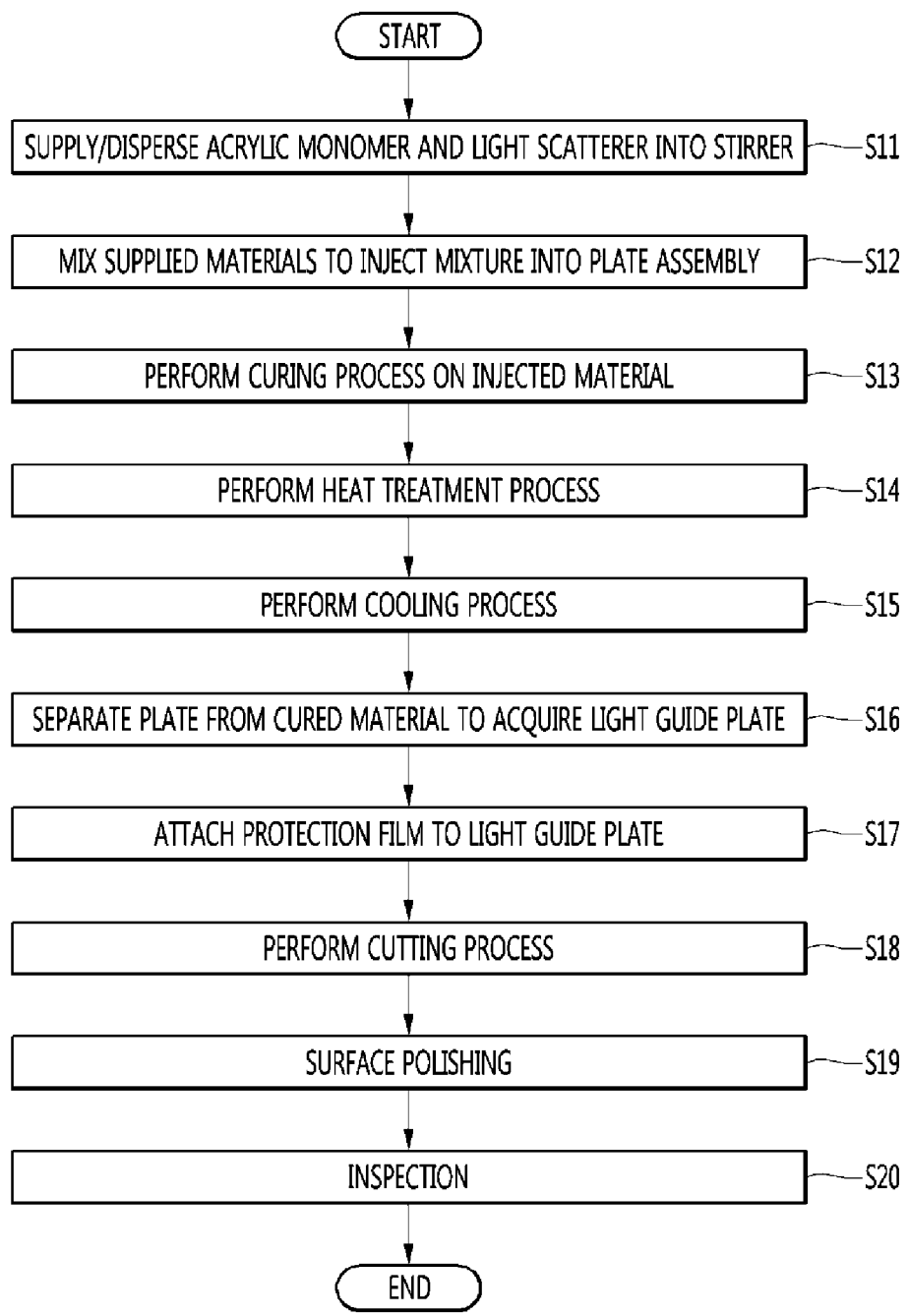
FIG. 20 is a flowchart illustrating a method for manufacturing the light guide plate.

FIG. 20 is a flowchart illustrating a method for manufacturing the light guide plate.

Referring to FIGS. 17 to 20, the acrylic monomers stored in the first storage tank 1010 and the light diffuser 643 stored in the second storage tank 1020 may be supplied to the stirrer 1040, and the light diffuser 643 may be diffused in the acrylic monomers (S11).

The material supplied to the stirrer 1040, i.e., the acrylic monomers and the light diffuser 643 may be uniformly mixed with each other by the reaction of the impeller 1042 provided in the stirrer 1040. Then, the mixed material may be supplied to each of the plate assemblies 1060. The material may be filled into an internal space defined by the upper plate 1061, the lower plate 1063, and the spacer 1065 (S12).

When the material is filled into the plate assembly 1060, the plate assembly 1060 may be put into the curing tank. For example, the plate assembly 1060 may be put into the water tank 1080 illustrated in FIG. 18, and a curing process may be performed by the water stored in the water tank 1080.

For another example, the plate assembly 1060 may be put into the curing tank 1080*a* illustrated in FIG. 19, and a curing process may be performed by the UV lamps 1090 provided in the curing tank 1080*a* (S13).

When the curing process is performed, a heat treatment process may be performed on the plate assembly 1060. The heat treating temperature may be about 110° C., and a heat treating time may be about 2 hours. Residual stress existing in the cured material may be reduced by the heat treatment process (S14).

After the heat treatment process is performed, a cooling process may be performed. The cooling process may be performed by a natural cooling method at room temperature, and the cooling time may be about 2 hours.

After the cooling process is performed, the upper and lower plates 161 and 153 and the spacer 165 are separated from the plate assembly 106, and thus, the material may be acquired as the light guide plate 64 (S16).

A protection film 64 may be attached to the light guide plate 64, and a cutting process may be performed to the required size (S17, S18).

Also, a polishing process for smoothing a surface of the light guide plate 64, and a process for checking whether defects occur may be performed. Due to these processes, the light guide plate 64 in which the light diffuser 643 is uniformly distributed may be easily manufactured (S19, S20).

Another example of the light guide plate may be applied to the refrigerator according to an embodiment.

Figure 21:
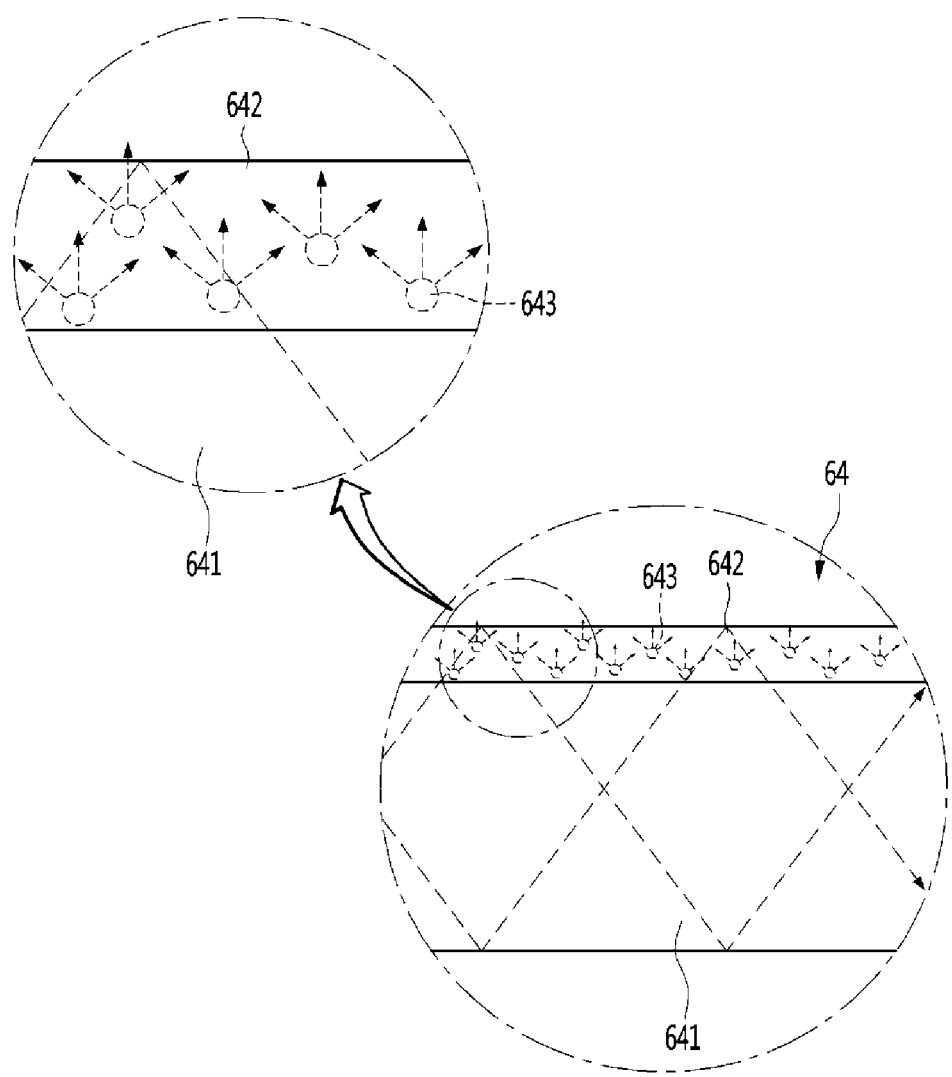
FIG. 21 is a view illustrating another example of the light guide plate.

FIG. 21 is a view illustrating another example of the light guide plate.

As illustrated in the drawing, the light guide plate 64 may have a structure in which a diffusion layer 642 containing the light diffuser 643 is formed on a surface of a resin layer 641.

The light guide plate 64 may be manufactured by injection-molding a transparent plastic material such as acryl (PMMA) and be transparent so that the user sees the inside of the refrigerator through the light guide plate 64.

Also, the diffusion layer 642 may be formed on the front surface facing the display 62. The diffusion layer 642 may be formed by applying paint containing the light diffuser 643 on the entire surface of the resin layer 641 or may be formed by allowing the light diffuser 643 having a film shape to adhere to the entire surface of the resin layer 641 after the light diffuser 643 is formed in the film shape.

The diffusion layer containing the light diffuser 643 may be provided in a shape in which the resin layer 641 is completely adhered, fused, or applied. Here, the diffusion layer 642 and the resin layer 641 may have a structure in which the he diffusion layer 642 and the resin layer 641 completely contact each other without generating a bubble in a boundary surface therebetween.

Thus, light emitted from the resin layer 741 to the diffusion layer 642 may be prevented from refracted in an air layer of the boundary surface. That is, the light moving along the resin layer 641 may pass through the resin layer 641 to travel to the diffusion layer 642 without changing in angle, thereby preventing a loss due to the refraction from occurring.

Also, since the resin layer and the diffusion layer are completely closely attached to each other, no layer may be seen when viewed from a front side, and thus, the transparency of the light guide plate 64 may not be deteriorated. On the other hand, if the resin layer 641 and the diffusion layer 642 are not completely closely attached to each other to generate a fine air layer or a gap between the boundary surface, the transparency of the light guide plate itself may be affected, and when the inside of the refrigerator is seen from the outside of the refrigerator through the panel assembly 60, the transparency may be deteriorated.

In the general structure of the light guide plate, a separate sheet for the reflection or a separate sheet for the diffusion may be provided in such a manner in which the sheet is simply placed on the surface of the light guide plate without adhering to the surface of the light guide plate due to the expansion and contraction of the light guide plate. However, in this embodiment, the diffusion layer 642 may be completely closely attached to the surface of the resin layer 641 so as not to generate the air layer or the fine gap.

The diffusion layer 642 may be disposed on the entire surface of the resin layer 641 to effectively emit the light to the display 62 and minimize the opaque of the light guide plate 64 by the storage chamber light 80 or the door light 57, which are disposed behind the light guide plate 64.

Also, the diffusion layer 642 may have a thickness of about 40 μm to about 60 μm.

If the diffusion layer 642 has a too thick thicknesses, it may be difficult to uniformly illuminate the entire light guide plate 64, and thus, a shaded portion may occur on the light guide plate 64. That is, if the diffusion layer has a thin thickness of about 40 μm or less, when light is irradiated onto the light guide plate 64 to illuminate the display 62, an amount of light diffuser 643 distributed in the light diffusion layer 642 may be relatively small, and thus, it may be difficult to uniformly illuminate the entire light guide plate 64, thereby deteriorating quality of the output screen of the display 62. Thus, the diffusion layer 642 may have a thickness thicker than at least about 42 μm.

Also, if the diffusion layer 642 has a too thick thickness, when the amount of light diffuser 643 is too much to turn on the door light 57 for illuminating the inside of the refrigerator, the transparency of the light guide plate 64 may be deteriorated by an effect of the door light 57. Also, if the thickness of the diffusion layer 642 is too thick, a volatilization time of a solvent constituting the diffusion layer 642 may become long to cause cracks or delaminate the resin layer 641 during the operation of the refrigerator 1. In addition, even when the light guide plate 64 is contracted or expanded or be bent, if the thickness of the diffusion layer 642 is too thick, the diffusion layer 642 may be delaminated, or a space may occur to deteriorate performance of the light guide plate 64. Thus, the diffusion layer 642 may be formed to a thickness of about 60 μm to prevent the diffusion layer 642 from being delaminated or cracked while securing an appropriate amount of light.

The light diffuser 643 may be contained in the resin layer 641 as well as the diffusion layer 642 within a range in which the transparency of the light guide plate 64 is not deteriorated, and the amount of light provided to the light guide plate 64 may be maximized.

Figure 22:
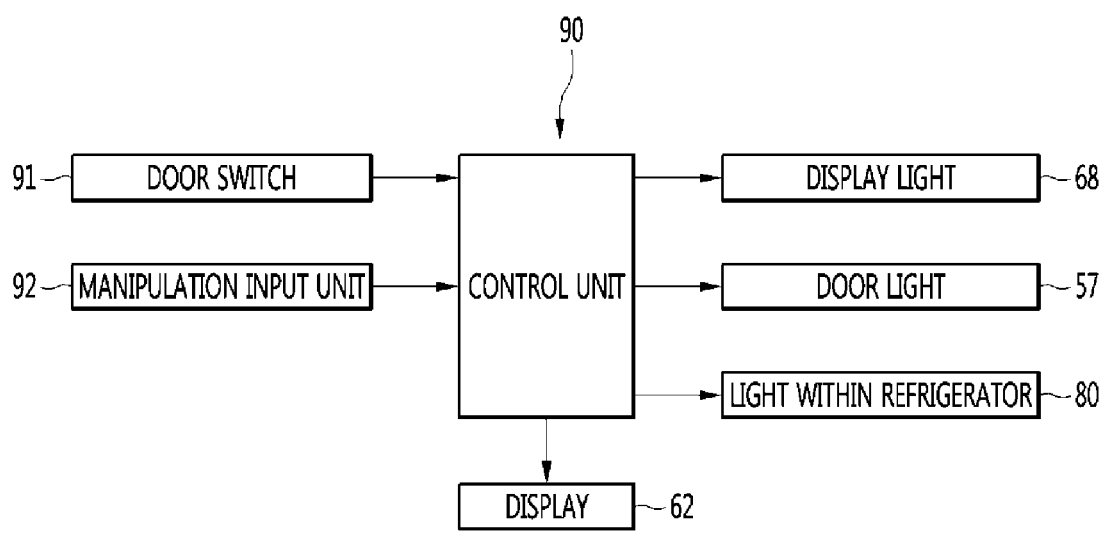
FIG. 22 is a schematic block diagram illustrating a flow of control signals of a display and lights of the refrigerator.
Figure 23:
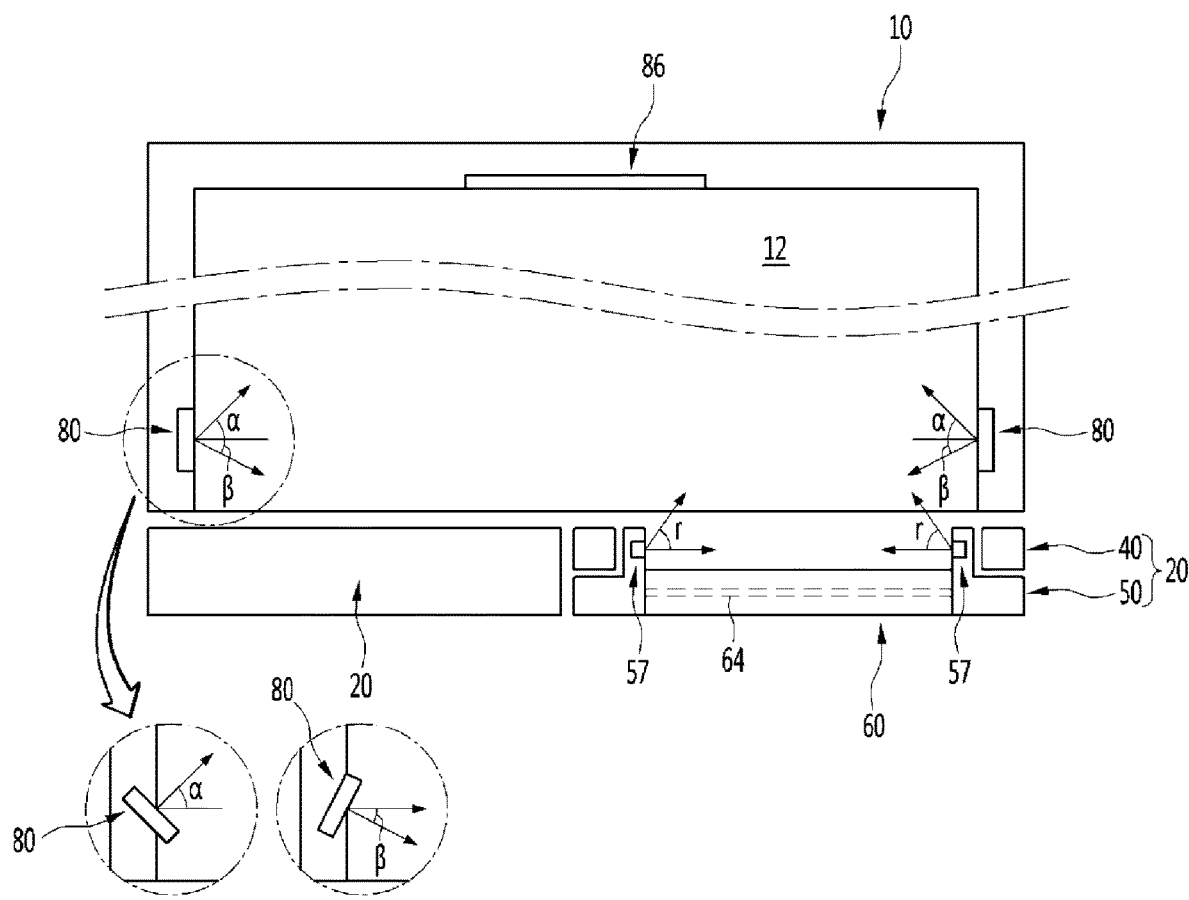
FIG. 23 is a schematic view illustrating a turn-on state of a door light and a storage chamber light of the refrigerator.
Figure 24:
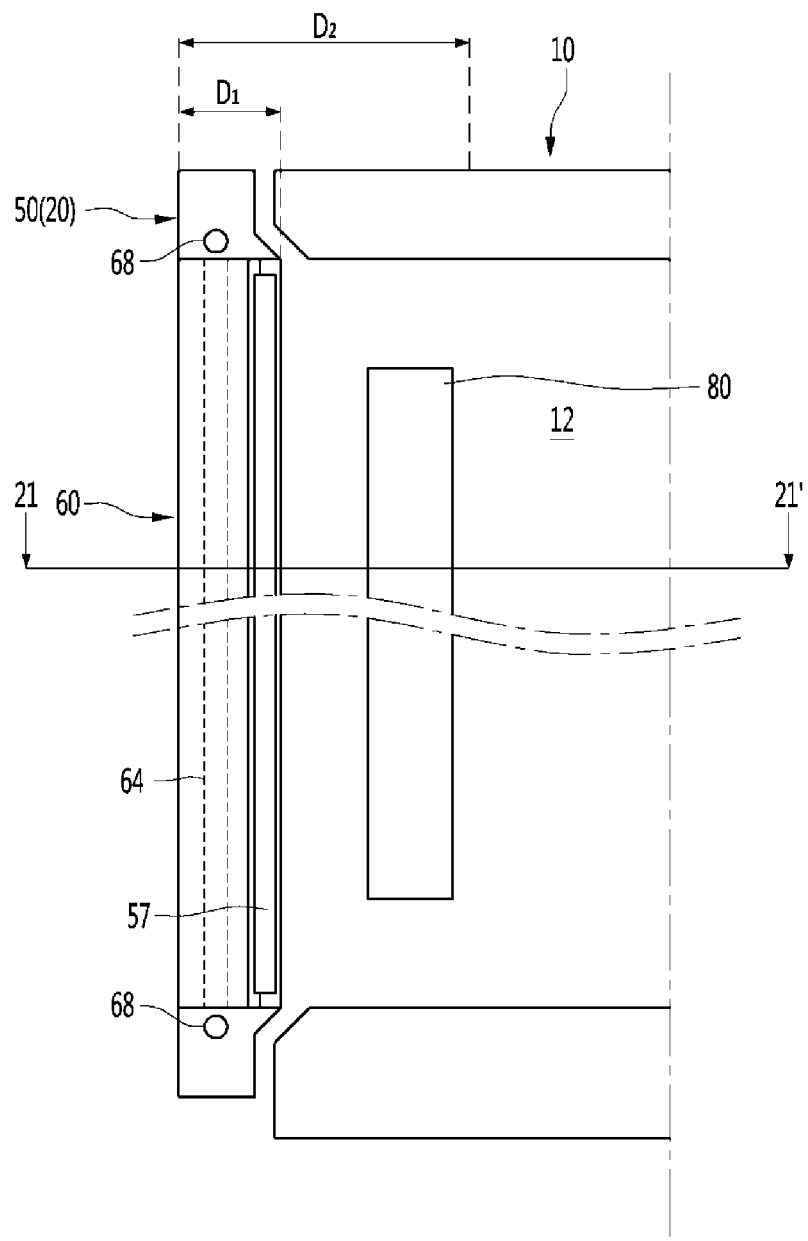
FIG. 24 is a schematic view illustrating an arranged state of a backlight, the door light, and the storage chamber light.
Figure 25:
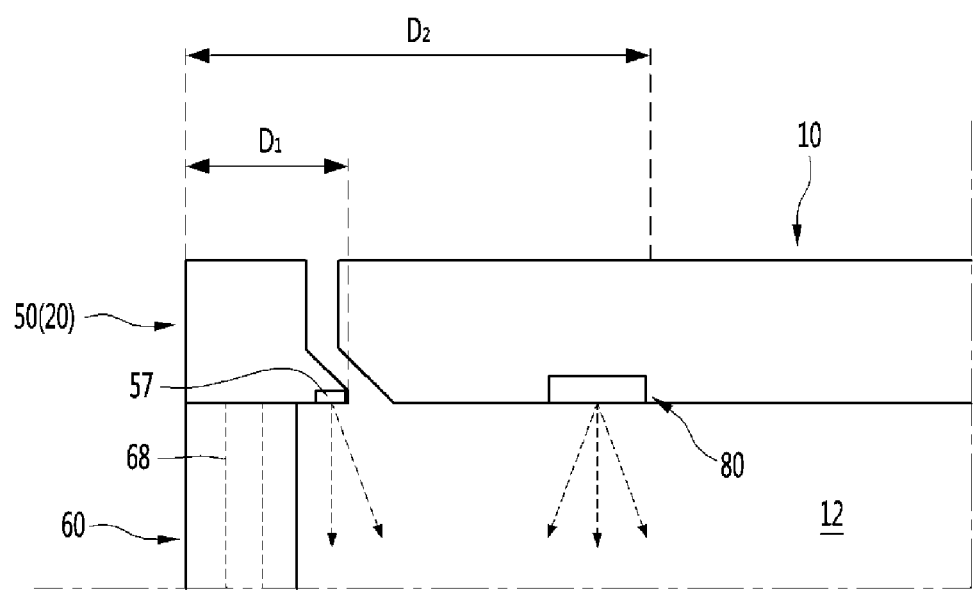
FIG. 25 is a cross-sectional view taken along line 21-21' of FIG. 20.

FIG. 22 is a schematic block diagram illustrating a flow of control signals of the display and the lights of the refrigerator. Also, FIG. 23 is a schematic view illustrating a turn-on state of the door light and the storage chamber light of the refrigerator. Also, FIG. 24 is a schematic view illustrating an arranged state of a backlight, the door light, and the storage chamber light. Also, FIG. 25 is a cross-sectional view taken along line 21-21' of FIG. 20.

As illustrated in the drawings, the refrigerator 1 may control operations of the display 62, the backlight 68, the storage chamber light 80, and the door light 57 under the control of the control unit 90 when the user manipulates a manipulation input unit 92. The control unit 90 may include the above-described control part 15 and be separately provided with respect to the control part 14.

Also, the manipulation input unit 92 may be configured to manipulate a user's input and include a touch sensor 612 or a separate manipulatable switch of the panel assembly 60, a microphone into which a voice is inputted, and various sensors. When the user manipulates the manipulation input unit 92, a manipulation signal may be transmitted to the control unit 90 so that the display 62, the backlight 68, the storage chamber light 80, and the door light 57 under the control of the control unit 90 operate.

To see the inside of the refrigerator through the panel assembly 60, the user may manipulate the manipulation input unit 92, and thus, the door light 57 or the storage chamber light 80, which illuminate the inside of the refrigerator, may be turned on according to the user's manipulation.

That is, when the door light 57 or the storage chamber light 80 is turned on to illuminate the inside of the refrigerator, the inside of the refrigerator may be visible through the panel assembly 60. Here, the rear door light 57 adjacent to the panel assembly 60 may also be turned on. Particularly, in order than the door-side storage space defined in the rear side of the sub-door 50 is visible, it may be more effective that the door light 57 is turned on. When the storage chamber light 80 is turned on, the inside of the refrigerating chamber 12 may be visible.

In the state in which the door light 57 is turned on, the door light 57 may be disposed in parallel to the light guide plate 64 provided in the panel assembly 60 or disposed in the rear side in which the door light 57 crosses the light guide plate 64.

In detail, the door light 57 may illuminate the storage space of the inside of the refrigerator so that the inside of the refrigerator is well seen through the panel assembly 60. However, when the light emitted to the door light 57 or the storage chamber light 80 is directly emitted to the light guide plate 64, light emission of the light guide plate 64 may occur by the light diffuser 643 contained in the light guide plate 64 to prevent the transparency of the light guide plate 64 from being deteriorated. Thus, in order that the inside of the refrigerator is well seen through the panel assembly 60, the deterioration of the transparency of the light guide plate 64 has to be minimized.

For this, the door light 57 may have an arrangement and structure in which the light is not directly emitted to the light guide plate 64.

The door light 57 may be provided in the sub-door 50 and disposed behind the light guide plate 64 to illuminate the door-side storage space defined in the refrigerating chamber door.

The door light 57 may illuminate the door-side storage space provided in the right refrigerating chamber without directly emitting the light toward the light guide plate 64. The door light 57 may be disposed on each of both sides with respect to the light guide plate 64 to face each other.

Here, the light emitted from the door light 57 may be emitted toward the inside of the refrigerator within a range of a set angle γ. Here, the set angle γ may be an angle between an angle parallel to the light guide plate 64 and an angle angled when viewing a rear side of the light guide plate 64. That is, the light emitted from the door light 57 may be transmitted in a direction parallel to the light guide plate 64 or in a direction that is away from the light guide plat 64.

For example, the door light 57 may be disposed to face the direction parallel to the light guide plate 64. That is, the light guide plate 64 may horizontally extend to be disposed to face a side of the door light 57.

For another example, the light guide plate 64 may be disposed to face a rear side perpendicular to the light guide plate 64 and be disposed at a predetermined angle between the parallel position and the vertical position with respect to the light guide plate 64.

Since the door light 57 illuminates only the door-side storage space provided in the rear surface of the refrigerating chamber door 20, but not illuminates the inside of the refrigerating chamber 12, the door light 57 may concentratedly illuminate a relatively narrow region when compared to the storage chamber light 80. Also, the irradiated angle may be limited to prevent the light from being directly emitted to the light guide plate 64, thereby preventing the viewing area from being blurred by the light guide plate 64 when the user intends to see the inside of the refrigerator.

The storage chamber light may be provided on each of both left and right side-walls of the inside of the refrigerating chamber 12 and be turned on to illuminate the inside of the refrigerating chamber 12.

The storage chamber light 80 may be turned on when the refrigerating chamber door 20 is opened, and the door switch 91 detects the opening of the refrigerating chamber door 20. In addition, the storage chamber light 80 may be turned on so that the inside of the refrigerator is visible through the see-through part 21 even when the refrigerating chamber door 20 is closed.

As necessary, all the door light 57 and the storage chamber light 80 may not be provided. Alternatively, only one of the door light 57 and the storage chamber light 80 may be provided.

When the storage chamber light 80 is turned on as illustrated in FIG. 23, the storage chamber light 80 may be variously disposed within a range in which the light of the storage chamber light 80 is not directly emitted to the light guide plate 64.

In detail, the storage chamber light 80 may be disposed in parallel to the light guide plate to face the inside of the refrigerator. As necessary, the storage chamber light 80 may be disposed at a predetermined angle backward with respect to the light guide plate 64. Here, a first set angle α at which the light emitting surface of the storage chamber light 80 is angled with respect to the light guide plate 64 may be an angle of about 0° to about 90°, particularly, about 45°, to effectively illuminate the inside of the refrigerator.

If the light is not directly emitted toward the light guide plate, the storage chamber light 80 may be disposed to face a front side.

That is, the storage chamber light 80 may be disposed to face the front side at the set angle with respect to the light guide plate 64. If the angle of the storage chamber light with respect to the light guide plate 64 is too large, the light may be directly emitted toward the light guide plate 64. Thus, the light emitting surface of the storage chamber light 80 may be disposed at a second set angle β with respect to the light guide plate 64 so that the light of the storage chamber light 80 is not directly emitted toward the light guide plate 64.

Here, the second set angle β of the storage chamber light 80, which faces the front side, may be less than the first set angle α of the storage chamber light 80, which faces the rear side. That is, the storage chamber light 80 may be disposed at an angle of about 30° or less to face the front side, thereby illuminating the inside of the refrigerator.

Referring to FIGS. 24 and 25, a relationship between the backlight 68, the door light 57, and the storage chamber light 80 will be described.

As illustrated in the drawings, the backlight 68 may be provided in the panel assembly 60 and be disposed on each of upper and lower ends of the light guide plate 64. Although the backlight 68 is disposed in a horizontal direction which a length of the backlight 68 is relatively less than that of the backlight 68 in a vertical direction, since the entire light guide plate 64 may be uniformly illuminated by the light diffuser 643 of the light guide plate 64, the shaded portion may not occur on the display 62 to provide the screen having uniform brightness.

Also, the door light 57 may be disposed somewhat behind the panel assembly 60 and be configured to illuminate the door-side storage space disposed on the rear surface of the door 50.

The door light 57 may be disposed in the vertical direction of the door 50, i.e., both left and right sides with respect to the light guide plate 64 to extend from the upper end to the lower end of the panel assembly 60. The door light 57 may be lengthily disposed in the vertical direction to uniformly illuminate the entire region of the door-side storage space and thus provide brightness to the inside of the refrigerator so that the inside of the refrigerator is sufficiently identified through the panel assembly 60.

That is, the backlight 68 may be vertically disposed with respect to the light guide plate 64 to extend in the horizontal direction, and the door light 57 may be disposed on the left and right sides to extend in the vertical direction.

The door light 57 may be disposed at a position corresponding to a set distance D1, which corresponds up to a rear end of the door 50, thereby effectively illuminating the door-side storage space defined at the rear side of the door 50. Therefore, the door-side storage space in the refrigerator may be well seen due to the above-described arrangement.

Also, the door light 57 may be disposed that is relatively close to the rear surface of the panel assembly 60. When the door light 57 is disposed to be structurally inclined toward the front side, there is high possibility that the light is directly emitted to the light guide plate 64. Thus, the door light 57 may be disposed in parallel to the light guide plate 64 or be disposed to face somewhat the rear side, thereby minimizing the direct incidence of the light into the light guide plate 64.

On the other hand, the storage chamber light 80 may be disposed further behind the door light 57 and also be disposed at a position corresponding to a set distance D2, which corresponds to one point inside the refrigerator. The storage chamber light 80 may be relatively farther from the light guide plate 64. In this arrangement, even though the storage chamber light 80 faces somewhat the front side to which the door 50 is disposed, the emitted light may not be directly emitted to the light guide plate 64.

The storage chamber light 80 may further include a rear storage chamber light 80 provided on a rear side-wall of the refrigerating chamber 12. The rear door light 57 may be turned on only when the opening of the refrigerating chamber 20 is detected by the door switch 91. When the refrigerating chamber 20 is closed, the rear door light 57 may not be turned on so that the light is not emitted to the light guide plate 64.

When the light emitted from the door light 57 and/or the storage chamber light 80 is emitted within the set angle, the light emitted from the door light 57 may illuminate the storage space the sub-door, but may not be emitted toward the light guide plate 64. Thus, the inside of the refrigerator may be illuminated while maintaining the transparency of the panel assembly 60 so that the inside of the refrigerator is clearly visible through the see-through part.

Hereinafter, a specific structure of the door light 57 may be described in more detail with reference to the drawings in connection with the operation of the refrigerator 1.

Figure 26:
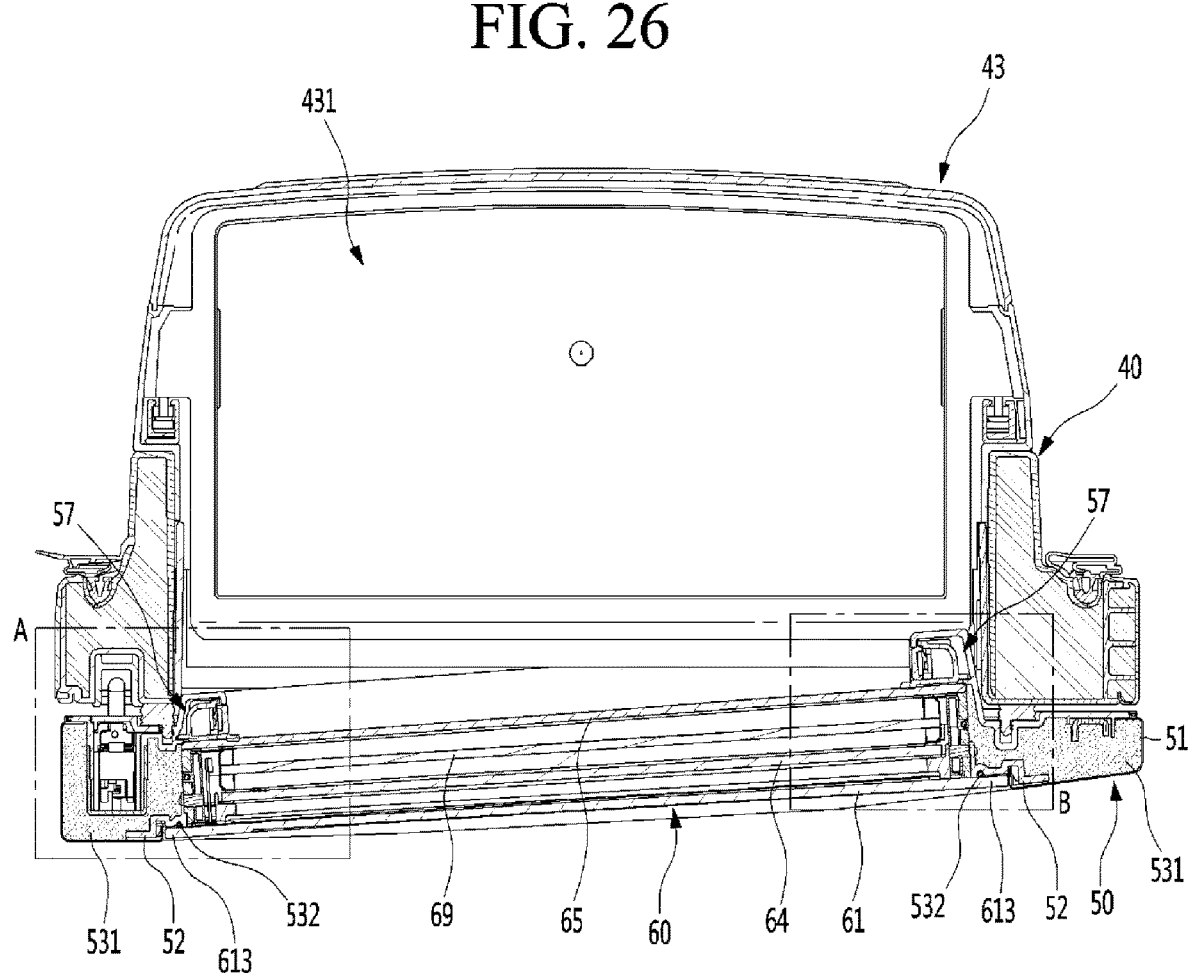
FIG. 26 is a transverse cross-sectional view of the main door and the sub-door.
Figure 27:
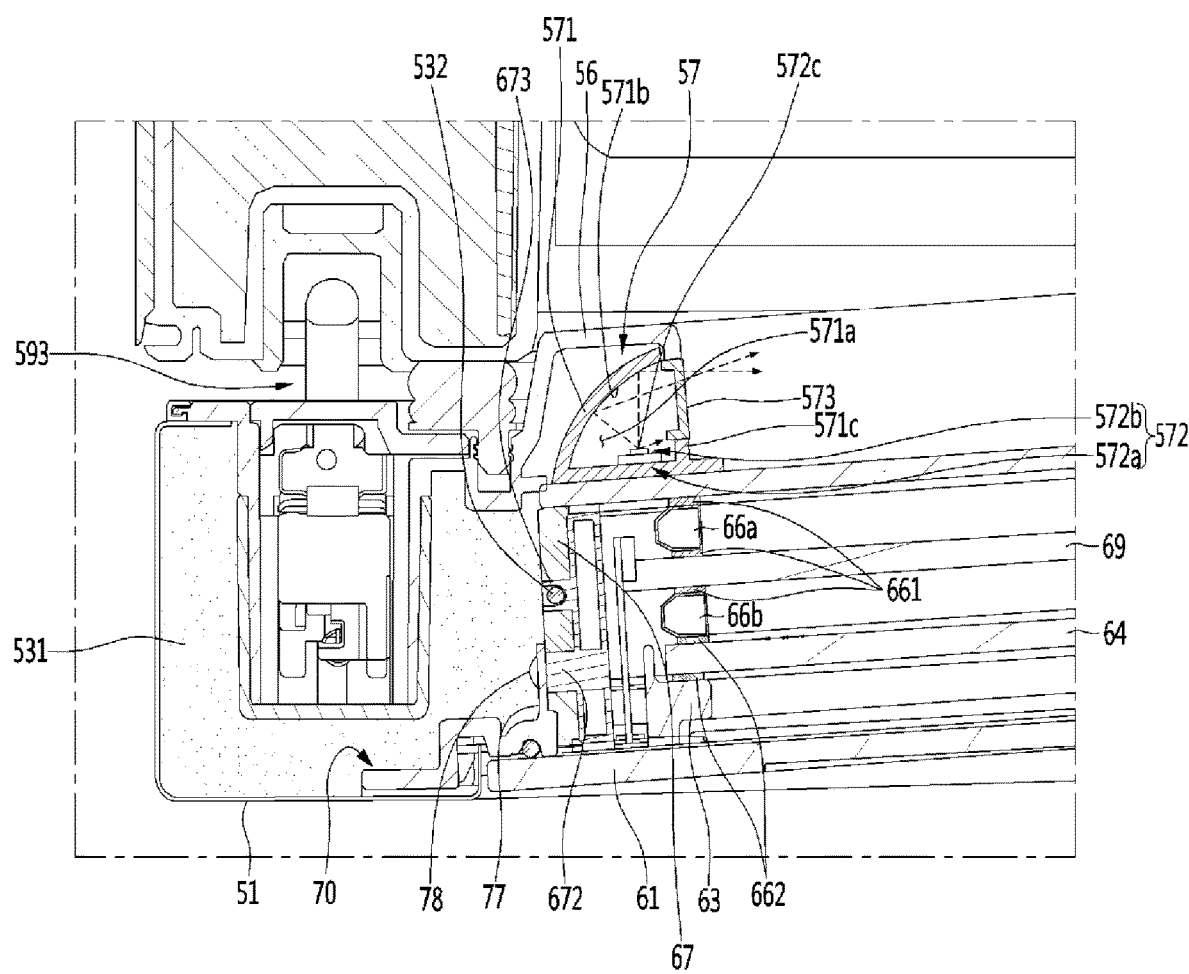
FIG. 27 is an enlarged view illustrating a portion A of FIG. 26.
Figure 28:
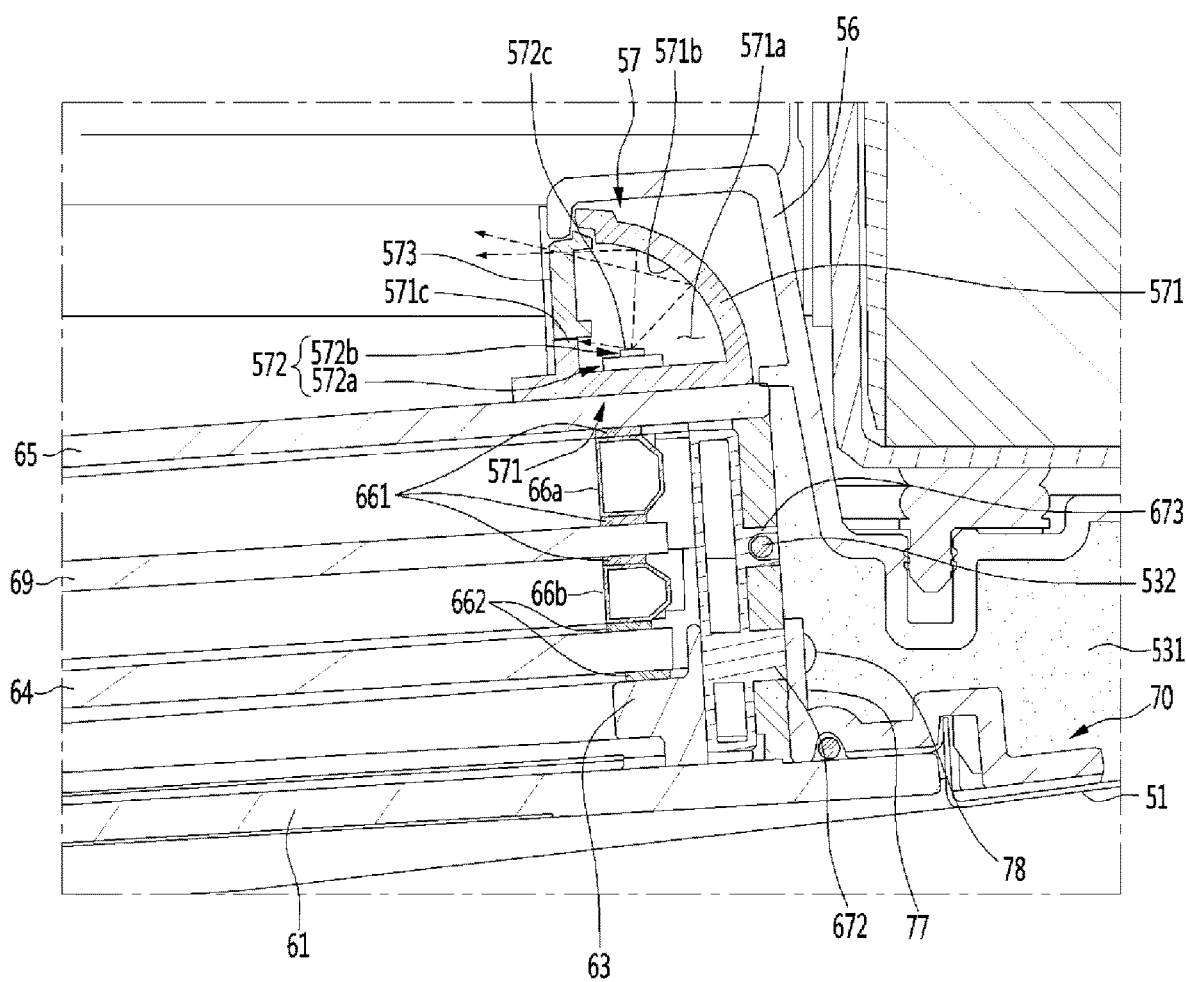
FIG. 28 is an enlarged view illustrating a portion B of FIG. 26.

FIG. 26 is a transverse cross-sectional view of the main door and the sub-door. Also, FIG. 27 is an enlarged view illustrating a portion A of FIG. 26. Also, FIG. 28 is an enlarged view illustrating a portion B of FIG. 26.

As illustrated in the drawings, in a state in which the locking member 593 of the opening device 59 is inserted into a latch hole 421, the sub-door 50 may be maintained in a closed state. In this state, the door light 57 may be maintained in a turn-off state. An opened or closed state of the sub-door 50 may be detected through a door switch 91 that is separately provided.

In the turn-off state of the door light 57, as illustrated in FIG. 1, the rear space of the sub-door 50 may be dark, and thus, the interior of the refrigerator 1 may not be seen through the see-through part 21. Thus, in the closed state of the sub-door 50, if separate manipulation is not performed, the door light 57 may be maintained in the turn-off state, and the interior of the refrigerator 1 may not be visible through the see-through part 21.

Figure 32:
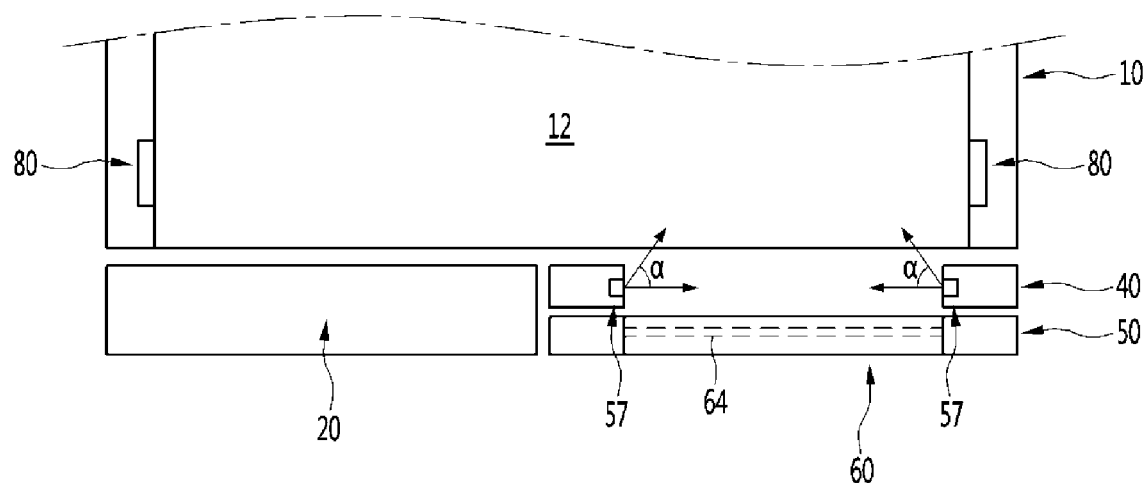
FIG. 32 is a cross-sectional view of a refrigerator on which a door light according to further another example is mounted.
Figure 35:
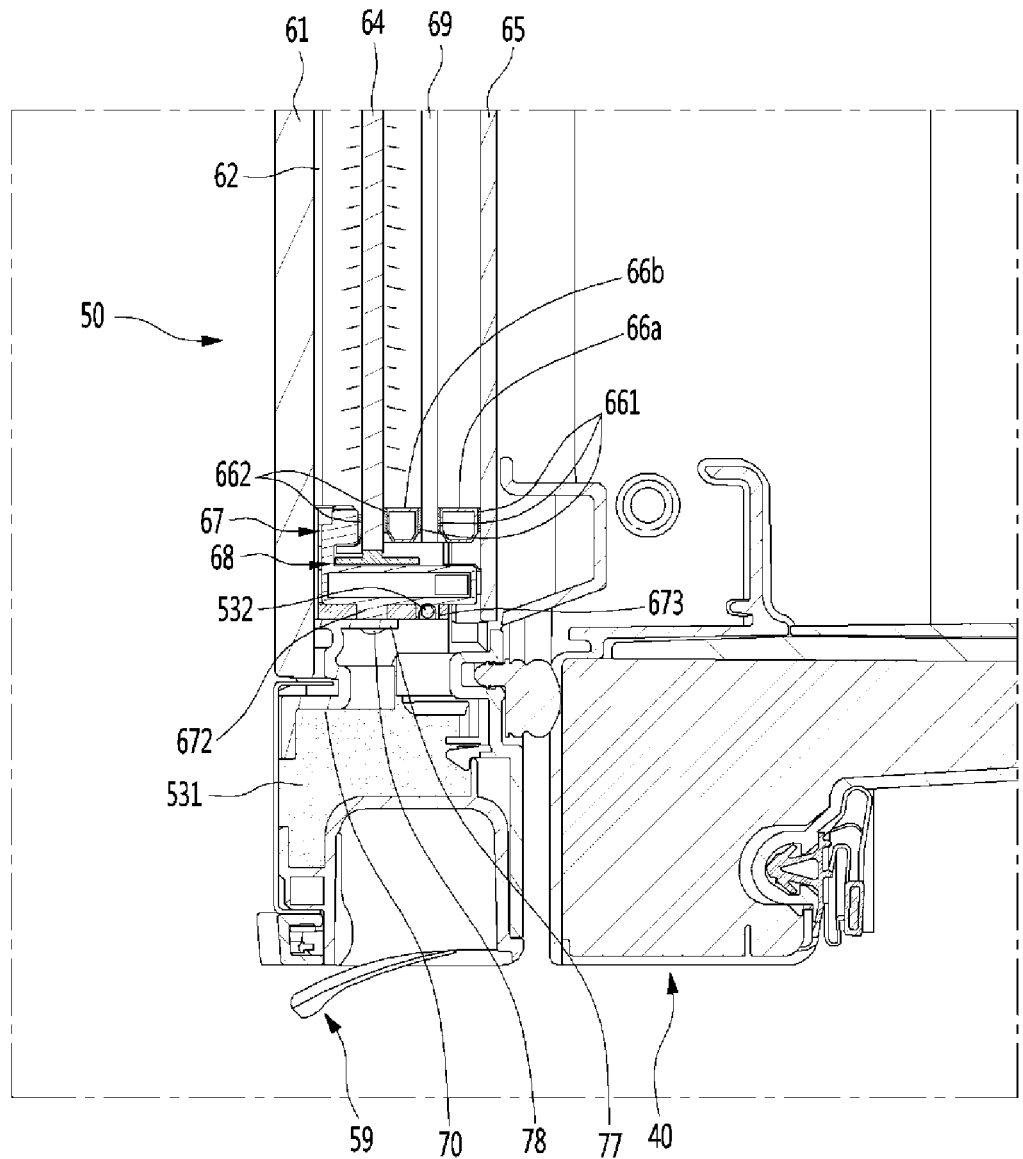
FIG. 35 is an enlarged view illustrating a portion D of FIG. 29.
Figure 36:
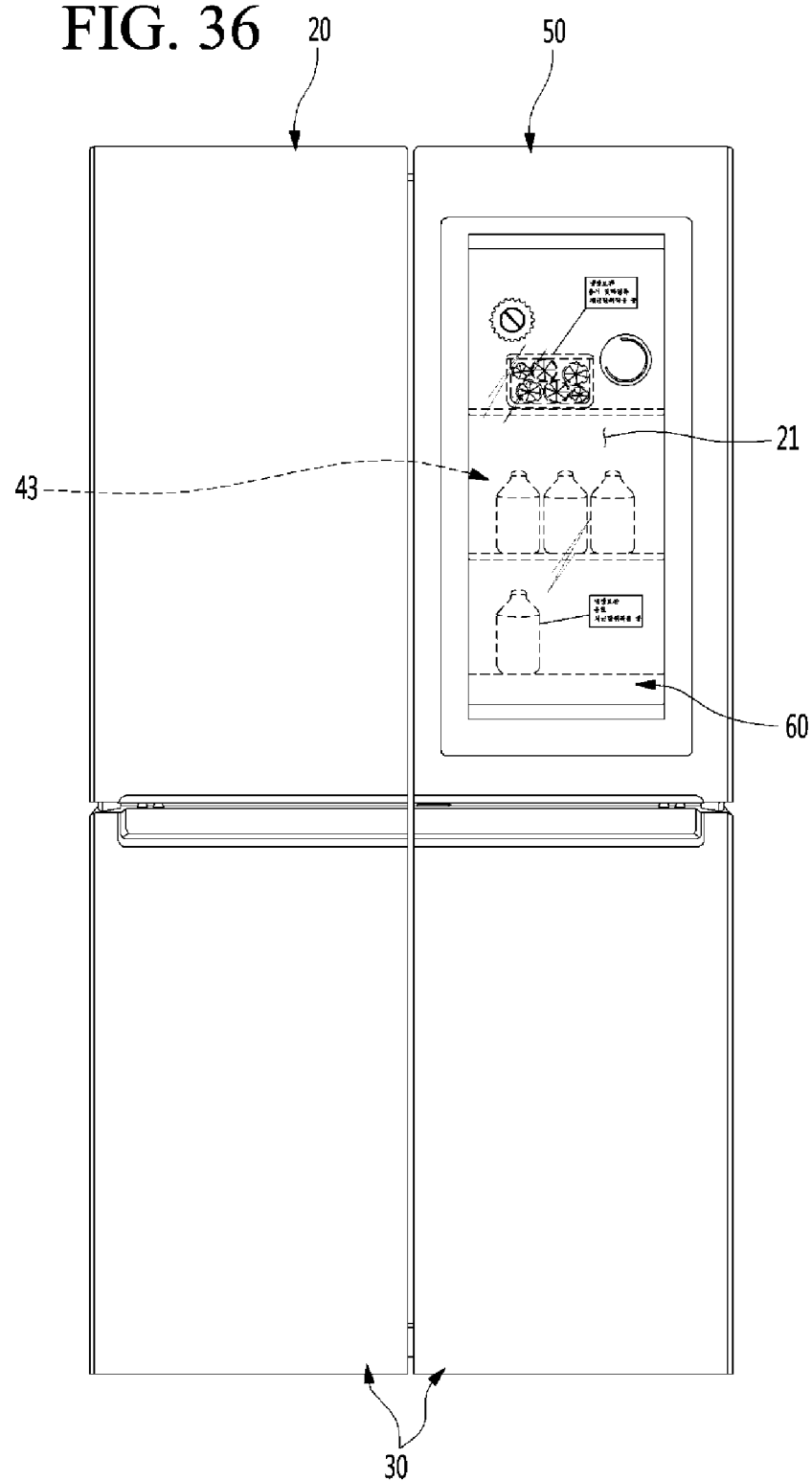
FIG. 36 is a view illustrating a state in which the inside of the refrigerator is visible through the panel assembly.
Figure 37:
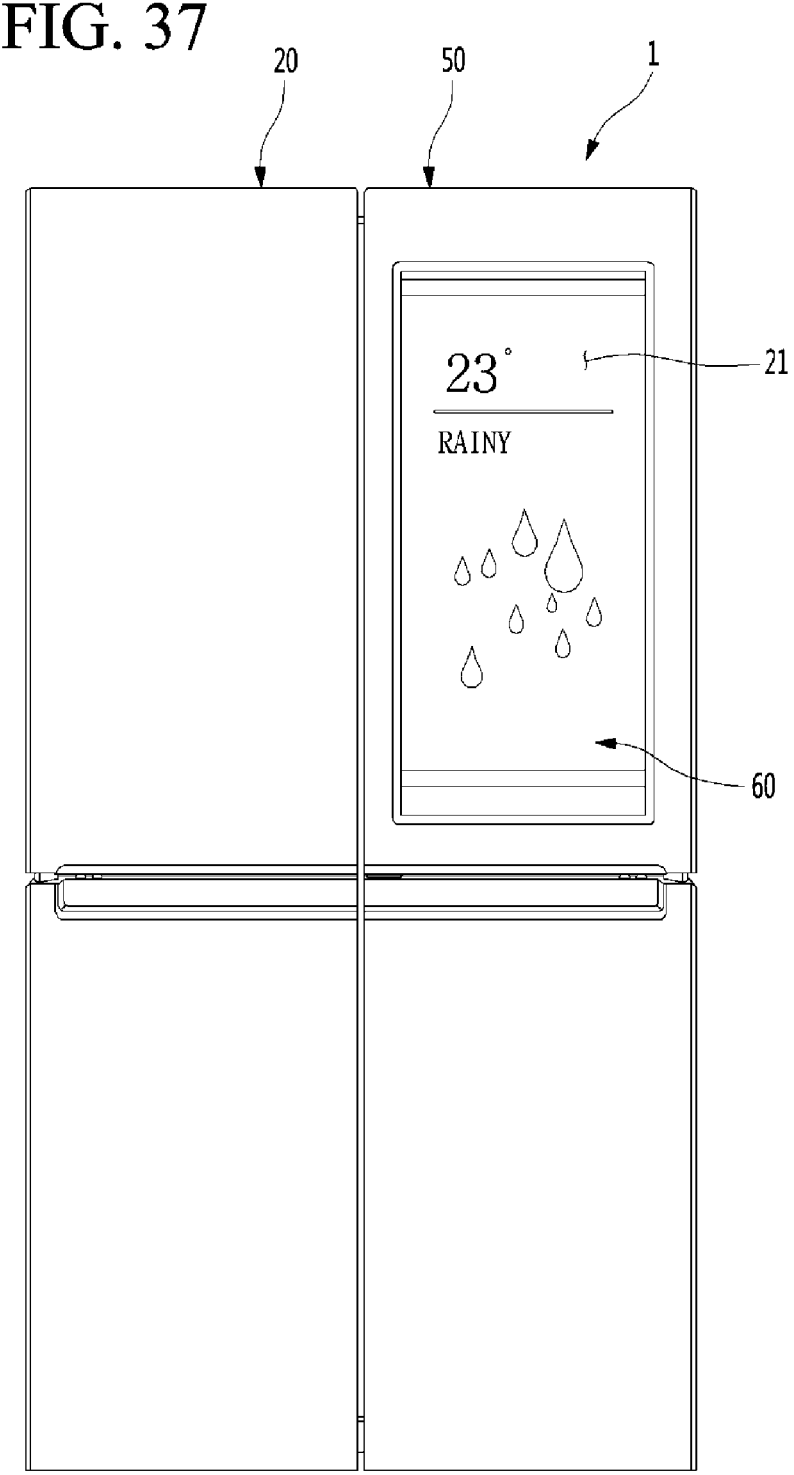
FIG. 37 is a view illustrating a state in which a screen is outputted through the panel assembly.

In this state, the user may touch-manipulate the front panel 51 or manipulate the manipulation input unit 92 to turn on the door light 57. When the door light 57 is turned on, the light emitted to the light emitting member 572 may illuminate a rear region of the sub-door 50. When the storage chamber light 80 is also turned on, the inside of the refrigerating chamber 12 may be illuminated. As illustrated in FIGS. 32 and 35, the inside of the refrigerator may be visible through the see-through part 21.

The structure of the door light 57 will be described in more detail with reference to FIGS. 27 and 28. The door light 57 may include a light emitting member 572, a light case 571 accommodating the light emitting member 572, and a light cover 573 shielding the light case 571 and transmitting light of the light emitting member 572.

In detail, the light case 571 may be disposed on each of both sides of the rear surface of the rear panel 65 to extend from the upper end up to the lower end of the rear panel 65. Also, the light case 571 may be disposed outside both left and right side ends of the see-through part 21 to illuminate the rear region of the panel assembly 60 corresponding to the see-through part 21.

The light case 571 may be inserted into the door liner 56 that protrudes from each of both sides of the rear side of the rear panel 65. Thus, the light case 571 may have a structure that is fixed and mounted on the rear panel 65 by the door liner 56.

One side of the light case 571 may be opened, and an accommodation space 571a in which the light emitting member 572 is accommodated may be defined in the light case 571. The opening of the light case 571 may be disposed between the door liner 56 and the rear panel 65 and be shielded by the light cover 573. Thus, the light cover 573 may be exposed while shielding a portion between the rear panel 65 and the door liner 56, and the light may substantially pass through the light cover 573.

The entire surface of the light case 571 may have a planar shape to contact the rear panel 65. Also, a reflection part 571b that is rounded toward an upper end of the light cover 573 may be disposed on one end of the light case 571. The reflection part 571b may have a predetermined curvature so that the light emitted from the light emitting member 572 is reflected to pass through the light cover 573. Surface treatment such as coating, deposition, and the like for reflecting the light may be performed on an inner surface of the reflection part 571b, i.e., a surface of the reflection part 571b, which faces the inside of the accommodation space 571a.

Also, a shield part 571c extending backward toward the light cover 573 may be disposed on one side in which an opening of the light case 571 is defined. The shield part 571c may be configured to prevent a portion of the light emitted from the light emitting member 572 from being directly emitted to the light guide plate 64. The shield part 571c may extend by a predetermined height to a rear side crossing the rear panel 65.

Also, the light emitting member 572 may be constituted by a PCB 572a and an LED 572b. The LED 572b may be disposed to face the rear side crossing the light guide plate 64. The light emitted from the light emitting member 572 may be reflected by the reflection part 571b to pass through the light cover 573.

One surface of the LED 572b, onto which the light is emitted from the light emitting member 572, i.e., a light emitting surface 572c may be disposed in parallel to the light guide plate 64 to face the reflection surface 571a. Thus, most of the light emitted from the light emitting surface 572c may be emitted toward the reflection surface 571a to pass through the light cover 573.

The light cover 573 may be configured so that a fine pattern is surface-treated on a surface of the light cover 573, a coating process for the diffusion is performed, or a light diffuser is contained in the cover itself. Thus, the light cover 573 may emit light in the form of surface emission by the light scattered while passing through the light cover 573. Also, the light cover 573 may be disposed on the same line as the shield part 571c of the light case 571 and the end of the door liner 56 to provide a sense of unity.

Since the direction of the light emitted from the light emitting member 572 is directed toward the rear side crossing the light guide plate 64, the light may be primarily prevented from being directly emitted to the light guide plate 64, and a portion of the light emitted from the light emitting member 572 may be secondarily prevented from being emitted to the light guide plate 64 by the shield part 571c. Furthermore, the light may pass through the light cover 573 so that the light cover 573 emits light in the form of the surface emission. Thus, while illuminating the storage space defined in the rear side of the sub-door 50, the direct incidence of the light of the light emitting member 572 into the light guide plate 64 may be prevented to prevent the transparency of the light guide plate 64 from being deteriorated.

Various examples of the door light in addition to the above-described examples may be applied to the refrigerator according to an embodiment and will be described with reference to the drawings.

Figure 29:
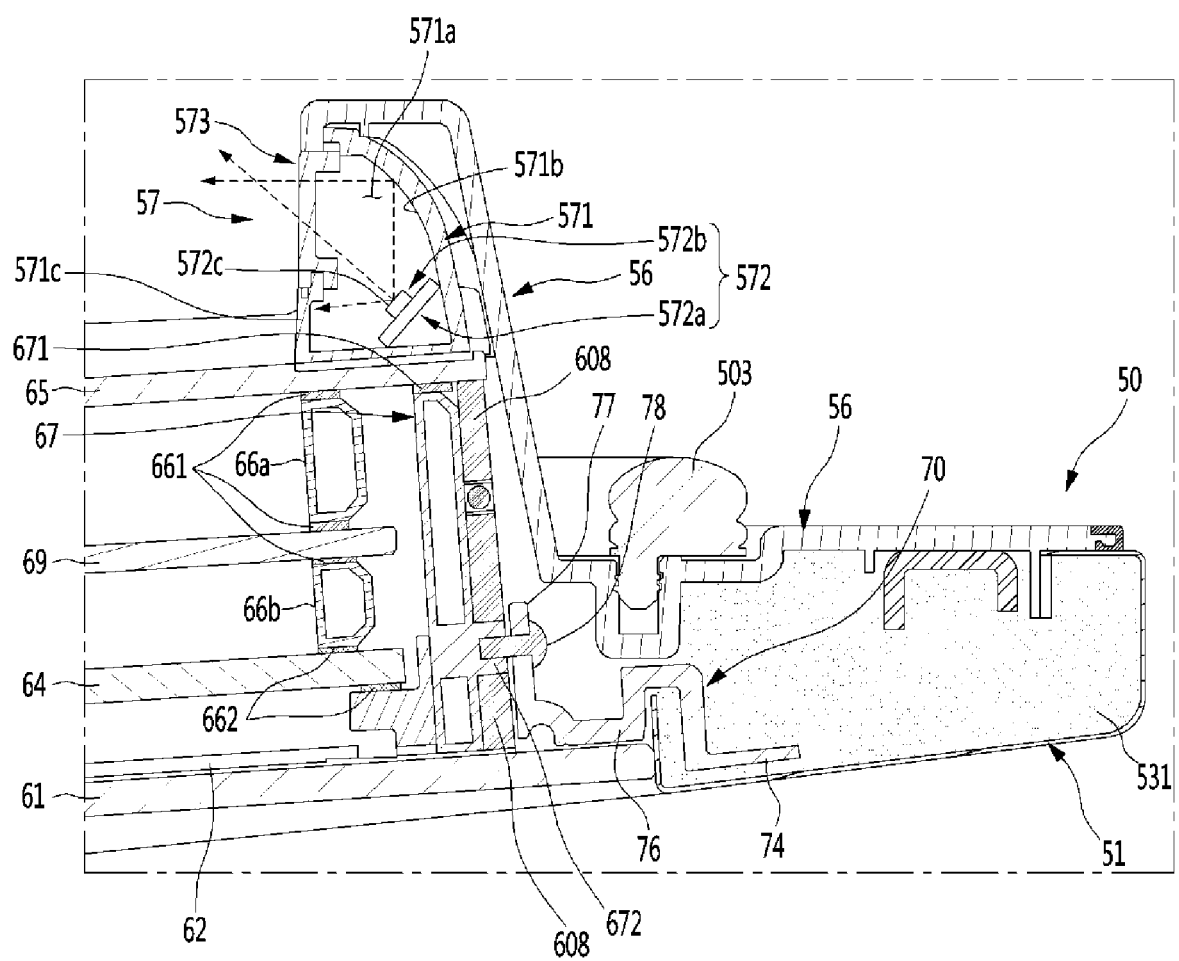
FIG. 29 is a partial cross-sectional view illustrating another example of the door light.

FIG. 29 is a partial cross-sectional view illustrating another example of the door light.

As illustrated in the drawing, the door light 57 according to another example includes a light case 571 and a light cover 573, which have the same structure as those according to the foregoing example.

The light case 571 may be fixed and mounted between the rear panel 65 and the door liner 56, and the reflection part 571b and the shield part 571c may be provided on the light case 571. Also, the light cover 573 may be mounted on the opening of the light case 571 so that the light emitted from the light emitting member 572 pass.

The light emitting member 572 may be disposed in the light case 571 and also be disposed to be inclined somewhat so as to face the rear side of the sub-door 50. That is, the light emitting surface 572c through which the light emitted from the LED 572b of the light emitting member 572 is emitted may be disposed at an angle crossing the light guide plate 64 and be disposed to be inclined somewhat so as to face the rear side of the sub-door 50. Also, most of the light emitted from the LED 572b may be emitted between the inside and the rear side of the sub-door 50, but may not be directly emitted toward the light guide plate 64.

Thus, a portion of the light emitted from the light emitting member 572 may be reflected by the reflection part 571*b* to illuminate the rear side of the sub-door 50, and the other portion of the light may pass through the light cover 573 to illuminate the rear side of the sub-door 50.

Also, a portion of the light emitted from the light emitting member 572, which is emitted toward the light guide plate 64, may be shielded by the shield part 571*c* to prevent the light from being directly emitted to the light guide plate. In this structure, when the door light 57 is turned on, the deterioration of the transparency may be prevented because the light is directly emitted to the light guide plate 64 so as to be emitted from the light guide plate 64.

Figure 30:
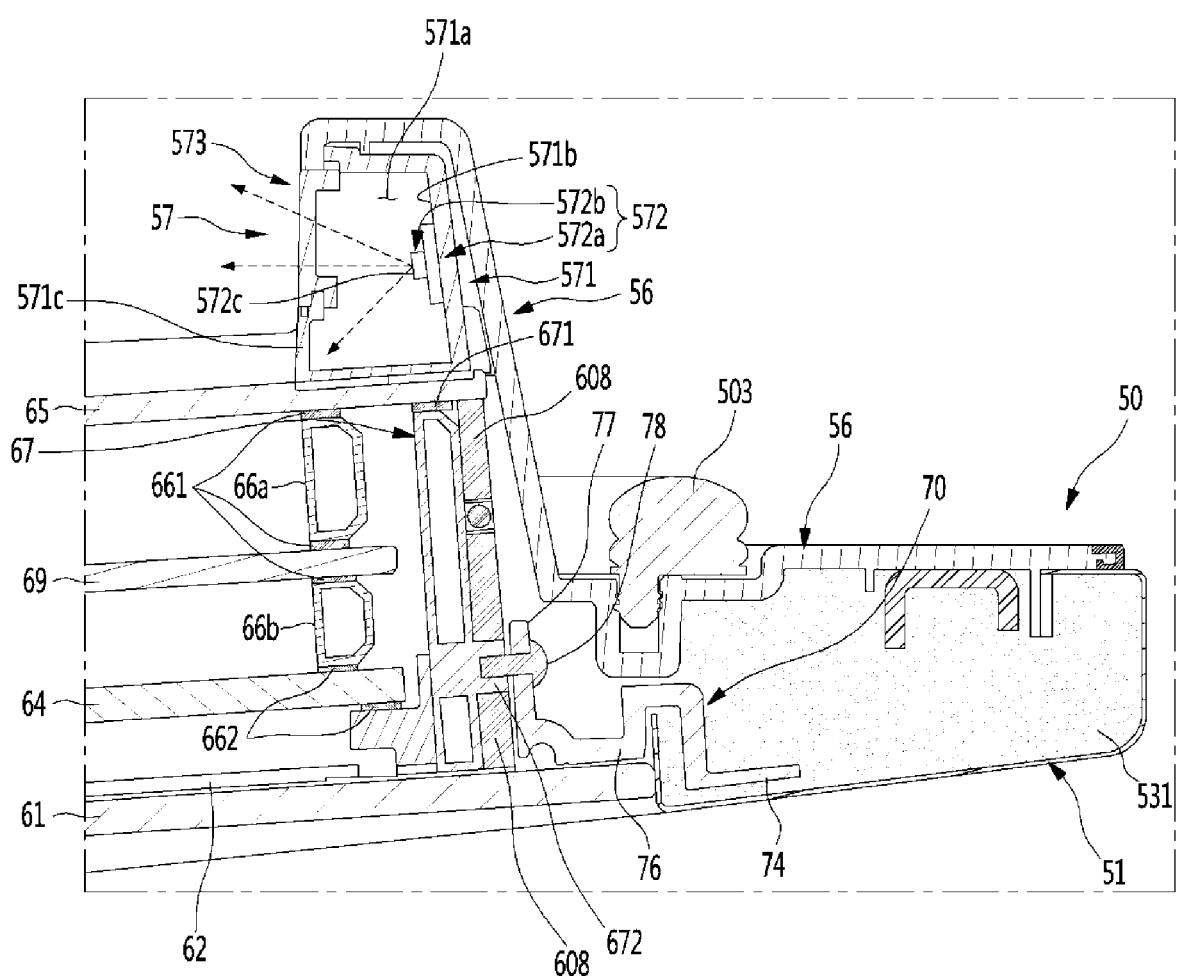
FIG. 30 is a partial cross-sectional view illustrating further another example of the door light.

FIG. 30 is a partial cross-sectional view illustrating further another example of the door light.

As illustrated in the drawing, another example of the door light 57 includes a light case 571 and a light cover 573, which have the same structure as those according to the foregoing examples.

The light case 571 may be fixed and mounted between the rear panel 65 and the door liner 56, and the reflection part 571*b* and the shield part 571*c* may be provided on the light case 571. Also, the light cover 573 may be mounted on the opening of the light case 571 so that the light emitted from the light emitting member 572 pass.

The light emitting member 572 may be disposed in the light case 571 and also be disposed to face the light cover 573. Also, the light emitting surface 572*c* through which the light emitted from the LED 572*b* of the light emitting member 572 is emitted may be disposed at an angle perpendicularly crossing the light guide plate 64. Also, the light emitting surfaces 572*c* of the LEDs 572*b* provided on the door light 57 on both left and right sides may be disposed to face each other. Here, most of the light emitted from the LEDs 572*b* may be emitted in a direction facing each other toward the inside of the sub-door 50.

Also, the light emitting member 572 may be disposed at the same height as at least the shield part 571*c*. Thus, the light, which is emitted over the shield part 571*c*, of the light emitted from the light emitting member 572 may illuminate the rear region of the sub-door 50, and the light emitted toward the light guide plate 64 may be shielded by the shield part 571*c*.

Thus, a portion of the light emitted from the light emitting member 572, which is emitted toward the light guide plate 64, may be shielded by the shield part 571*c* to prevent the light from being directly emitted to the light guide plate 64. In this structure, when the door light 57 is turned on, the direct incident of the light into the light guide plate 64 may be prevented to prevent the transparency from being deteriorated by the direct incident of the light.

Figure 31:
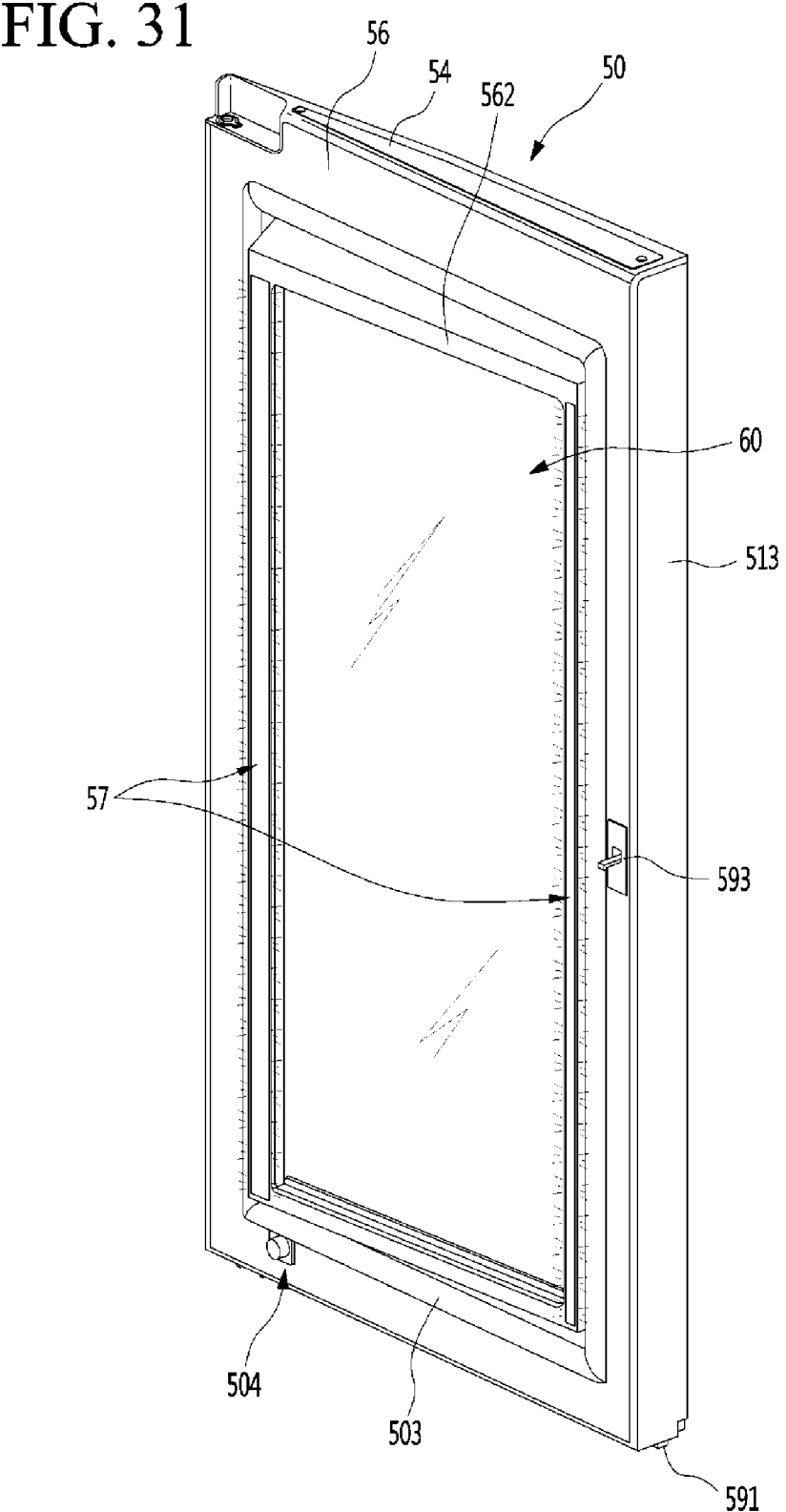
FIG. 31 is a perspective view of a sub-door on which a door light according to further another example is mounted.

FIG. 31 is a perspective view of a sub-door on which a door light according to further another example is mounted.

As illustrated in the drawing, the door light 57 according to another example may be mounted on the door liner 56 protruding backward along a circumference of the panel assembly 60.

The door liner 56 may define the rear surface of the sub-door 50 and include an opening that is shielded by the panel assembly 60. Also, a liner protrusion 562 may be disposed along a circumference of the opening of the door liner 56.

Also, the door liner 57 may be mounted on the liner protrusion 562. The door liner 57 may have the structure according to the forgoing embodiment and include the light cover 573. The light cover 573 may be disposed on each of both sides of the liner protrusion 562 to emit light by transmitting the light according to an operation of the door liner 57.

The light cover 573 may emit the light toward the panel assembly 60, i.e., the rear side of the light guide plate 64. Thus, the rear space of the sub-door 50 may be illuminated so that the inside of the refrigerator is visible through the panel assembly 60.

Here, the door light 57 may not structurally directly emit the light toward the light guide plate 64. Thus, the transparent state of the light guide plate 64 may be maintained, and thus, the space within the refrigerator, which is seen through the see-through part 21, may be more clearly seen.

FIG. 32 is a cross-sectional view of a refrigerator on which a door light according to further another example is mounted.

As illustrated in the drawing, the door light 57 according to another example may be mounted on the main door 40 that is shielded by the sub-door 50. The door light 57 may have the same structure as one of the door lights of FIGS. 28 to 30 except that the door light 57 is mounted on the main door 40.

In detail, the sub-door 50 may shield the opening of the main door 40, and the door light 57 may be mounted on each of both sides of the opening of the main door 40. The door lights 57 may be disposed to face each other to illuminate an opening region of the main door 40.

Here, since the door light 57 has the same structure as one of the door lights of FIGS. 28 to 30, the light, which is emitted toward the light guide plate 64, of the light emitted from the door light 57 may be blocked or minimized.

Thus, when the light is emitted by the operation of the door light 57, the door-side storage space defined in the rear side of the sub-door 50 may be illuminated, and thus, the door-side storage space may be more clearly seen from the outside through the see-through part 21. Also, the direct incident of the light into the light guide plate 64 may be prevented to prevent the light guide plate 64 from emitting light and also prevent the transparency from being deteriorated.

Figure 33:
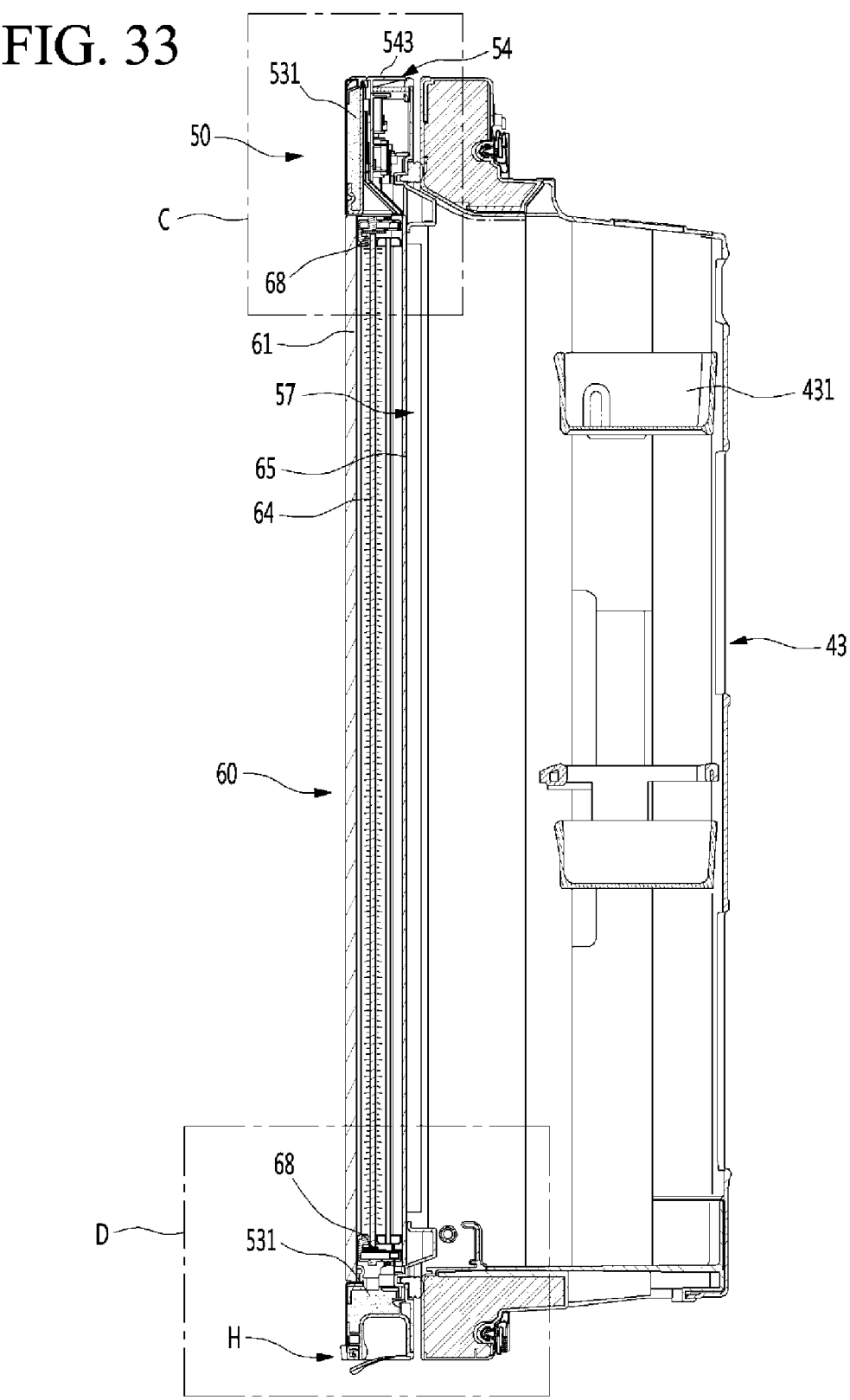
FIG. 33 is a longitudinal cross-sectional view of the main door and the sub-door.
Figure 34:
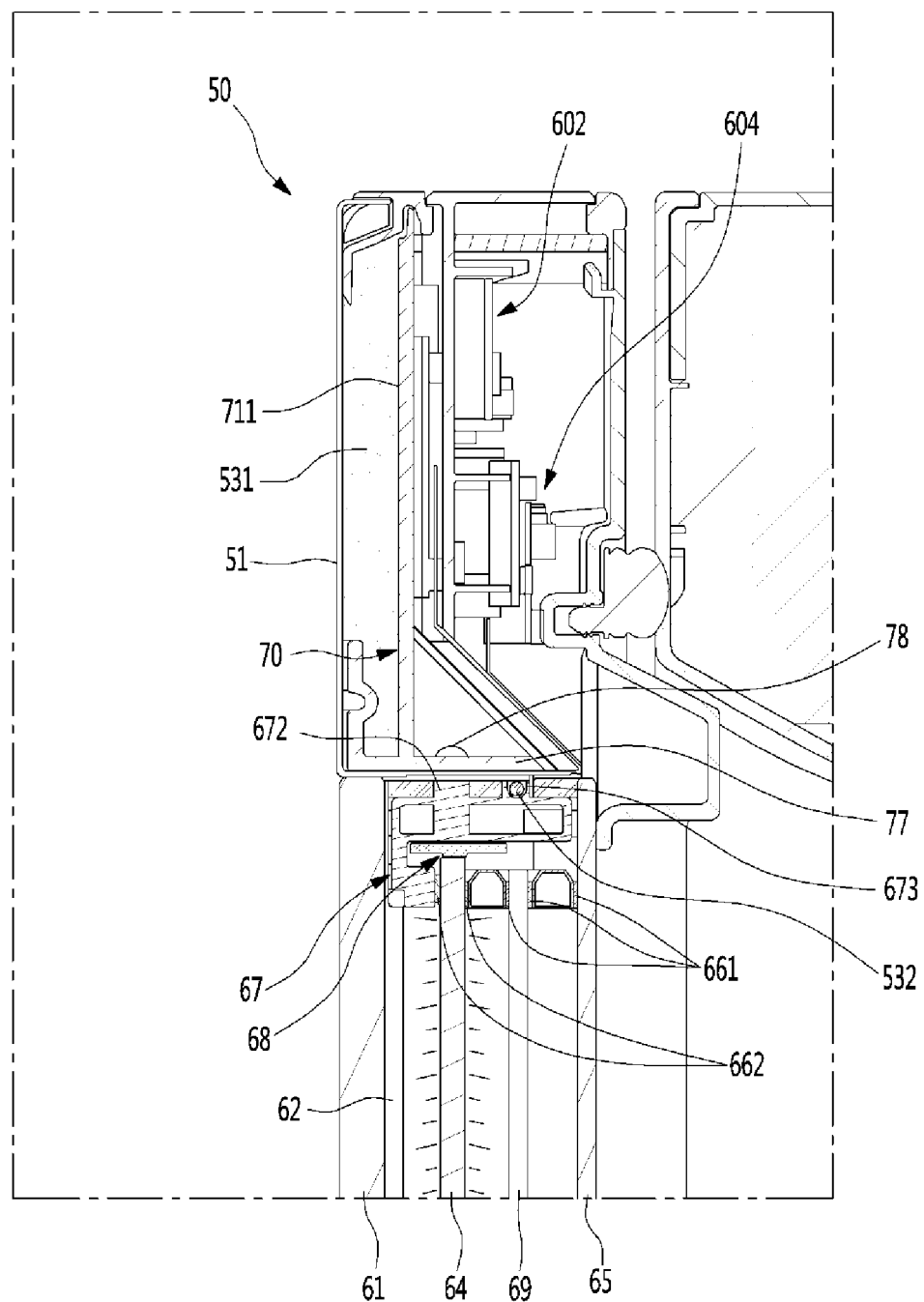
FIG. 34 is an enlarged view illustrating a portion C of FIG. 29.

FIG. 33 is a longitudinal cross-sectional view of the main door and the sub-door. Also, FIG. 34 is an enlarged view illustrating a portion C of FIG. 33. Also, FIG. 35 is an enlarged view illustrating a portion D of FIG. 33.

As illustrated in the drawings, when the user manipulates the front panel 61 disposed on the front surface of the refrigerator 1 or manipulates the manipulation input unit 92, the backlight 68 may be turned on to turn on the display 62. Thus, the panel assembly 60 may output a screen as illustrated in FIG. 33. Here, the manipulation of the front panel 61 may be inputted as one of a specific position, the touch number, or a pattern. As occasion demands, a separate physical button or sensor may be used to detect the user's manipulation.

A screen for displaying a state of the refrigerator 1 and manipulating may be outputted on the display 62. Here, various screens for information with respect to stored foods may be outputted by using Internet, image output external input devices, or the like.

In detail, the backlight 68 disposed on each of the upper and lower ends of the light guide plate 64 may be turned on together with the display 62 by the user's manipulation. The light guide plate 64 may irregularly reflect and diffuse light of the backlight 68 by the turn-on of the backlight 68 to emit light having generally uniform brightness to the front display 62.

Also, light may be emitted to the display 62 from the rear side of the display 62 by the light guide plate 64, and simultaneously, a screen based on inputted image information may be outputted on the display 62. Thus, the user may confirm the clearly outputted screen through the see-through part 21.

Particularly, the light guide plate 64 may contain the diffuser 643 to scatter the light induced into the light guide plate 64, thereby uniformly illuminating the entire light guide plate 64. That is, since the separate reflection sheet or the pattern are not provided on the rear surface of the light guide plate 64, the inside of the refrigerator may be visible in the state in which the light is not emitted. When the light is emitted by the backlight 68, the entire surface of the light guide plate 64 may be uniformly illuminated.

Also, the operation of the display 62 and the operations of the door lights 57 may be controlled by the PCBs 602, 603, and 604 such as the T-CON board 602 or the docking PCB 604 above the sub-door 50. Also, these PCBs 602, 603, and 604 may be arranged on the rear space of the sub-door 50, which is partitioned by the barrier 711 defining the upper end of the support frame 70. Also, the insulator 531a may be filled in a front space of the sub-door 50, which is partitioned by the barrier 711, and thus dew condensation may be prevented from being generated on an upper side of the front surface of the sub-door 50.

When all the backlight 68 and the door light 57 are turned off, in the state in which the screen is being outputted through the display 62, the space within the refrigerator, i.e., the rear space of the sub-door 50 may be selectively seen through the see-through part 21.

That is, when the backlight 68 and the display 62 is turned on to illuminate the internal space of the refrigerator in the state in which information is being outputted through the see-through part 21, the internal space of the refrigerator may be visible. Thus, the user may confirm the information through the display 62 while seeing the inside of the refrigerator or may manipulate the display 62 to input and process information.

The backlight 68 and the door light 57 may be disposed in a direction crossing each other. The backlight 68 may be disposed further forward than the door light 57 and be disposed above and below the light guide plate so the light is emitted to the upper and lower ends of the light guide plate 64. Also, the door light 57 may be disposed further behind the backlight 68 and be disposed on both left and right sides of the light guide plate to emit light to the rear space of the light guide plate, thereby illuminating the door-side storage space.

When viewed with respect to the light guide plate 64, the backlight 68 may be disposed above and below the light guide plate 64, and the door light 57 may be disposed on both left and right sides of the light guide plate 64 to uniformly illuminate the light guide plate 64 and the rear region of the light guide plate 64.

Figure 38:
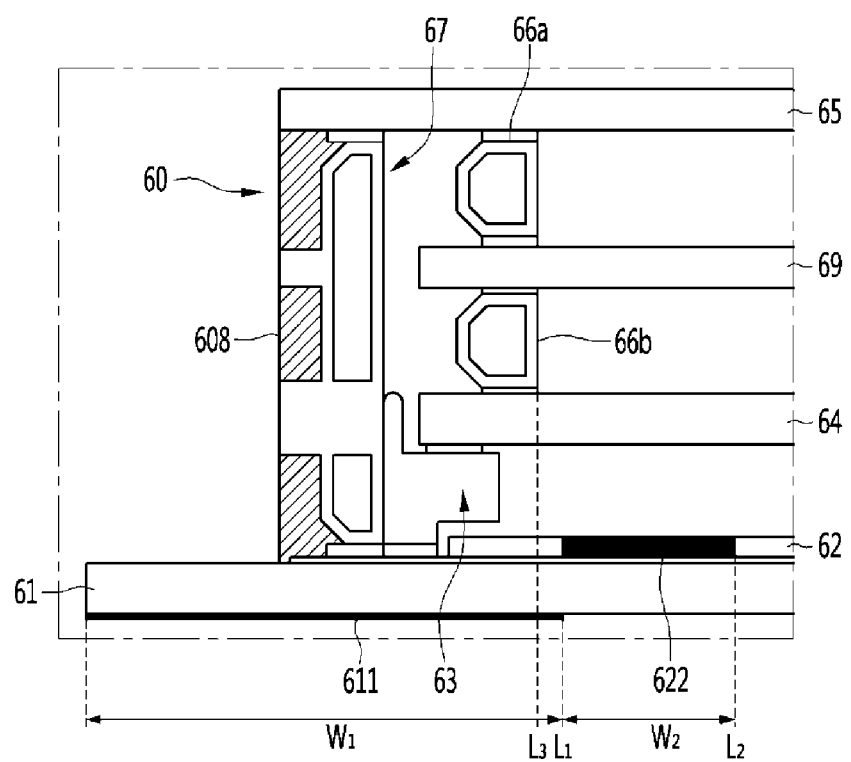
FIG. 38 is a partial cross-sectional view illustrating a state in which a second bezel is outputted according to an embodiment.
Figure 39:
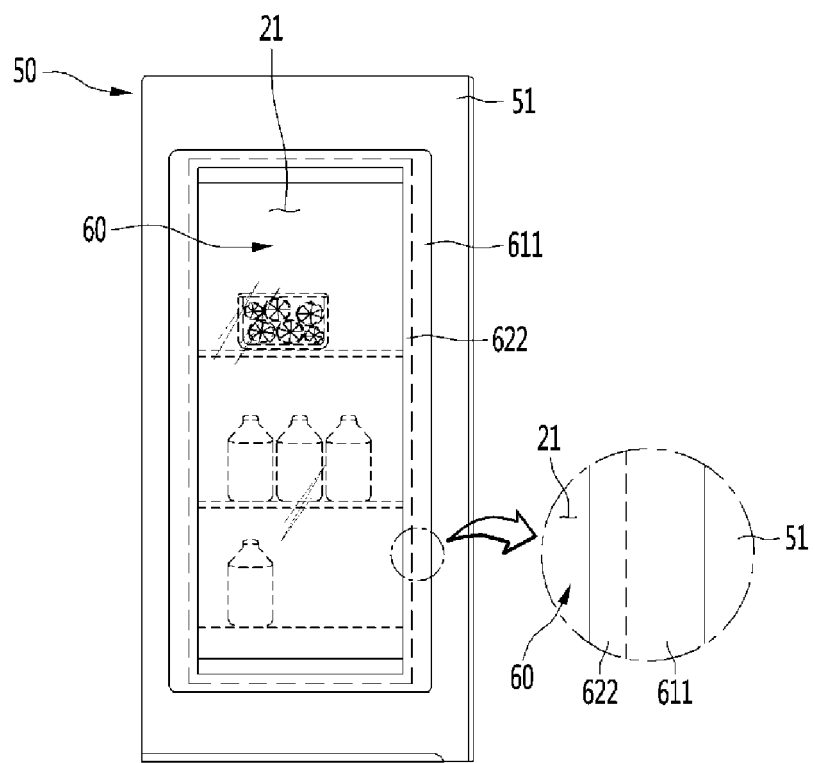
FIG. 39 is a front view illustrating a state of a door on which the second bezel is outputted.
Figure 40:
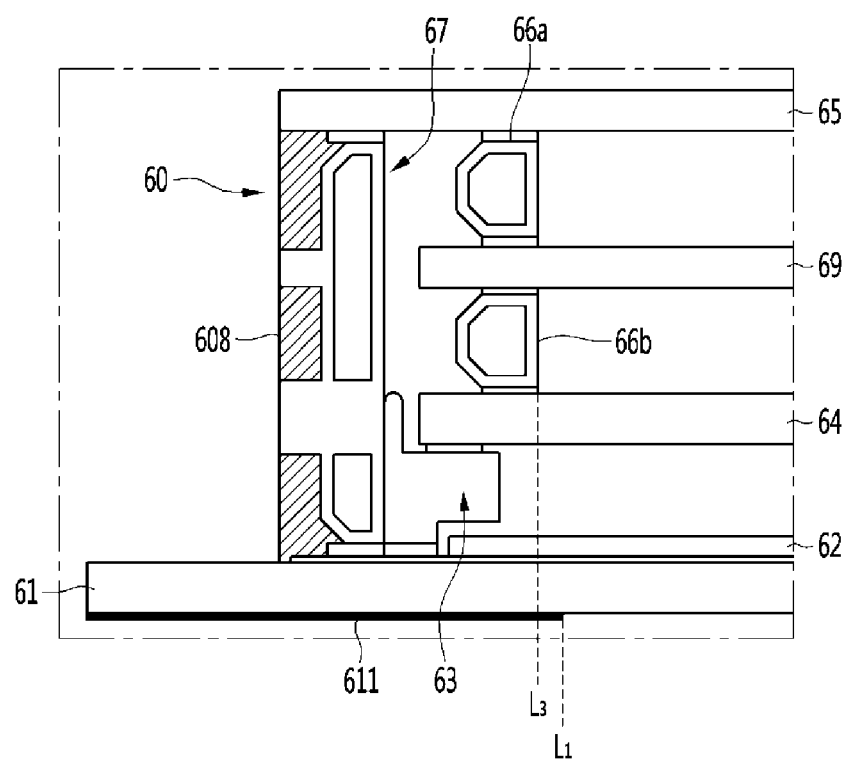
FIG. 40 is a partial cross-sectional view illustrating a state in which the second bezel is not outputted according to an embodiment.
Figure 41:
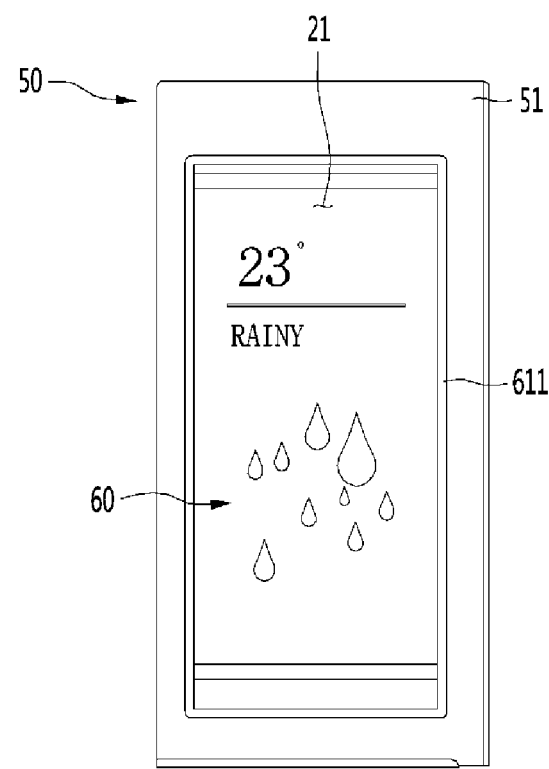
FIG. 41 is a front view illustrating a state of the door in a state in which the second bezel is not outputted.

FIG. 38 is a partial cross-sectional view illustrating a state in which a second bezel is outputted according to an embodiment. Also, FIG. 39 is a front view illustrating a state of the door on which the second bezel is outputted. Also, FIG. 40 is a partial cross-sectional view illustrating a state in which the second bezel is not outputted according to an embodiment. Also, FIG. 41 is a front view illustrating a state of the door in a state in which the second bezel is not outputted.

As illustrated in the drawings, a first bezel 611 may be disposed on a circumference of the front panel 61 defining the front surface of the panel assembly 60.

The first bezel 611 may be opaque to conceal constituents coupled to the circumference of the panel assembly 60. The first bezel 611 may have a sufficient width so that the constituents coupled to the circumference of the panel assembly 60 are not visible.

However, when the width of the first bezel 611 is excessively wide, an area of the see-through part 21 provided inside the panel assembly 60 is narrowed. When the area of the see-through part 21 is narrowed, inconvenience in use may increase, and a poor outer appearance may be provided.

The first bezel 611 may have a predetermined width at an outer end of the front panel 61. An end L1 of the first bezel 611 may be equal to an end L3 of a constituent (for example, each of the second spacers 66a and 66b) disposed at the innermost position among the constituents coupled to the circumference of the panel assembly 60 or further extend somewhat inward (a right side of FIG. 38).

When the first bezel 611 has the above-described width, the constituents such as the first spacer 63 and the second spacers 66a and 66b, which are coupled to the circumference of the panel assembly 60, and the coupled structure thereof may be covered by the first bezel 611 so as not be seen when the panel assembly 60 is viewed from the front side.

However, the user may see the see-through part at one side that is away somewhat from the panel assembly 60 such as a case in which the user does not always see the see-through part 21 at a center of the panel assembly 60 and, in some cases, is disposed at the center of the refrigerator 1. In this case, the constituents coupled to the panel assembly 60 may be exposed by the first bezel 611 through the see-through part 21. Thus, second bezel 622 for shielding the remaining area that is not shielded by the first bezel 611 may be provided.

The first bezel 611 may be exposed on the front panel 61 by printing and the like. On the other hand, the second bezel 622 may be outputted through the display 62 as necessary. Thus, the second bezel 622 may not be physically formed by printing or adhesion, but be formed by the screen output of the display 62. Thus, the second bezel 622 may be called a virtual bezel. Also, the second bezel 622 may have the same color as that of the first bezel 611 so that the second bezel 622 is seen as an integral part of the first bezel 611 when being outputted and also may have a black, a black-based color, or other deep color so that the inside is invisible so as to have excellent hiding performance.

The second bezel may have a predetermined width W2 at an end of the first bezel 611 or somewhat outside the end of the first bezel 611. The end L2 of the second bezel 622 may extend up to a position at which the constituents coupled to the circumference of the panel assembly 60 are not seen when viewed at the center of the refrigerator 1. Thus, in the state in which the second bezel 622 is outputted, the circumference of the panel assembly 60 may be covered by the width of the first and second bezels 611 and 612.

Also, the area of the see-through part 21 may be defined by the first bezel 611 or defined by the first bezel 611 and the second bezel 622 according to the screen output state of the see-through part 21. The second bezel 622 may be configured to be outputted by the display 62 and thus be set to various widths according to user's setting.

For example, when the see-through part 21 is transparent, and the inside of the refrigerator is seen through the see-through part 21, the panel assembly 60 becomes transparent so that the coupled portion of the circumference of the panel assembly 60 as well as the inside of the refrigerator may be seen to output the second bezel 622 as illustrated in FIG. 34.

Thus, as illustrated in FIG. 39, the circumference of the panel assembly 60 may be shielded by the first bezel 611 and the second bezel 622, and the see-through part 21 may be defined as an internal area of the bezel 622. In this state, even if the user sees the see-through part 21 in a state in which the user is disposed at the center of the refrigerator 1, i.e., at the side of the see-through part 21, the internal circumference of the panel assembly 60 may extend to be covered by the second bezel 622.

Also, in the state in which the see-through part 21 is opaque, that is, when the display 62 is turned off, or the see-through part 21 is opaque so that the inside is not visible, the display 62 may not output the second bezel 622 as illustrated in FIG. 40. Also, as illustrated in FIG. 41, even when an picture or an image is outputted through the display 62 without seeing the inside through the see-through part 21, the display 62 may not output the second bezel 622.

In this state, since the see-through part 21 is already opaque, the inside of the panel assembly 60 is not well visible through the see-through 21 even though the second bezel 622 is not outputted. Thus, the second bezel 622 may not be outputted.

Thus, the circumference of the panel assembly 60 may be shielded by only the first bezel 611 as illustrated in FIG. 41, and the see-through part 21 may be defined as the inner region of the first bezel 611. Also, the see-through part 21 in FIG. 41 may be wider than the see-through part 21 in the state as illustrated in FIG. 39. Thus, the see-through part 21 may be seen to be enlarged when the see-through part 21 is opaque. Also, the operation of the display 62 allows the see-through part 21 to output the screen on a wider area, thereby improving convenience of use and an outer appearance.

Figure 42:
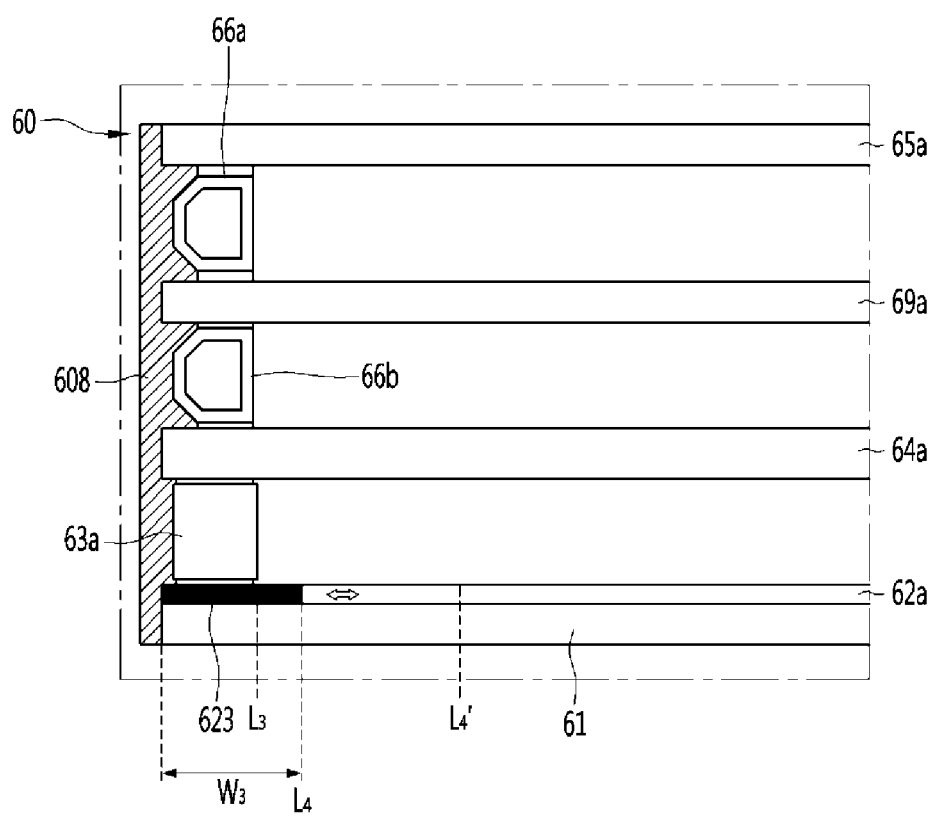
FIG. 42 is a partial cross-sectional view illustrating an output state of a third bezel in another example of the panel assembly.
Figure 43:
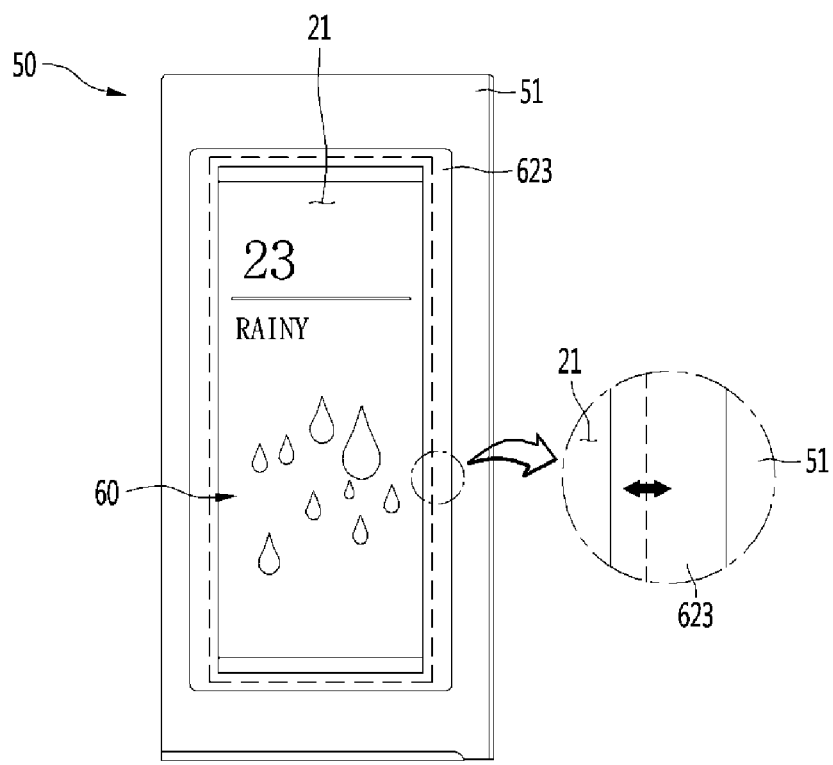
FIG. 43 is a front view of the door in a state in which the third bezel is outputted.

FIG. 42 is a partial cross-sectional view illustrating an output state of a third bezel in another example of the panel assembly. Also, FIG. 43 is a front view of the door in a state in which the third bezel is outputted.

As illustrated in the drawings, a panel assembly 60 according to another example may include a front panel 61, a rear panel 65, a heat insulation panel 69, and a light guide plate 64. A display 62 may be disposed on a rear surface of the front panel 61, and the light guide plate 64 may maintain a proper interval with respect to the display 62 by a first spacer 63.

Also, a heat insulation spacer 66a may be provided between the light guide plate 64 and the heat insulation panel 69 and between the heat insulation panel 69 and the rear panel 65 to form a heat insulation space between the rear panel 65 and the heat insulation panel 69 and/or between the heat insulation panel 69 and the light guide plate 64. Also, a sealant 68 may be applied to a circumference of the panel assembly 60 to seal the inside of the panel assembly 60.

Also, although not shown, a backlight 68 may be provided on each of both ends of the light guide plate 64, and a touch sensor film may be attached to the front panel 61.

Each of the display 62 and the light guide plate 64 may have a size corresponding to the front panel 61. Thus, when the display 62 operates, a screen may be outputted on the entire front panel 61.

Thus, the display may output a third bezel 623 on the circumference of the display 62. The circumference of the front panel 61 may be an opaque state, i.e., a state in which a physical bezel having a printed or attached form such as the first bezel 611 according to the foregoing embodiment is not formed. Thus, the circumference of the panel assembly 60 may be covered by only the output of the third bezel 623.

Since the third bezel 623 is outputted by the operation of the display 62 like the second bezel 622 according to the above-described embodiment, the third bezel 623 may be called a virtual bezel and be outputted with a black color. The third bezel 623 may vary to have various widths.

For example, as illustrated in FIG. 42, in the state in which the screen is outputted through the display 62, or the see-through part 21 is opaque, the third bezel 623 may extend from one end of the front panel 61 by a predetermined distance and have a predetermined with W3. Here, the end L4 and L4' of the third bezel 623 may be disposed more inward than the innermost constituent of the constituents (for example, the first spacer 63 or the second spacers 66a and 66b) within the panel assembly 60. Thus, when the user sees the see-through part 21 at the front side, the internal constituents of the panel assembly 60 may be covered.

Also, as illustrated in FIG. 43, the third bezel 623 may have a minimum width that allows the internal constituents of the panel assembly 60 to be covered even when the screen is being outputted through the display 62. Thus, the screen 21 may be maximally extended, and the screen may be outputted through the screen 21.

The see-through part 21 may be transparent when the inside is seen through the see-through part 21. Here, since the constituents around the panel assembly 60 are visible, the display 62 may further increase in width of the third bezel 623 to output the third bezel 623. Also, when the width of the third bezel 623 increases, the constituents around the panel assembly 60 may invisible even if the third bezel 623 is seen through the see-through part 21 in the lateral direction.

When the position of the user is capable of being detected in the refrigerator 1, the width of the third bezel 623 or the second bezel 622 according to the above-described embodiment may vary according to the position of the user to cover the constituents around the panel assembly 60, and the size of the see-through part 21 may be defined as an optimal size according to the situation.

The present disclosure may be realized according to various embodiments in addition to the above-described embodiment, and the door of the above-described embodiments may be applied to refrigerators having various structures.

The following embodiments are different from each other only in the position and size of the door, and the same reference numerals are used for the door structures of the above-described embodiments, and detailed descriptions thereof will be omitted.

Figure 44:
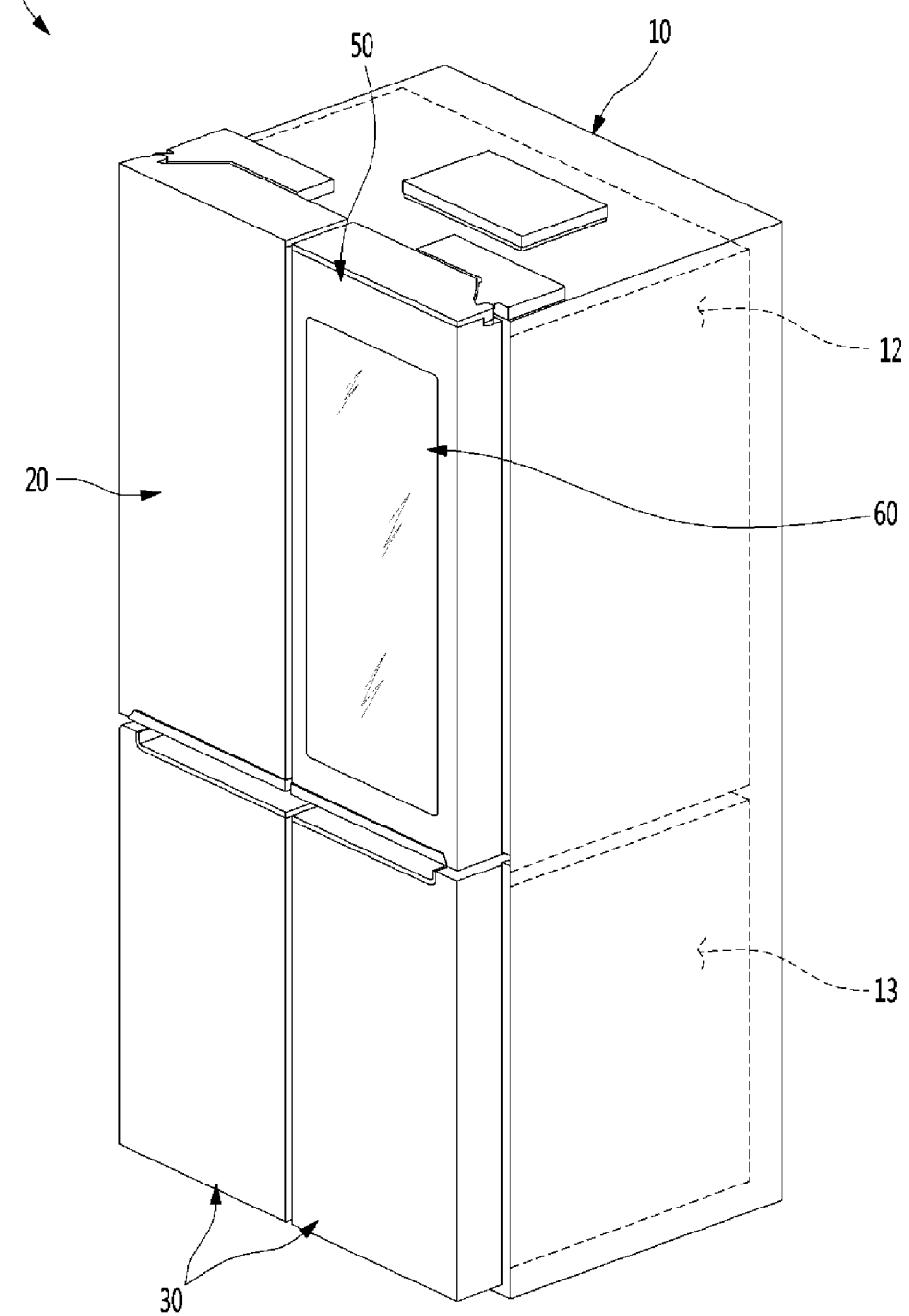
FIG. 44 is a perspective view of a refrigerator according to another embodiment.

FIG. 44 is a perspective view of a refrigerator according to another embodiment.

As illustrated in the drawing, a refrigerator 1 according to the tenth embodiment of the present disclosure may be formed by a cabinet 10 in which a storage space is formed, and a plurality of doors 20, 30, and 50 configured to open/close the storage space. A first storage space 12 and a second storage space 13 may be vertically partitioned inside the cabinet 10. Further, the first storage space 12 and the second storage space 13 may be controlled to be operated at different temperatures, and may be configured as, for example, a refrigerating chamber and a freezing chamber. The first storage space 12 and the second storage space 13 may be opened/closed by the pair of doors 20, 30, and 50.

The pair of doors 20 and 50 configured to open/close the first storage space 12 may be rotatably mounted on the cabinet 10. Further, the pair of doors 20 and 50 may include the door 20 configured to shield the left side of the first storage space 12 and the door 50 configured to shield the right side of the first storage space 12.

The door 50 may include a see-through part allowing an inside to be selectively seen, and the see-through part may be configured by the transparent panel assembly 60. Meanwhile, the door 50 may be configured to be identical to any one of the doors according to the above-described embodiments, and the detailed descriptions thereof will be omitted.

Meanwhile, lighting members may be further provided in the door 50 and/or the first storage space 12, and when the lighting members are turned on, the transparent panel assembly 60 becomes transparent so that a space inside the refrigerator 1 is seen. Further, when the lighting members are turned off, the transparent panel assembly 60 becomes opaque so that the space inside the refrigerator is not seen.

Figure 45:
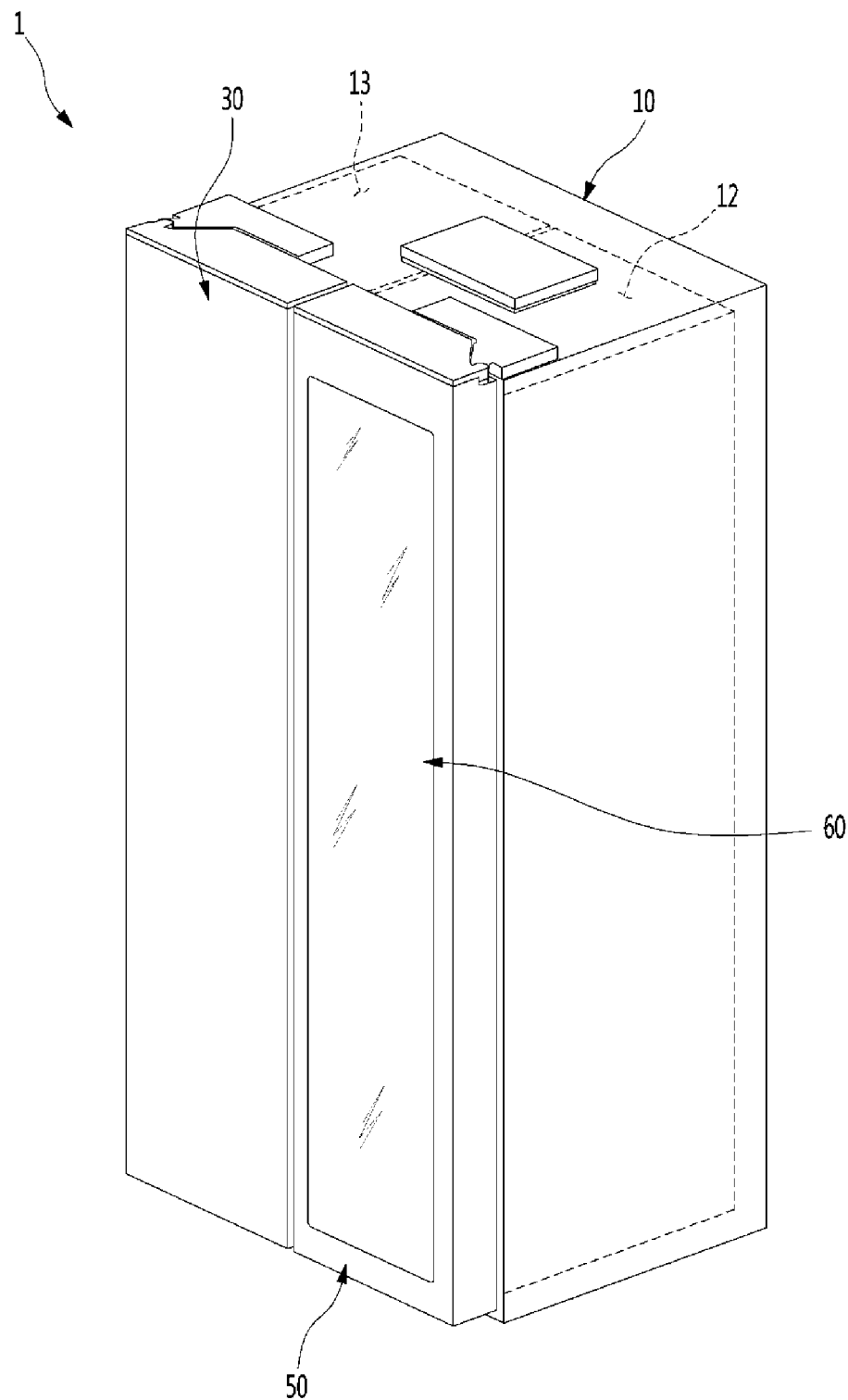
FIG. 45 is a perspective view of a refrigerator according to another embodiment.

FIG. 45 is a perspective view of a refrigerator according to another embodiment.

As illustrated in the drawing, a refrigerator 1 according to the eleventh embodiment of the present disclosure may be formed by a cabinet 10 in which a storage space is formed, and a pair of doors 30 and 50 configured to open/close the storage space. A first storage space 12 and a second storage space 13 may be transversely partitioned inside the cabinet 10. Further, the first storage space 12 and the second storage space 13 may be controlled to be operated at different temperatures, and may be configured as, for example, a refrigerating chamber and a freezing chamber. The first storage space 12 and the second storage space 13 may be opened/closed by the pair of doors 30 and 50, respectively.

The pair of doors 30 and 50 may be rotatably mounted on the cabinet 10. Further, the pair of doors 30 and 50 may include the door 30 configured to shield the left second storage space 13 and the door 50 configured to shield the right first storage space 12.

The door 50 may include a see-through part allowing an inside to be selectively seen, and the see-through part may be configured by the transparent panel assembly 60. Meanwhile, the door 50 may be configured to be identical to any one of the doors according to the above-described embodiments, and the detailed descriptions thereof will be omitted.

Meanwhile, lighting members may be further provided in the door 50 and/or the first storage space 12, and when the lighting members are turned on, the transparent panel assembly 60 becomes transparent so that a space inside the refrigerator 1 is seen. Further, when the lighting members are turned off, the transparent panel assembly 60 becomes opaque so that the space inside the refrigerator is not seen.

Figure 46:
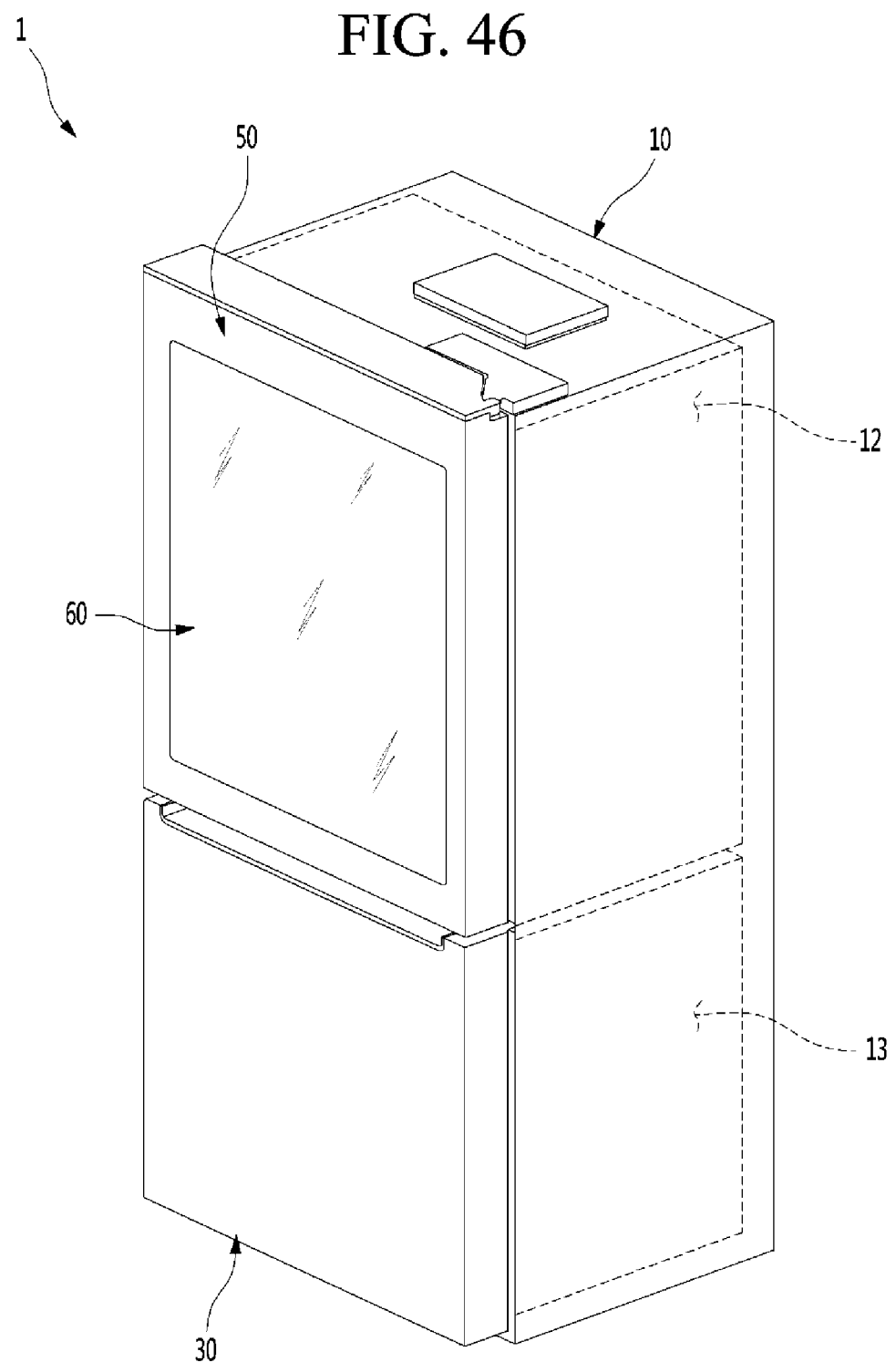
FIG. 46 is a perspective view of a refrigerator according to another embodiment.

FIG. 46 is a perspective view of a refrigerator according to another embodiment.

As illustrated in the drawing, a refrigerator 1 according to the eleventh embodiment of the present disclosure may be formed by a cabinet 10 in which a storage space is formed, and a pair of doors 30 and 50 configured to open/close the storage space. A first storage space 12 and a second storage space 13 may be vertically partitioned inside the cabinet 10. Further, the first storage space 12 and the second storage space 13 may be controlled to be operated at different temperatures, and may be configured as, for example, a refrigerating chamber and a freezing chamber. The first storage space 12 and the second storage space 13 may be opened/closed by the pair of doors 30 and 50, respectively.

The pair of doors 30 and 50 may be rotatably mounted on the cabinet 10. Further, the pair of doors 30 and 50 may include the door 50 configured to shield the first storage space 12 and the door 50 configured to shield the second storage space 13.

The door 50 may include a see-through part allowing an inside to be selectively seen, and the see-through part may be configured by the transparent panel assembly 60. Meanwhile, the door 50 may be configured to be identical to any one of the doors according to the above-described embodiments, and the detailed descriptions thereof will be omitted.

Meanwhile, lighting members may be further provided in the door 50 and/or the first storage space 12, and when the lighting members are turned on, the transparent panel assembly 60 becomes transparent so that a space inside the refrigerator 1 is seen. Further, when the lighting members are turned off, the transparent panel assembly 60 becomes opaque so that the space inside the refrigerator is not seen.

The present disclosure may be applied to all types of refrigerators having the door configured to shield at least a portion of the storage space, regardless of types of refrigerators.

The following effects may be expected in the refrigerator according to the proposed embodiments of the present invention.

In the refrigerator according to the embodiment of the present disclosure, the see-through part may be selectively switched to be transparent or opaque to visualize the interior of the refrigerator, and the user may check the interior of the refrigerator without opening the door to improve the convenience in use and reduce the power consumption.

Also, the screen may be outputted through the see-through part, and the see-through part may be converted for the purpose of the confirming the inside of the refrigerator and for the purpose of outputting the screen according to the intention of the user to improve the use convenience.

Also, the opaque elements such as the reflection layer and the patterns may be removed from the panel assembly according to an embodiment so that the inside of the refrigerator is visible. When the opaque elements such as the reflection layer and the patterns are omitted, the entire light guide plate may not be uniformly illuminated to cause the shaded portion on some areas. However, when the light diffuser is contained in the light guide plate, the entire surface of the light guide plate may be uniformly illuminated by the light diffuser even in the above-described structure. Also, even when the screen of the display is outputted, the shaded portion may not occur on the display to maintain the uniform brightness so that the output performance of the screen is capable of being maintained while being visible.

Particularly, to confirm the inside of the refrigerator through the see-through part, the light of the inside of the refrigerator, i.e., the door light and/or the storage chamber light have to be turned on. Here, the structure for preventing the light of the door light and/or the storage chamber light from being directly irradiated onto the light guide plate containing the light diffuser to prevent the transparency of the light guide plate from being deteriorated due to the introduction of the light.

Thus, in the case in which the inside of the refrigerator is visible while the entire screen has the uniform brightness by the light diffuser when the display is outputted, the deterioration of the transparency of the light guide plate may be minimized by the light irradiated from the door light and/or the storage chamber light so that the inside of the refrigerator is clearly visible.

Also, the first bezel may be disposed around the panel assembly to shield the constituents such as the spacers disposed along the circumference of the panel assembly. Also, the second bezel may be outputted through the display to effectively shield the constituents coupled along the circumference of the panel assembly even when the user sees the see-through part at the one side.

Also, the second bezel may be outputted only when the inside of the refrigerator is viewed to expand the opaque area around the panel assembly. Thus, when the user sees the see-through part at various general use positions, the circumference of the panel assembly may be effectively shielded. Also, the second bezel may not be outputted in the state in which the see-through part is opaque, or the screen is being outputted. Thus, the user may recognize the see-through part as if the area of the see-through part is expanded, or the region that is capable of substantially outputting the screen may be expanded.

Also, the width of the second bezel outputted by the display may be variable according to the situation. Thus, the optimum area of the see-through part may be provided according to the use state.

Also, the circumference of the transparent display panel may be opaque through only the third bezel outputted by the display without forming the physical first bezel on the display assembly. Thus, the separate process of forming the first bezel may be unnecessary to improve the productivity and reduce the manufacturing cost.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A refrigerator comprising:
    a cabinet defining a storage space;
    a door disposed at a front side of the cabinet to close the storage space and having an opening;
    a panel assembly provided in the opening and comprising a see-through region; and
    a storage chamber light installed on an inner side-wall of the cabinet;
    wherein the panel assembly comprises:
        a front panel;
        a rear panel disposed to be spaced backward from the front panel;
        an outer spacer configured to space the front panel and the rear panel from each other so as to define a first heat insulation space between the front panel and the rear panel;
        a heat insulation spacer provided inside the first heat insulation space;
        a display disposed in a space between the front panel and the rear panel;
        a light guide plate disposed to be spaced backward from the display;
        a heat insulation panel provided between the light guide plate and the rear panel, wherein a second heat insulation space is defined by the rear panel, the heat insulation panel, and the heat insulation spacer and is provided in the first heat insulation space; and
        a backlight disposed on an end-side of the light guide plate,
    wherein the light guide plate comprises a light diffuser, and light emitted from the backlight is scattered by the light diffuser.

2. The refrigerator according to claim 1, further comprising an adhesive member provided on sides of the heat insulation spacer,
    wherein the rear panel and the heat insulation panel adhere to the heat insulation spacer by the adhesive member.

3. The refrigerator according to claim 1, further comprising:
    a support spacer disposed between the heat insulation panel and the light guide plate; and
    a support member disposed between the support spacer and the light guide plate to contact the light guide plate.

4. The refrigerator according to claim 1, wherein the storage chamber light comprises:
    a light case installed on the inner side-wall of the cabinet to accommodate a light emitting member; and
    a light cover having a light emitting surface in which shields the light emitting member, the light cover being disposed substantially perpendicular to the light guide plate.

5. The refrigerator according to claim 4, further comprising a case opening formed in the inner side-wall of the cabinet and in which the storage chamber light is installed, and
    the light emitting surface of the light cover has substantially the same plane as the inner side-wall of the cabinet.

6. The refrigerator according to claim 1, further comprising a door light provided on the door and disposed behind the light guide plate.

7. The refrigerator according to claim 6, wherein the door light comprises:
    a light case disposed on sides of the rear panel to accommodate a light emitting member; and
    a light cover having a light emitting surface which shields the light emitting member, the light cover being disposed substantially perpendicular to the light guide plate.

8. The refrigerator according to claim 6, wherein the door light comprises a plurality of door lights, which face each other.

9. The refrigerator according to claim 6, wherein the light guide plate has a rear surface extending in a horizontal direction,
    the door light is vertically disposed on sides of the light guide plate, and
    the backlight is horizontally disposed above or below the light guide plate.

10. The refrigerator according to claim 1, wherein the light guide plate has a light incident surface and a light emission surface, and
    the backlight is disposed to face the light incident surface so as to emit light, and the emitted light acts on the light diffuser.

11. The refrigerator according to claim 1, wherein the light guide plate comprises:
    a resin layer made of a transparent resin material, the resin layer being configured to face the display; and
    a diffusion layer disposed on a surface of the resin layer and containing the light diffuser.

12. The refrigerator according to claim 11, wherein the diffusion layer has a thickness of about 40 µm to about 60 µm to prevent transparency or illuminance of the light guide plate from being deteriorated.

13. The refrigerator according to claim 1, wherein the light diffuser comprises spherical particles, and
each of the particles has a size of about 70 μm to about 100 μm.

14. A refrigerator comprising:
a cabinet having a storage space;
a door having an opening and configured to open and close the storage space of the cabinet;
a panel assembly provided in the opening; and
a storage chamber light configured to emit light to the storage space;
wherein the panel assembly includes:
a front panel;
a rear panel positioned to be spaced backward from the front panel;
a display positioned between the front panel and the rear panel;
a light guide plate positioned to be spaced backward from the display with respect to the front panel; and
a backlight provided at an end side of the light guide plate,
wherein the light guide plate includes a light diffuser, and light emitted from the backlight is scattered by the light diffuser, and
wherein the refrigerator further comprises a door light provided on the door and positioned behind the light guide plate with respect to the front panel.

15. The refrigerator according to claim 14, wherein the door light includes:
a light case disposed on one or more sides of the rear panel to accommodate a light emitting member; and
a light cover having a light emitting surface which shields the light emitting member, the light cover being positioned substantially perpendicular to the light guide plate.

16. The refrigerator according to claim 14, wherein the door light includes two or more door lights that are positioned to face each other.

17. The refrigerator according to claim 14, wherein the light guide plate has a rear surface extending in a horizontal direction,
the door light extends vertically along a side of the light guide plate, and
the backlight extends horizontally along a top or bottom end of the light guide plate.

18. A refrigerator comprising:
a cabinet;
a door configured to open and close the cabinet;
a panel assembly provided in an opening in the door; and
a storage chamber light provided on an inner side-wall of the cabinet;
wherein the panel assembly includes:
a front panel;
a rear panel positioned to be spaced backward from the front panel;
a display positioned between the front panel and the rear panel;
a light guide plate positioned to be spaced backward from the display with respect to the front panel;
a heat insulation panel provided between the light guide plate and the rear panel; and
a backlight provided at an end side of the light guide plate,
wherein the light guide plate includes a light diffuser, and light emitted from the backlight is scattered by the light diffuser, and
wherein the panel assembly further includes:
a support spacer positioned between the heat insulation panel and the light guide plate; and
a support positioned between the support spacer and the light guide plate to contact the light guide plate.

19. The refrigerator of claim 18, wherein the support includes a compressible silicon or resin material.

20. The refrigerator of claim 18, wherein the light guide plate includes:
a resin layer made of a transparent resin material, the resin layer being configured to face the display; and
a diffusion layer provided on a surface of the resin layer and containing the light diffuser.

* * * * *